US008457322B2

(12) United States Patent
Nakamura et al.

(10) Patent No.: US 8,457,322 B2
(45) Date of Patent: Jun. 4, 2013

(54) INFORMATION PROCESSING APPARATUS, INFORMATION PROCESSING METHOD, AND PROGRAM

(75) Inventors: Osamu Nakamura, Saitama (JP); Mototsugu Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 882 days.

(21) Appl. No.: 12/283,835

(22) Filed: Sep. 16, 2008

(65) Prior Publication Data

US 2009/0074204 A1 Mar. 19, 2009

(30) Foreign Application Priority Data

Sep. 19, 2007 (JP) ................................. 2007-241681

(51) Int. Cl.
*H04R 29/00* (2006.01)
*G06F 17/00* (2006.01)

(52) U.S. Cl.
USPC ............................................... 381/58; 700/94

(58) Field of Classification Search
USPC ..... 381/98, 56, 58, 61; 704/503, 504; 84/612, 84/615, 616, 640; 386/343-352, 239; 700/94
See application file for complete search history.

(56) References Cited

U.S. PATENT DOCUMENTS

| | | | | |
|---|---|---|---|---|
| 6,232,540 | B1 | 5/2001 | Kondo | |
| 6,519,567 | B1 * | 2/2003 | Fujii | 704/503 |
| 7,233,832 | B2 * | 6/2007 | Friedman et al. | 700/94 |
| 7,425,674 | B2 * | 9/2008 | Moulios et al. | 84/612 |
| 7,825,319 | B2 * | 11/2010 | Turner | 84/612 |
| 2008/0131075 | A1 * | 6/2008 | Pontual et al. | 386/66 |
| 2008/0235741 | A1 * | 9/2008 | Ljolje et al. | 725/89 |

FOREIGN PATENT DOCUMENTS

| | | | |
|---|---|---|---|
| JP | 06-103704 | A | 4/1994 |
| JP | 06-332500 | A | 12/1994 |
| JP | 08-292790 | A | 11/1996 |
| JP | 10-214098 | A | 8/1998 |
| JP | 2001-296892 | A | 10/2001 |
| JP | 2003-101959 | A | 4/2003 |
| JP | 2007-101644 | A | 4/2007 |

OTHER PUBLICATIONS

Morita et al., "Time-Scale Modification Algorithm for Speech by Use of Pointer Interval Control Overlap and Add (PICOLA) and Its Evaluation", *The Autumn meeting of Japan Acoustics Engineering*, pp. 148-151, Oct. 1986.

* cited by examiner

*Primary Examiner* — Xu Mei
(74) *Attorney, Agent, or Firm* — Wolf, Greenfield & Sacks, P.C.

(57) ABSTRACT

According to the present invention, a parameter adjustment section setting, in accordance with a first parameter indicating a variant factor for playback speed that is input, a second parameter and a third parameter, and a signal processing section adjusting at least one of playback speed and pitch of a sound of an audio signal based on the second parameter and the third parameter are provided, wherein the signal processing section adjusts the playback speed of the audio signal when the variant factor for playback speed that is input is less than a predetermined threshold and adjusts the playback speed and the pitch of a sound of the audio signal when the variant factor for playback speed that is input is above the predetermined threshold.

26 Claims, 47 Drawing Sheets

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2007-241681 filed in the Japan Patent Office on Sep. 19, 2007, the entire contents of which being incorporated herein by reference.

BACKGROUND OF THE INVENTION

1. Field of the Invention

The present invention relates to an information processing apparatus, an information processing method and a program.

2. Description of the Related Art

In recent years, a video-recording/playback apparatus recording programs broadcasted by TV broadcast as digital data in a recording medium having random access capability such as a DVD (Digital Versatile Disc) or an HDD (Hard Disk Drive) has rapidly become widespread. Further, distribution of contents such as video and audio through the Internet has become popular, and a playback apparatus with a built-in HDD or flash memory is already widespread with which it is made possible to enjoy the contents downloaded from the Internet indoors and outdoors.

The playback apparatus for digital content as described above is implemented with various functions using characteristics of digital and random access. A variable speed playback function may be taken as an example which variably sets the playback speed while maintaining a constant pitch of a sound. The variable speed playback function is a function of slowing or speeding up the playback speed of video and audio, and the function slows the playback speed by around 20 percent for a person beginning to learn a language and the like (slow playback) or speeds up the playback speed by around 50 percent to save the time of viewing and the like (fast playback), for example. The variable playback function is a function that has been popularly implemented in a digital content playback apparatus since the beginning of the spread of the apparatus, and today, it has become quite common. The present invention focuses not only on audio content, but also on the audio part of the video content.

The technology of variably setting the playback speed while maintaining a constant pitch of a sound in a playback apparatus of digital content is called an speech rate conversion. Hereinafter, the speech rate conversion will mean a conversion of expanding or compressing a signal while maintaining a constant pitch of a sound. Several methods are known for the speech rate conversion, for example, the PICOLA (Pointer Interval Control OverLap and Add) serving as a time-axis expansion/compression algorithm at a time domain corresponding to a digital audio signal (see "Expansion/compression on the audio time-axis using duplication adding method by pointer amount-of-movement control (PICOLA) and its evaluation", by Morita and Itakura, Acoustic Society of Japan collected papers, October 1986, pp. 149-150). This algorithm has an advantage in that though its processing is simple and lightweight, good sound quality can be obtained.

SUMMARY OF THE INVENTION

However, with the speech rate conversion, the conversion of the playback speed is performed while maintaining a constant pitch of a sound, it has been difficult to auditorily recognize the playback speed after conversion.

Thus, the present invention is provided in view of the above-described issue, and it is desirable to provide a new and improved information processing apparatus, a new and improved information processing method and a new and improved program that enable to auditorily recognize the playback speed after conversion when converting the playback speed of an audio signal.

According to an embodiment of the present invention, there is provided an information processing apparatus including a parameter adjustment section setting, in accordance with a first parameter indicating a variant factor for playback speed that is input, a second parameter and a third parameter, and a signal processing section adjusting at least one of playback speed and pitch of a sound of an audio signal based on the second parameter and the third parameter, wherein the signal processing section adjusts the playback speed of the audio signal when the variant factor for playback speed that is input is less than a predetermined threshold and adjusts the playback speed and the pitch of a sound of the audio signal when the variant factor for playback speed that is input is above the predetermined threshold.

With such configuration, the parameter adjustment section sets, in accordance with the first parameter indicating a variant factor for playback speed that is input, a second parameter and a third parameter, and the signal processing section adjusts at least one of playback speed and pitch of a sound of an audio signal based on the second parameter and the third parameter. Here, the signal processing section adjusts the playback speed of the audio signal when the variant factor for playback speed that is input is less than the predetermined threshold and adjusts the playback speed and the pitch of a sound of the audio signal when the variant factor for playback speed that is input is above the predetermined threshold. Thereby, with the information processing apparatus according to the present invention, in a case where playback speed of an audio signal in converted, the playback speed after conversion can be auditorily recognized.

The signal processing section includes a playback speed conversion section converting the playback speed of the audio signal and a pitch adjustment section adjusting the pitch of a sound of the audio signal, and the playback speed conversion section may convert the playback speed of the audio signal based on the second parameter and the pitch adjustment section may adjust the pitch of a sound of the audio signal based on the third parameter.

The first parameter may be approximately equal to a product of the second parameter and the third parameter.

The signal processing section further includes an audio signal output control section controlling output of the audio signal to be output from the signal processing section on which a predetermined signal processing has been performed, and the audio signal output control section may lower audio volume of an audio signal both of whose playback speed and pitch of a sound are adjusted, when the audio signal both of whose playback speed and pitch of a sound are adjusted is output from the signal processing section.

The signal processing section further includes an onomatopoeic sound switching judgment section judging whether, in accordance with the first parameter, to adjust at least one of the playback speed and the pitch of a sound of the audio signal or to switch the audio signal to a predetermined onomatopoeic sound indicating that high speed playback is being performed, and the onomatopoeic sound switching judgment section may judge to switch the audio signal to the predetermined onomatopoeic sound when the first parameter is above the predetermined threshold, and the audio signal output control section may output the audio signal after switching the audio signal to the predetermined onomatopoeic sound when the onomatopoeic sound switching judgment section judges to switch the audio signal to the predetermined onomatopoeic sound.

The information processing apparatus further includes a content management section managing content including the audio signal, and the parameter adjustment section may determine a fourth parameter adjusting data amount of the audio signal to be output from the content management section to the signal processing section in accordance with the first parameter to be input.

The parameter adjustment section may reduce the fourth parameter to reduce data amount of the content to be output from the content management section to the signal processing section when the first parameter is above a predetermined threshold.

A product of the first parameter and the fourth parameter may be approximately equal to a product of the second parameter and the third parameter.

The information processing apparatus further includes a content management section managing content including the audio signal, and the parameter adjustment section may determine the second parameter and the third parameter based on a fourth parameter adjusting data amount of the audio data to be output from the content management section to the signal processing section and the first parameter to be input.

The content management section may reduce the fourth parameter to reduce data amount of the content to be output from the content management section to the signal processing section when the first parameter is above a predetermined threshold.

The information processing apparatus further includes a storage section storing a database where the first parameter to be input is mutually correlated with the second parameter and the third parameter, and the parameter adjustment section may determine the second parameter and the third parameter by referring to the database stored in the storage section.

The information processing apparatus further includes a storage section storing a database where the first parameter to be input is mutually correlated with the second parameter, the third parameter and the fourth parameter, and the parameter adjustment section may determine the second parameter, the third parameter and the fourth parameter by referring to the database stored in the storage section.

The parameter adjustment section may increase the second parameter in accordance with difference between the first parameter and a predetermined threshold when the first parameter is above the predetermined threshold.

The database is stored as a curved line indicating variations of the second parameter and the third parameter in accordance with the first parameter, and the curved line indicating the variation of the third parameter may have a smooth shape before and after the predetermined threshold.

According to another embodiment of the present invention, there is provided an information processing method including a parameter adjustment step of setting, in accordance with a first parameter indicating a variant factor for playback speed that is input, a second parameter and a third parameter, and a signal processing step adjusting at least one of playback speed and pitch of a sound of an audio signal based on the second parameter and the third parameter, wherein the signal processing step adjusts the playback speed of the audio signal based on the second parameter when the variant factor for playback speed that is input is less than a predetermined threshold and adjusts the playback speed and the pitch of a sound of the audio signal based on the second parameter and the third parameter when the variant factor for playback speed that is input is above the predetermined threshold.

With such configuration, the parameter adjustment step sets, in accordance with a first parameter indicating a variant factor for playback speed that is input, a second parameter and a third parameter, and the signal processing step adjusts at least one of playback speed and pitch of a sound of an audio signal based on the second parameter and the third parameter. At this time, the signal processing step adjusts the playback speed of the audio signal based on the second parameter when the variant factor for playback speed that is input is less than the predetermined threshold and adjusts the playback speed and the pitch of a sound of the audio signal based on the second parameter and the third parameter when the variant factor for playback speed that is input is above the predetermined threshold. Thereby, with the information processing apparatus according to the present invention, in a case where playback speed of an audio signal in converted, the playback speed after conversion can be auditorily recognized.

In the parameter adjustment step, the second parameter and the third parameter may be determined so that the first parameter may be made approximately equal to a product of the second parameter and the third parameter.

In the signal processing step, amplitude of signal waveform of the audio signal may be controlled so that audio volume of the audio signal may be made small when both of the playback speed and the pitch of a sound of the audio signal are adjusted.

In the signal processing step, the audio signal may be switched to a predetermined onomatopoeic sound indicating that high speed playback is being performed when the first parameter is above the predetermined threshold.

In the parameter adjustment step, a fourth parameter adjusting data amount of the audio signal to be processed in the signal processing step in accordance with the first parameter may be further determined.

In the parameter adjustment step, the fourth parameter may be reduced to reduce data amount of the audio signal when the first parameter is above a predetermined threshold.

In the parameter adjustment step, the second parameter and the third parameter may be determined in accordance with a fourth parameter adjusting data amount of the audio signal to be processed in the signal processing step and the first parameter.

In the parameter adjustment step, the second parameter, the third parameter and the fourth parameter may be determined so that product of the first parameter and the fourth parameter may be made approximately equal to a product of the second parameter and the third parameter.

According to another embodiment of the present invention, there is provided a program realizing, in a computer, a parameter adjustment function setting, in accordance with a first parameter indicating a variant factor for playback speed that is input, a second parameter and a third parameter, and a signal processing function adjusting at least one of playback speed and pitch of a sound of an audio signal based on the second parameter and the third parameter.

With such configuration, a computer program is stored in a storage section included in a computer and is read by a CPU included in the computer to be executed, and thus, the program makes the computer function as the information processing apparatus described above. Further, a recording medium in which the computer program is recorded and which can be read by a computer can also be provided. The recording medium is, for example, a magnetic disk, an optical disk, a magneto-optical disk and a flash memory. Further, the computer program described above may be distributed via a network, for example, without using a recording medium.

According to the embodiments of the present invention described above, in a case where playback speed of an audio signal in converted, the playback speed after conversion can be auditorily recognized.

DETAILED DESCRIPTION OF THE PREFERRED EMBODIMENTS

Figures 1A, 1B, 1C, 1D:
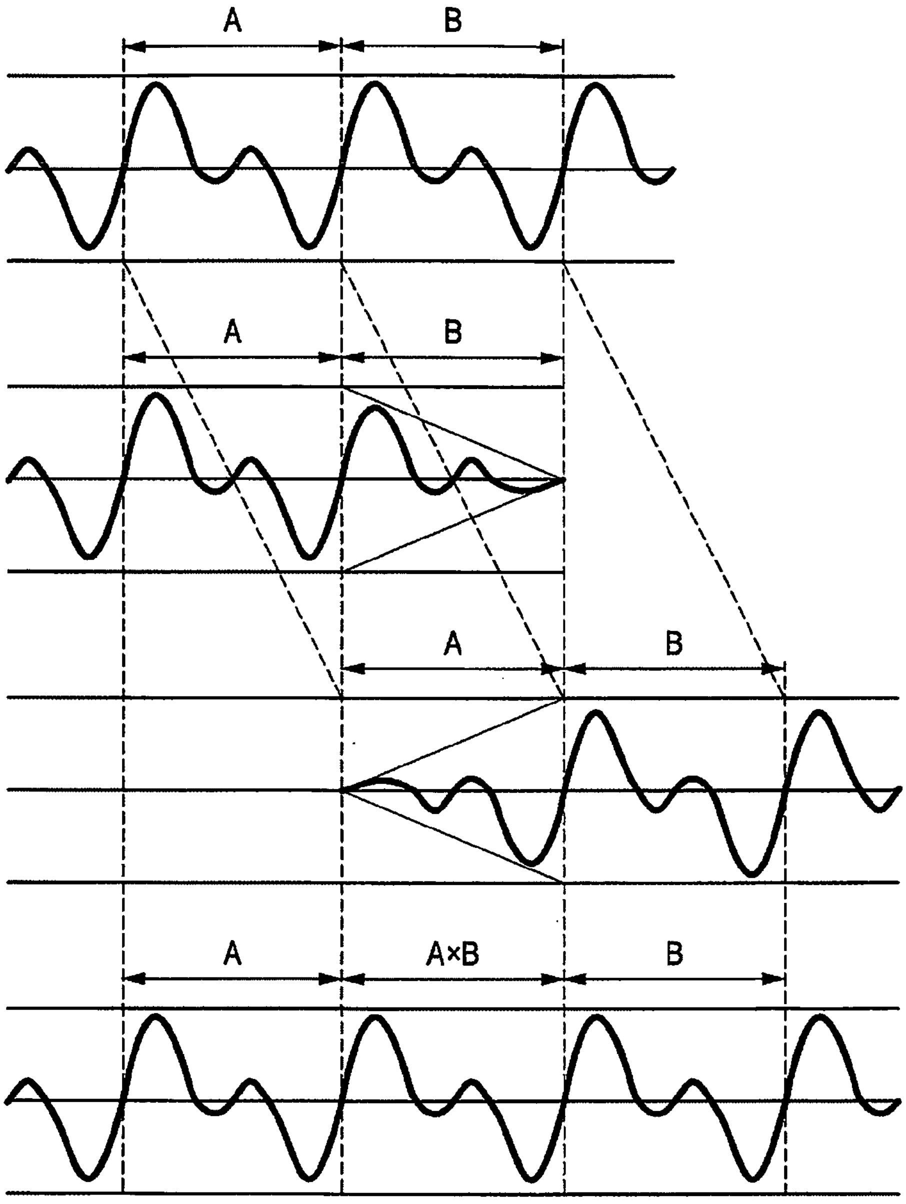
FIG. 1A is an explanatory diagram showing a method for expanding an audio signal by the PICOLA.
FIG. 1B is an explanatory diagram showing a method for expanding an audio signal by the PICOLA.
FIG. 1C is an explanatory diagram showing a method for expanding an audio signal by the PICOLA.
FIG. 1D is an explanatory diagram showing a method for expanding an audio signal by the PICOLA.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Incidentally, in the following, a signal constituted by speech will be referred to as a speech signal and a signal constituted by other than speech such as music will be referred to as an acoustic signal, and a signal constituted by the speech signal and the acoustic signal will be referred to as an audio signal.

(Description of Basic Technology)

First, before giving a detailed description of the preferred embodiments of the present invention, the technical matters based on which the present embodiments are realized will be described. Incidentally, the present embodiments are configured to be able to obtain a remarkable effect by improving on the basic technology as described below. Accordingly, the technology relating to the improvement is the characteristics of the present embodiments. That is, although the present embodiments follow the basic concept of the technical matters described hereunder, the essence of the embodiments focuses on the improvements, and it should be noted that the configurations clearly differ from that of the basic technology and there is a clear distinction between the effects of the present embodiments and that of the basic technology.

(Description of PICOLA)

The PICOLA is, as described above, a time-axis expansion/compression algorithm at a time domain corresponding to a digital speech signal, and performs expansion and compression on a speech signal as described below. In the following, by referring to FIGS. 1A to 5B, a method for signal processing according to the PICOLA will be described.

FIGS. 1A to 1D are explanatory diagrams showing a method for expanding an audio signal by the PICOLA. Incidentally, in the following description, an original waveform is a waveform of a signal as originally input to the PICOLA. Further, in FIG. 1A to 1D, the vertical axis represents the amplitude (that is, intensity) of a signal, and the horizontal axis represents the time.

(Processing for Expanding a Waveform according to PICOLA)

According to the PICOLA, first, a period A and a period B that have a similar waveform are detected from an original waveform. As shown in FIG. 1A, the period A and the period B are two periods that are continuous and having the same length, and the number of samples of the period A and the number of samples of the period B are the same. Subsequently, a waveform shown in FIG. 1B whose waveform in the detected period A remains unchanged and then fades out in the detected period B is generated. Similarly, a waveform shown in FIG. 1C which fades in from the period A and whose waveform remains unchanged in the period B is generated. Then, by adding the generated waveforms shown in FIG. 1B and FIG. 1C, an expanded waveform shown in FIG. 1D may be obtained.

The adding of a fade-out waveform and a fade-in waveform as described above is referred to as cross-fade. When a cross-fade period of the period A and the period B is expressed as a period A×B and the operation described above is performed, the period A and the period B of the original waveform shown in FIG. 1A are changed to a period A, a period A×B and a period B of the expanded waveform shown in FIG. 1D.

(Detection of Similar-Waveform Length)

Figure 2A:
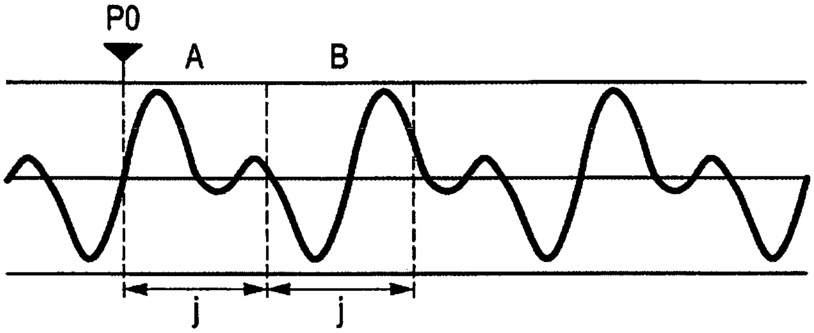
FIG. 2A is an explanatory diagram showing an example of the search for a similar-waveform length.
Figure 2B:
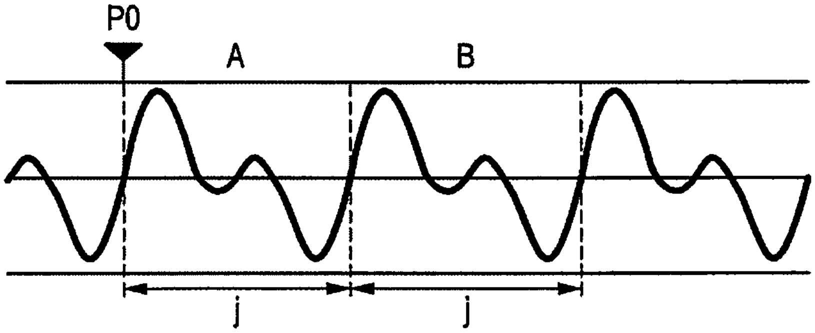
FIG. 2B is an explanatory diagram showing an example of the search for a similar-waveform length.
Figure 2C:
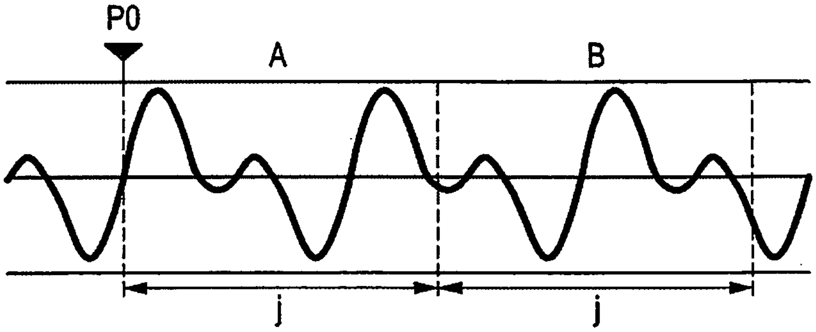
FIG. 2C is an explanatory diagram showing an example of the search for a similar-waveform length.

Here, in the processing for expanding a waveform as described above, two periods that are continuous and having similar waveforms from a signal that is input are to be detected. Hereunder, by referring to FIG. 2A to 2C, a method for detecting period lengths W of the period A and the period B having similar waveforms will be described. FIGS. 2A to 2C are explanatory diagrams showing examples of the search for a similar-waveform length. Incidentally, in the following description, the period length of the period A and the period B is referred to as a similar-waveform length.

First, with a processing start position P0 in a signal waveform as a starting point, a period A and a period B of j samples are specified as shown in FIG. 2A. Next, as shown as FIG. 2A→FIG. 2B→FIG. 2C, j (that is, number of samples) are gradually increased, and j with a period A and j with a period B that are most similar to each other are detected. Here, as a scale for measuring similarity between the period A and the period B, a function D(j) as shown by the following Equation 1 may be used, for example.

$$D(j)=\frac{1}{j}\sum_{i}\{x(i)-y(i)\}^{2}(i=0,1,2,\ldots\ j-1)\qquad\text{(Equation 1)}$$

The function D(j) is calculated within a range of a minimum value (WMIN) to a maximum value (WMAX) of a search range for similar-length waveform (namely, WMIN≦j≦WMAX), and j that renders the minimum D(j) is obtained. The parameter j that renders the minimum D(j) is the period length W of a period A and a period B. Incidentally, the above-described j, WMIN and WMAX express the number of samples of cycles.

Here, in Equation 1 described above, x(i) represents each of sample values of the period A and y(i) represents each of sample values of the period B. Further, it may be that x(i) represents each of sample values of the period B and y(i) represents each of sample values of the period A. Incidentally, a search frequency range for a similar-waveform length may be approximately 50 Hz to 250 Hz, for example. When a sampling frequency is 8 kHz, for example, WMAX is 160 and WMIN is 32, approximately. In the example as shown in FIG. 2B, j is selected as j that renders the function D(j) minimum.

Figures 3A, 3B:
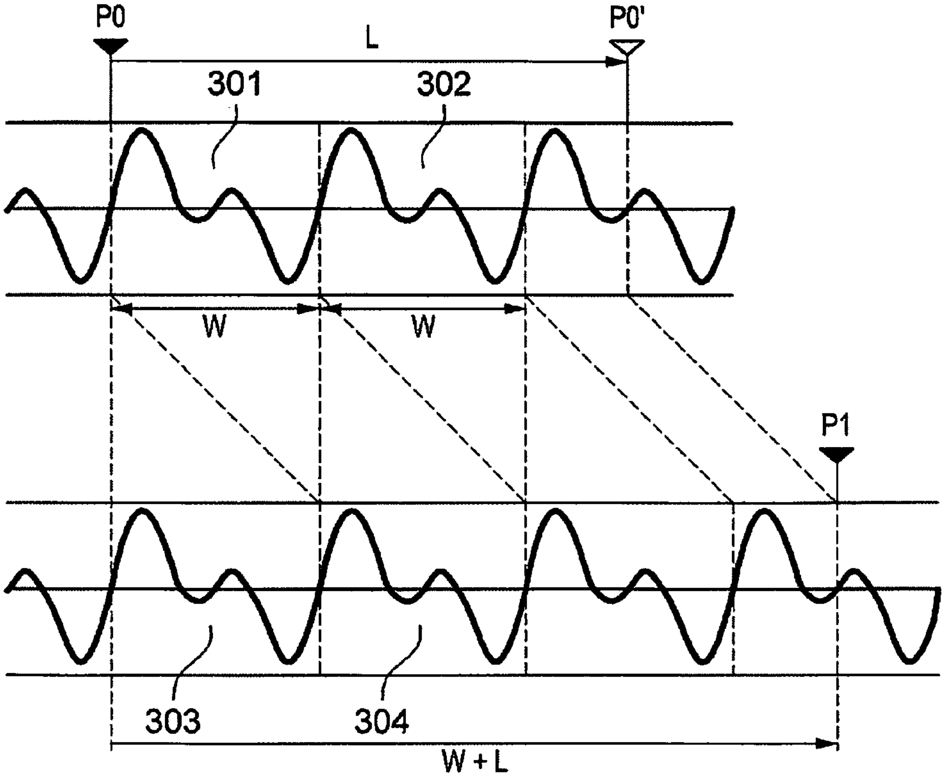
FIG. 3A is an explanatory diagram showing a method for expanding an audio signal by the PICOLA.
FIG. 3B is an explanatory diagram showing a method for expanding an audio signal by the PICOLA.

Subsequently, by referring to FIGS. 3A to 3B, a method for expanding an audio signal to an arbitrary length by using the PICOLA will be described. FIGS. 3A and 3B are explanatory diagrams showing a method for expanding an audio signal by the PICOLA.

First, as described with reference to FIGS. 2A to 2C, j that renders the function D(j) minimum is obtained with the processing start position P0 as the starting point, and W is set to j. Subsequently, a period 301 is copied to a period 303, and a cross-fade waveform of the period 301 and a period 302 is created in the period 301. Then, a period from a position P0 to a position P0' of the original waveform shown in FIG. 3A is copied to an expanded waveform shown in FIG. 3B. With the operation described above, L samples from the position P0 to the position P0' of the original waveform shown in FIG. 3A are made W+L samples for the expanded waveform shown in FIG. 3B, and the number of samples become r times. Here, r representing expansion rate of the number of samples (increase rate of the number of samples) is defined by using the following Equation 2.

$$r=\frac{W+L}{L}(1.0<r)\qquad\text{(Equation 2)}$$

Here, rewriting the above Equation 2 in regard to L results in the following Equation 3.

$$L=W\cdot\frac{1}{r-1}\qquad\text{(Equation 3)}$$

That is, as is apparent from Equation 3, when it is desired to multiply the number of samples of the original waveform by r, it can be done so by specifying a position P0' by using the following Equation 4.

$$P0'=P0+L\qquad\text{(Equation 4)}$$

Further, by defining a parameter Rs as shown in the following Equation 5, the number of samples L may be expressed as the following Equation 6.

$$R_s=\frac{1}{r}(R_s<1.0)\qquad\text{(Equation 5)}$$

$$L=W\cdot\frac{R_s}{1-R_s}\qquad\text{(Equation 6)}$$

By using the Rs defined as above, expression such as the original waveform is "played back at Rs-times speed" is made possible. Hereunder, the Rs will be referred to as "speech rate conversion rate".

When the processing for the position P0 to the position P0' of the original waveform is completed, the position P0' is switched to a position P1 to be newly regarded as a starting point for the processing, and the same processing is repeated. By repeating such processing, an original waveform can be expanded.

In the examples as shown in FIGS. 3A and 3B, the number of samples L is approximately 2.5 W, and thus, from Equations 2 and 5, the speech rate conversion rate Rs is approximately 0.7. That is, the examples as shown in FIGS. 3A and 3B correspond to a slow playback of approximately 0.7 times speed.

(Processing for Compressing a Waveform According to PICOLA)

Subsequently, by referring to FIGS. 4A to 5B, a processing for compressing a waveform by the PICOLA will be described.

Figures 4A, 4B, 4C, 4D:
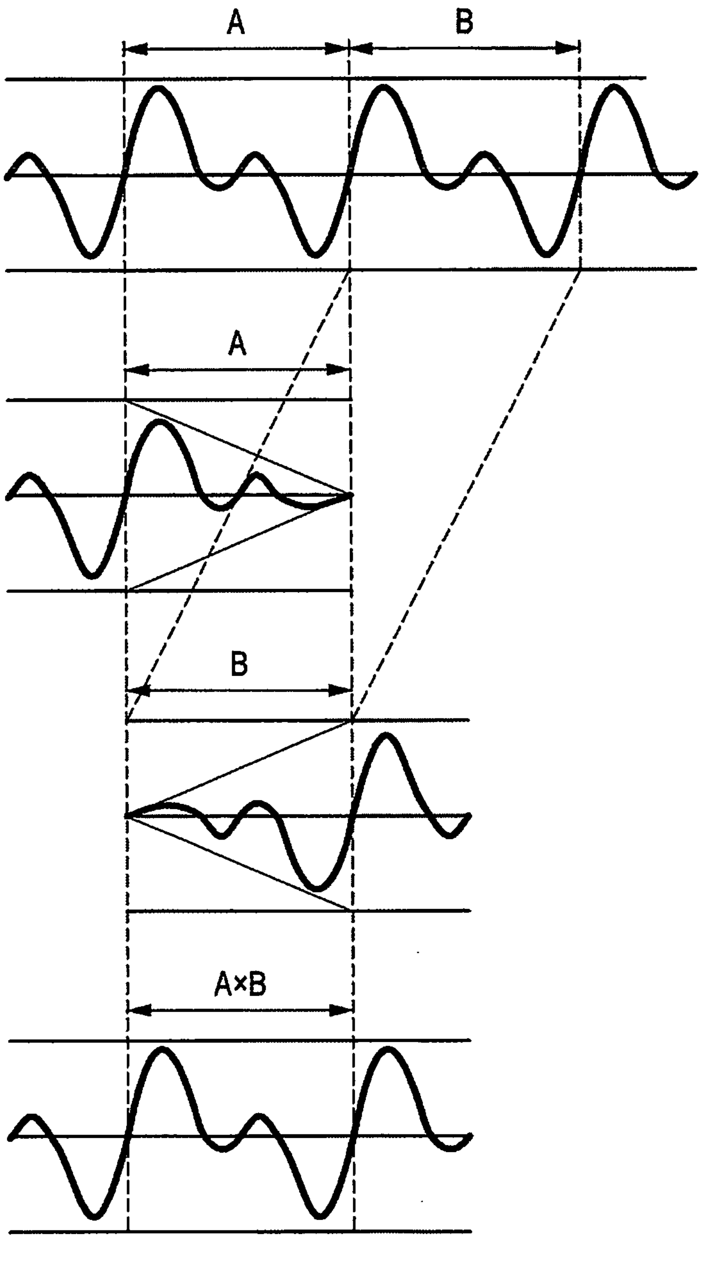
FIG. 4A is an explanatory diagram showing a method for compressing an audio signal by the PICOLA.
FIG. 4B is an explanatory diagram showing a method for compressing an audio signal by the PICOLA.
FIG. 4C is an explanatory diagram showing a method for compressing an audio signal by the PICOLA.
FIG. 4D is an explanatory diagram showing a method for compressing an audio signal by the PICOLA.

FIGS. 4A to 4D are explanatory diagrams illustrating examples of compressing an audio signal by using the PICOLA. According to the PICOLA, first, a period A and a period B that have a similar waveform are detected from an original waveform shown in FIG. 4A. As shown in FIG. 4A, the period A and the period B are two periods that are continuous and having the same length, and the numbers of samples of the period A and the period B are the same. Incidentally, the method described by referring to FIGS. 2A to 2C may be applied for detection of periods having similar waveforms. Subsequently, a waveform shown in FIG. 4B which fades out in the period A and a waveform shown in FIG.

4C which fades in from the period B are generated. Then, by adding the generated waveforms shown in FIGS. 4B and 4C, a compressed waveform shown in FIG. 4D may be obtained. By the operation described above, the period A and the period B of the original waveform shown in FIG. 4A are changed to a period A×B of the compressed waveform shown in FIG. 4D.

Figure 5A:
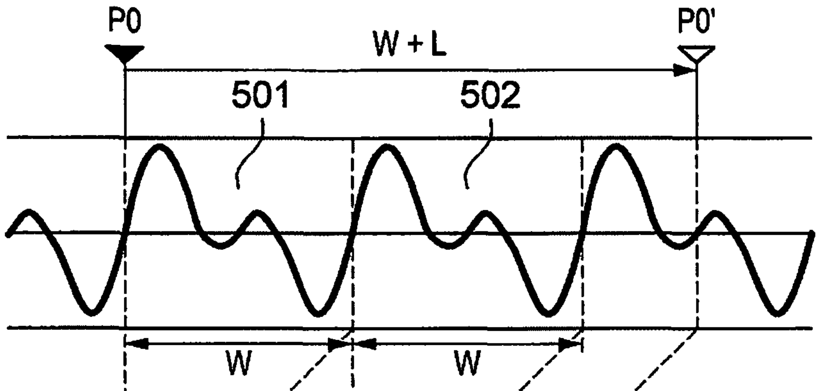
FIG. 5A is an explanatory diagram showing a method for compressing an audio signal by the PICOLA.
Figure 5B:
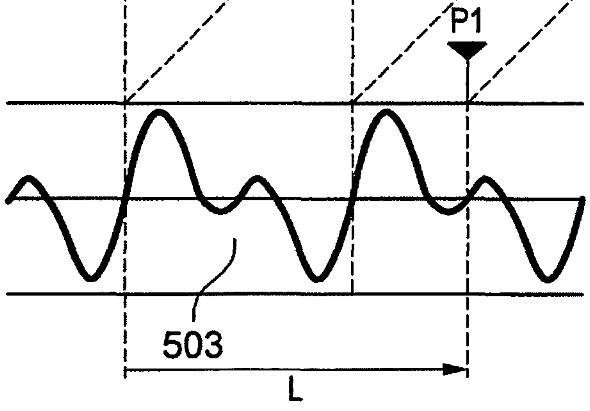
FIG. 5B is an explanatory diagram showing a method for compressing an audio signal by the PICOLA.

Subsequently, by referring to FIGS. 5A and 5B, a method for compressing an audio signal to an arbitrary length by using the PICOLA will be described. FIGS. 5A and 5B are explanatory diagrams showing a method for compressing an audio signal by the PICOLA.

First, as described with reference to FIGS. 2A to 2C, j that renders the function D(j) minimum is obtained with the processing start position P0 as the starting point, and W is set to j. Subsequently, a cross-fade waveform of a period 501 and a period 502 is created in the period 502. Then, a remaining period in which the period 501 is excluded from a period of position P0 to a position P0' of the original waveform shown in FIG. 5A is copied to the compressed waveform shown in FIG. 5B. With the operation described above, W+L samples from the position P0 to the position P0' of the original waveform shown in FIG. 5A are made L samples for the compressed waveform shown in FIG. 5B, and the number of samples become r times. Here, r representing compression rate of the number of samples is defined by using the following Equation 7.

$$r = \frac{L}{W + L}(r < 1.0) \quad \text{(Equation 7)}$$

Here, rewriting the above Equation 7 in regard to L results in the following Equation 8.

$$L = W \cdot \frac{r}{1 - r} \quad \text{(Equation 8)}$$

That is, as apparent from Equation 8, when it is desired to multiply the number of samples of the original waveform by r, it can be done so by specifying a position P0' by using the following Equation 9.

$$P0' = P0 + (W + L) \quad \text{(Equation 9)}$$

Further, by defining a parameter Rs as shown in the following Equation 10, the number of samples L may be expressed as the following Equation 11.

$$R_s = \frac{1}{r}(1.0 < R_s) \quad \text{(Equation 10)}$$

$$L = W \cdot \frac{1}{R_S - 1} \quad \text{(Equation 11)}$$

By using the Rs defined as above, expression such as the original waveform is "played back at Rs-times speed" is made possible. When the processing for the position P0 to the position P0' of the original waveform is completed, the position P0' is switched to a position P1 to be newly regarded as a starting point for the processing, and the same processing is repeated. By repeating such processing, an original waveform can be compressed.

In the examples as shown in FIGS. 5A and 5B, the number of samples L is approximately 1.5 W, and thus, from Equations 7 and 10, the speech rate conversion rate Rs is approximately 1.7. That is, the examples as shown in FIGS. 5A and 5B are equivalent to a fast playback of approximately 1.7 times speed.

(Flow of Processing for Expanding a Signal According to PICOLA)

Figure 6:
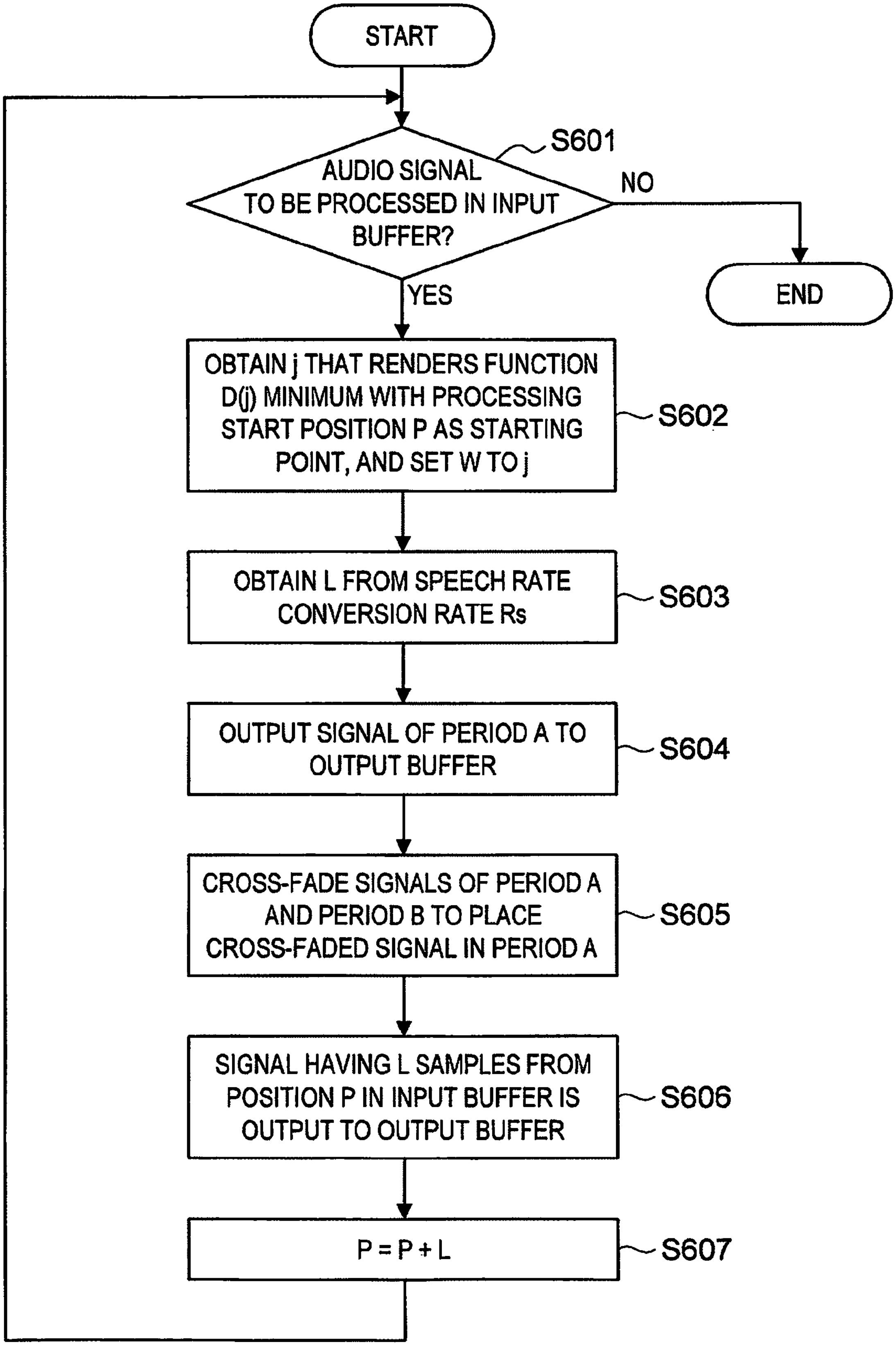
FIG. 6 is a flow chart showing a method for expanding an audio signal by the PICOLA.

Subsequently, by referring to FIG. 6, a flow of a processing for expanding a signal according to the PICOLA will be briefly described. FIG. 6 is a flow chart showing a flow of a processing for expanding an audio signal by using the PICOLA.

First, according to the PICOLA, it is judged whether there is an audio signal to be processed in an input buffer of an information processing apparatus and the like in which the PICOLA is implemented (step S601). Here, if it is judged that there is no audio signal to be processed, the processing is terminated. However, if it is judged that an audio signal to be processed exists, j that renders the function D(j) minimum is obtained with a processing start position P as the starting point, and W is set to j (step S602). Subsequently, with the PICOLA, L is obtained from a speech rate conversion rate Rs specified by a user (step S603), and a period A corresponding to W samples from a processing start position P is output to an output buffer of an information processing apparatus and the like in which the PICOLA is implemented (step S604).

Next, according to the PICOLA, a cross-fade between the period A of W samples from the processing start position P and a period B of the next W samples continuous from the period A is obtained and is placed in the period A (step S605). Subsequently, a signal having L samples from a position P of the input buffer is output to the output buffer (step S606). Subsequently, the PICOLA moves the processing start position P to P+L (step S607) and returns to step S601 to repeat the processing. By repeating such processing until there is no audio signal to be processed in the input buffer, the processing for expanding an audio signal can be performed.

(Flow of Processing for Compressing a Signal According to PICOLA)

Figure 7:
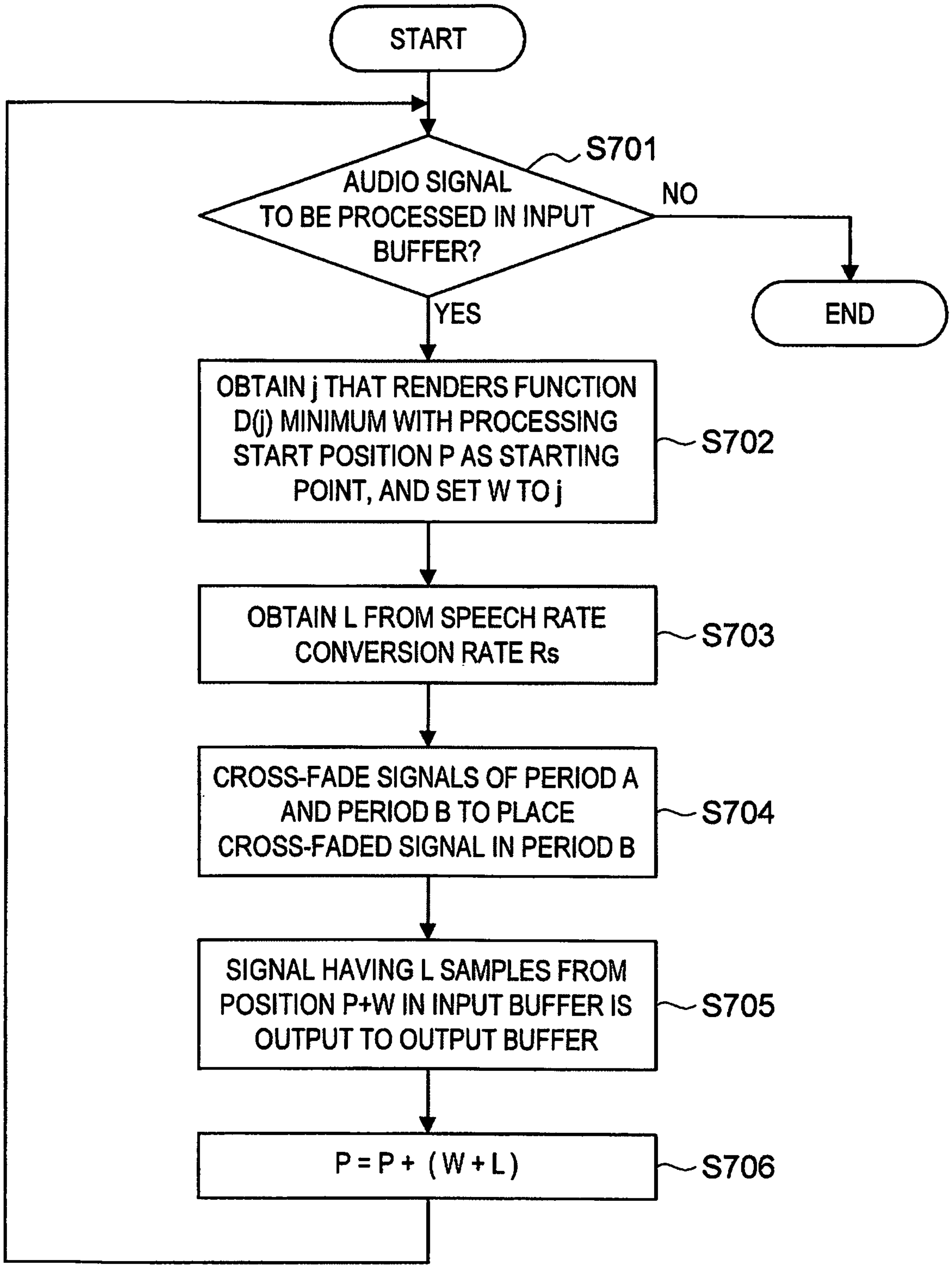
FIG. 7 is a flow chart showing a method for compressing an audio signal by the PICOLA.

Subsequently, by referring to FIG. 7, a flow of a processing for compressing a signal according to the PICOLA will be briefly described. FIG. 7 is a flow chart showing a flow of a processing for compressing an audio signal by the PICOLA.

First, according to the PICOLA, it is judged whether there is an audio signal to be processed in an input buffer of an information processing apparatus and the like in which the PICOLA is implemented (step S701). Here, if it is judged that there is no audio signal to be processed, the processing is terminated. However, if it is judged that an audio signal to be processed exists, j that renders the function D(j) minimum is obtained with a processing start position P as the starting point, and W is set to j (step S702). Subsequently, with the PICOLA, L is obtained from a speech rate conversion rate Rs specified by a user (step S703).

Next, a cross-fade between the period A of W samples from the processing start position P and a period B of the next W samples continuous from the period A is obtained and is placed in the period B (step S704). Subsequently, a signal having L samples from a position P+W of the input buffer is output to the output buffer (step S705). Subsequently, the PICOLA moves the processing start position P to P+(W+L) (step S706) and returns to step S701 to repeat the processing. By repeating such processing until there is no audio signal to be processed in the input buffer, the processing for compressing an audio signal can be performed.

(Configuration of Speech Rate Conversion Apparatus According to PICOLA)

Figure 8:
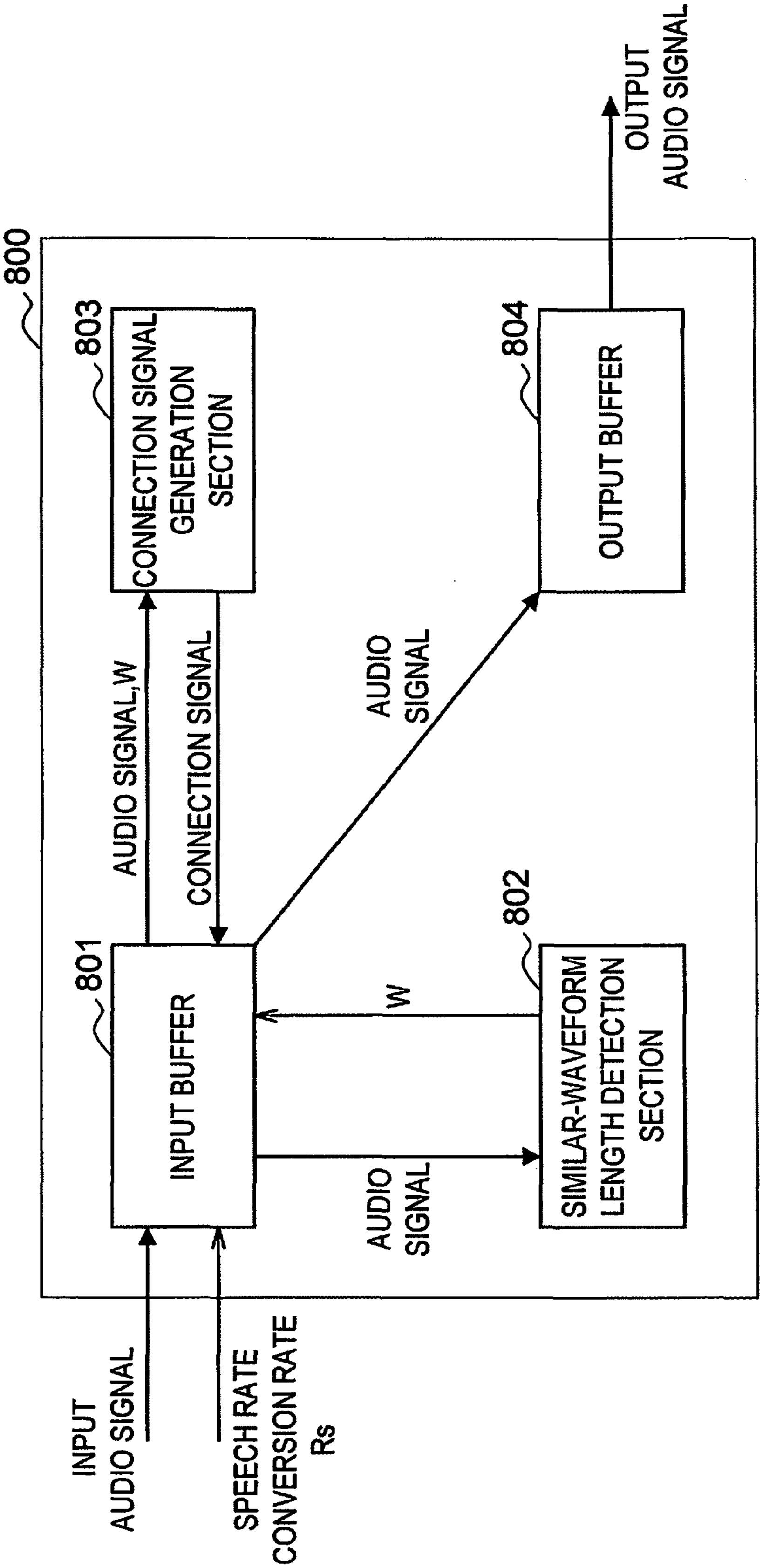
FIG. 8 is a block diagram showing a configuration of a speech rate conversion apparatus according to the PICOLA.

Next, by referring to FIG. 8, a configuration of a speech rate conversion apparatus according to the PICOLA will be described. FIG. 8 is a block diagram showing a configuration of the speech rate conversion apparatus according to the PICOLA. Incidentally, in the following description, period lengths of a period A and a period B in FIGS. 1A and 4A is referred to as a similar-waveform length.

An information processing apparatus 800 according to the PICOLA includes, as shown in FIG. 8, an input buffer 801, a similar-waveform length detection section 802, a connection signal generation section 803 and an output buffer 804, for example.

The input buffer 801, along with buffering of an audio signal input to the information processing apparatus 800, sends the audio signal that is input to the similar-waveform length detection section 802 and the connection signal generation section 803 described later, and sends to the output buffer 804 an audio signal generated in accordance with a speech rate conversion rate Rs. Incidentally, the audio signal to be input to the input buffer 801 may be a digital signal directly input to the information processing apparatus 800 or a signal which is an analog signal that is AD (Analog to Digital) converted to a digital signal by the information processing apparatus 800.

Specifically, based on a similar-waveform length W detected by the similar-waveform length detection section 802 described later, the input buffer 801 passes 2 W samples of an audio signal to the connection signal generation section 803. The input buffer 801 stores a connection signal generated by the connection signal generation section 803 in an appropriate location in the input buffer 801 according to the speech rate conversion rate Rs. Further, the input buffer 801 sends the audio signal in the input buffer 801 to the output buffer 804 in accordance with a speech rate conversion rate Rs.

The similar-waveform length detection section 802 detects, in relation to the audio signal input to the input buffer 801, a parameter j that renders the function D(j) minimum, and the detected parameter j is set as the similar-waveform length W (W=j). The detected similar-waveform length W is sent to the input buffer 801. Incidentally, the detected similar-waveform length W may be directly output to the connection signal generation section 803 described later. Further, the detected similar-waveform length W may be stored in a storage section not shown which is configured with a RAM, a storage device, and the like.

By using the audio signal and the similar-waveform length W sent from the input buffer 801, the connection signal generation section 803 generates a connection signal to be used in an expansion/compression processing for an audio signal, and sends the generated connection signal to the input buffer 801. Specifically, the connection signal generation section 803 cross-fades the received 2 W samples of the audio signal to W samples, and sends the cross-faded signal to the input buffer 801. Further, the generated connection signal may be stored in a storage section not shown which is configured with a RAM, a storage device, and the like.

The output buffer 804 buffers the audio signal generated by the input buffer 801 and on which the expansion/compression processing is performed. The audio signal on which the expansion/compression processing is performed is output as an output audio signal via an output device such as a speaker after being DA converted (Digital to Analog).

(Flow of Similar-Waveform Length Detection)

Figure 9:
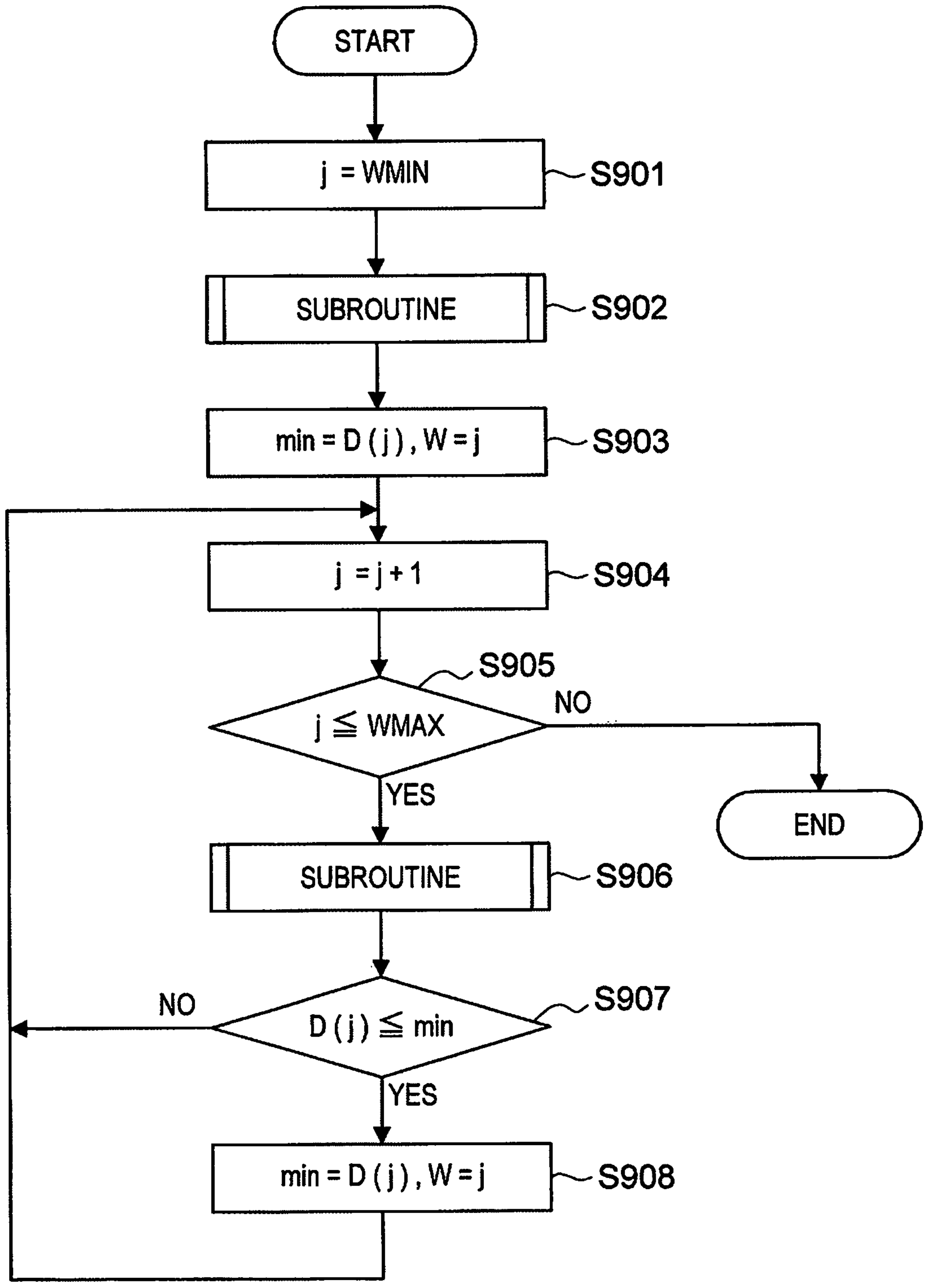
FIG. 9 is a flow chart showing a processing for detecting a similar-waveform length.
Figure 10:
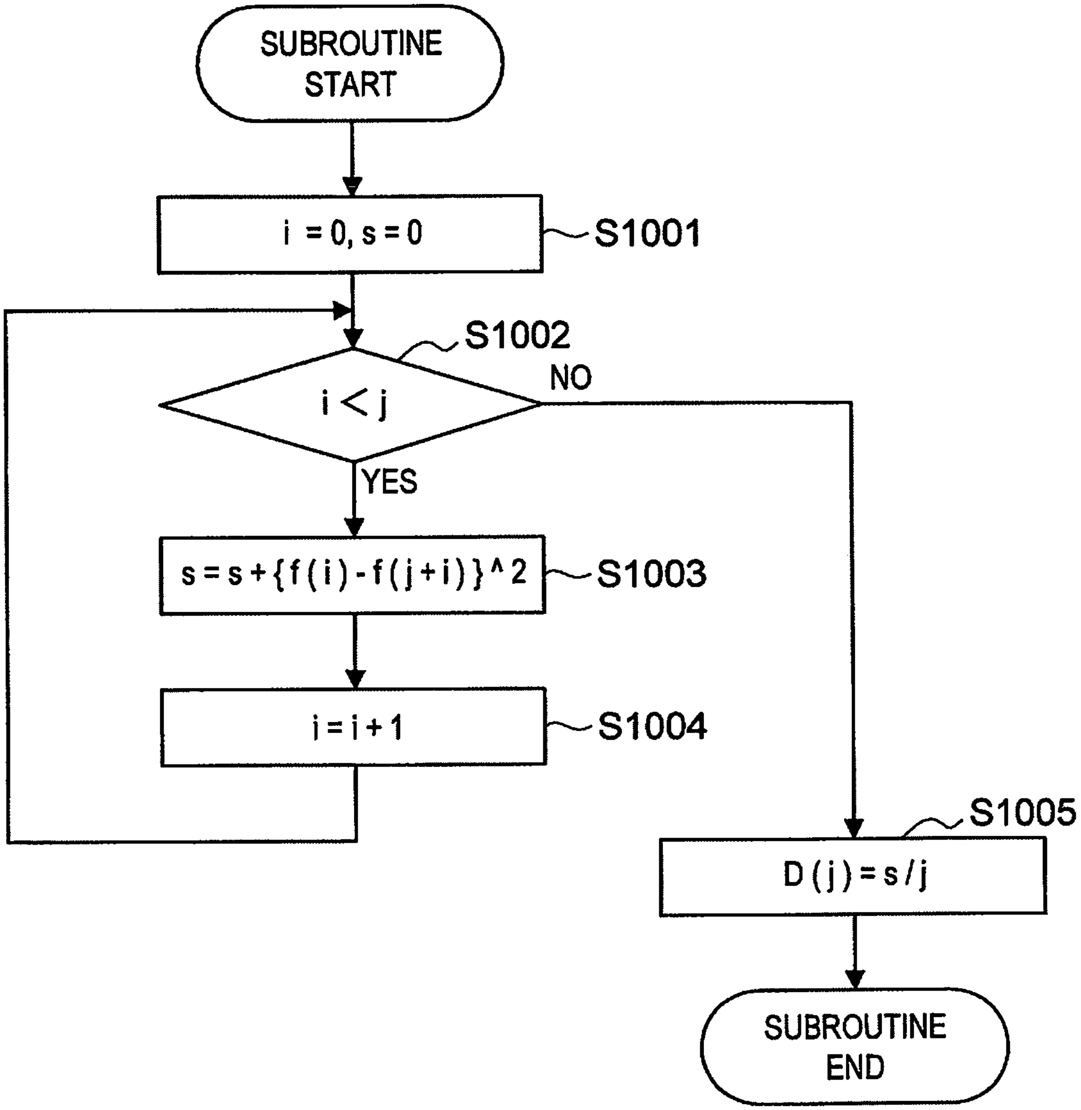
FIG. 10 is a flow chart showing a processing for detecting a similar-waveform length.

Subsequently, by referring to FIGS. 9 and 10, a processing for detecting a similar-waveform length will be described in detail. FIGS. 9 and 10 are flow charts showing processings for detecting a similar-waveform length.

On detecting a similar-waveform length, first, an index j, which is a parameter, is set to an initial value WMIN (step S901). Here, as described above, the WMIN is a minimum value of a search range where a similar waveform is searched for. When an initial value for a similar-waveform length search is set, a subroutine as shown in FIG. 10 is executed in an information processing and the like in which the PICOLA is implemented (step S902). The subroutine is, as described later, a routine for calculating a function D(j) used for judging a similarity between the waveforms. Here, the function D(j) is a function given by the following Equation 12.

$$D(j) = \frac{1}{j}\sum_{i}\{f(i) - f(j+i)\}^2 (i = 0, 1, 2, \ldots\ j-1) \quad \text{(Equation 12)}$$

Here, in the above Equation 12, f is an input audio signal, and, for example, in the example as shown in FIGS. 2A to 2C, it indicates a sample with the position P0 as a starting point. Incidentally, Equation 1 and Equation 12 express the same matter.

Subsequently, a value of the function D(j) obtained by the subroutine is assigned to a variable min, and the index j is assigned to W (step S903). Then, the index j is incremented by 1 (step S904). Next, it is judged whether the index j is below the WMAX or not (step S905). If it is not below the WMAX (that is, if it exceeds the WMAX), the processing is terminated, and a value stored in the variable W at the time of terminating the processing is the index j that renders the function D(j) minimum, that is, a similar-waveform length, and the value of the variable min at that time is the minimum value of the function D(j).

Further, if the index j is below the WMAX, with the subroutine described above, a function D(j) is obtained for a new index j (step S906). Next, it is judged whether a value of the function D(j) obtained for the new index j is below min or not (step S907). Here, if the value of the function D(j) is below min, the value of the function D(j) is assigned to the variable min, and the index j is assigned to W (step S908), and the processing is returned to step S904. Further, if the value of the function D(j) is not below min (that is, if it exceeds min), the processing is returned to step S904. By performing such processing, a similar-waveform portion of the input audio signal may be searched, and a similar-waveform length may be detected.

(Calculation of Value of Function D(j)

Subsequently, by referring to FIG. 10, a flow of a subroutine for calculating a function D(j) used for judging the similarity between waveforms will be described in detail.

When a processing of the subroutine is started, first, an index i and a variable s are set to 0 (step S1001). Next, it is judged whether the index i is smaller than the index j (step S1002). If the index i is smaller than the index j, step S1003 described later is performed, and if the index i is not smaller than the index j (that is, if the index i is equal to or greater than the index j), step S1005 described later is performed. Here, the index j is the same as the index j in the flow chart as shown in FIG. 9.

In step S1003, a difference of input audio signals is squared, and then, added to the variable s. Then, the index i is incremented by 1 (step S1004), and the processing is returned to step S1002. Further, in step S1005, the variable s is divided by the index j, and the quotient is made the value of the function D(j), and the subroutine is terminated.

(Generation of Cross-Fade Signal)

Figure 11:
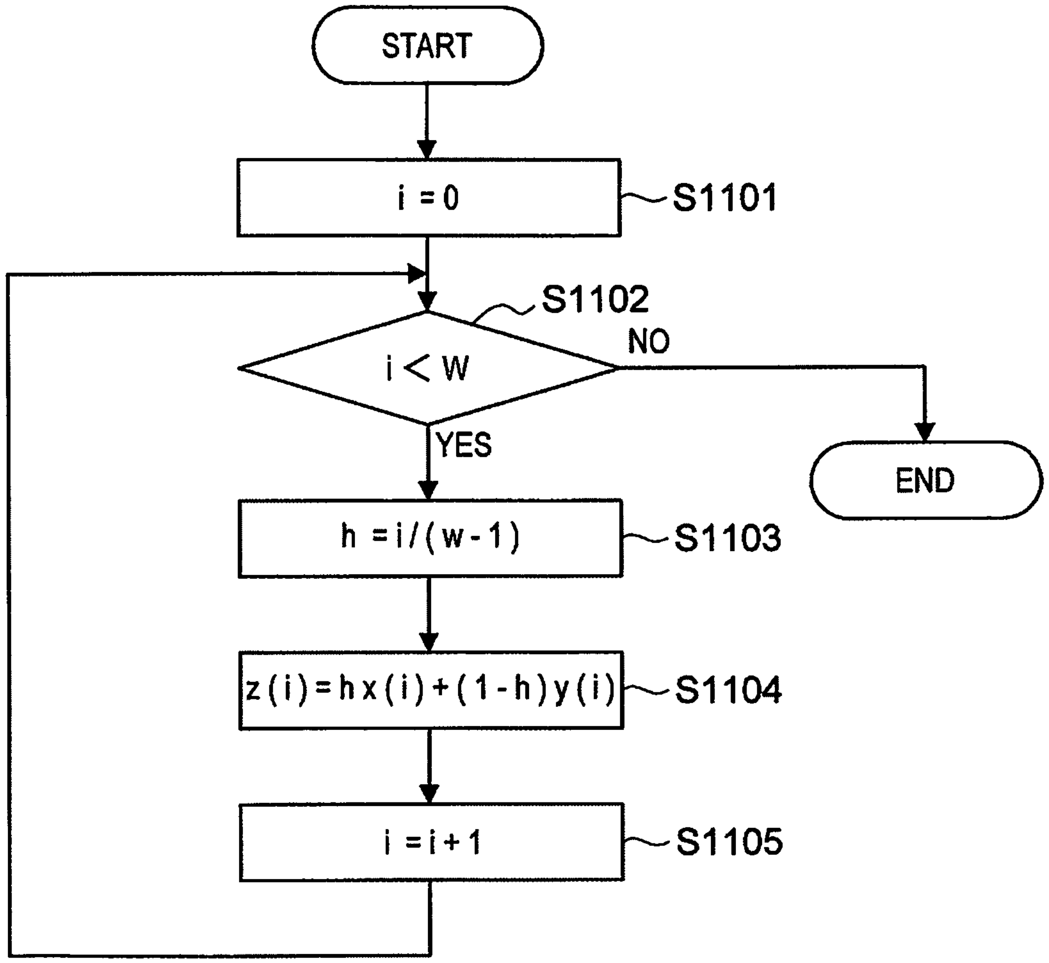
FIG. 11 is a flow chart showing an example of a processing for generating a cross-fade signal.

Subsequently, by referring to FIG. 11, a method for generating a cross-fade signal performed in the connection signal generation section 803 will be described in detail. FIG. 11 is a flow chart showing an example of a processing for generating a cross-fade signal.

On generating a cross-fade signal, first, an index i is set to 0 (step S1101). Next, the index i and a similar-waveform length W are compared (step S1102), and if the index i is not smaller than W (that is, if the index i is equal to or greater than W), the processing is terminated. Further, if the index i is smaller than W, a coefficient h to be used for fade-in and fade-out is obtained (step S1103). When the calculation of the coefficient h is completed, a signal x(i) that fades in is multiplied by the coefficient h, and a signal y(i) that fades out is multiplied by 1−h, and the sum of these signals is assigned to z(i) (step S1104). For example, in the example as shown in FIGS. 1A to 1D, the signal in the period A corresponds to x(i), and the signal in the period B corresponds to y(i). Further, in the example as shown in FIGS. 4A to 4D, the signal in the period B corresponds to x(i), and the signal in the period A corresponds to y(i). The signal z(i) generated in such manner is made the cross-fade signal. In the next processing, the index i is incremented by 1 (step S1105), and the processing is returned to step S1102. By repeating such processing, a cross-fade signal can be calculated.

As described above by referring to FIGS. 1A to 11, with the speech rate conversion algorithm, the PICOLA, it is made possible to expand/compress an audio signal by an arbitrary speech rate conversion rate Rs (Rs<1.0, 1.0<Rs), and to realize especially good sound quality in regard to a speech signal. Further, if the speech rate conversion rate Rs is 1.0, the speech rate conversion apparatus 800 may use an input audio signal as an output audio signal as it is.

(Consideration on Speech Rate Conversion Processing)

Even before the spread of digital content playback apparatuses using speech rate conversion as described above, there existed, for analog playback apparatus for cassette tapes, and the like, apparatuses which variably set the playback speed. However, with such analog playback apparatuses, the pitch of a sound changed in proportion to the playback speed, and when the playback speed was slowed, the pitch of a sound lowered, and when the playback speed was accelerated, the pitch of a sound rose.

For example, when playing back content consisting mainly of speech, such as content for language learning or news program, if the pitch of a sound changes, there is a problem that it becomes difficult to understand the content of speech. Further, as another problem, even if the pitch of a sound changes only slightly, it becomes difficult to identify the talker. In content where it is important to know which speech is uttered by which character, such as content of a drama and the like, it is a disadvantage to a user of a playback apparatus if it becomes difficult to identify a talker by voice which is played back at a different speed. Further, there is also a problem that, with content of music, even a slight change in the pitch of a sound significantly changes the mood of the music. The problem arising from the change in the pitch of a sound at the time of playing back at a different speed as described above will be hereinafter referred to as the first problem.

Variable speed playback that variably sets the playback speed while maintaining a constant pitch of a sound, which is a variable speed playback function implemented in many of the digital content playback apparatuses of recent years, solves the first problem. A particularly good result may be obtained where the range of the playback speed is about 0.5 to 4.0 times speed. Hereunder, this range where a particularly good result is obtained is referred to as a first range, and a range that is not within the first range (that is, a range which is below the lower limit of the first range and a range which is above the upper limit of the first range) will be referred to as a second range. As is easily conceived, the first range changes depending on the content. For example, if a speech of a talker of content is slow, it can be understood even if the playback speed is considerably accelerated. However, if a speech of a talker of content is fast, it becomes difficult to understand the speech even if the playback speed is only slightly accelerated.

On the other hand, there is also a demand for playing back of a sound at high speed such as 10 or 20 times speed. For example, although the variable speed playback function provided by the analog playback apparatus for cassette tapes, and the like, has the first problem, it was possible to roughly grasp the content even when playing back at high speed. The rough grasp of the content is a grasping such as "a person is talking", "music is being played" or "there is no sound". Even this level of grasping may be very useful when searching in haste for a desired portion in a target content.

Further, since the more accelerated the playback speed is, the higher the pitch of a sound becomes, it was possible to auditorily sense the approximate playback speed from the pitch of a sound. There is an advantage that, by auditorily recognizing the approximate playback speed, it becomes possible to instinctively feel the temporal positional relationship between each event in the content (for example, events such as "a person is talking", "music is being played", "there is no sound", and the like). Thus, when searching for a desired portion in a target content, it becomes easy to control the playback speed, for example, "this part seems irrelevant so let's accelerate the playback speed" or "this part seems relevant so let's slow down the playback speed". As a result, it is very useful when searching in haste for a desired portion in a target content.

(Basic Technology: Processing for Converting Pitch of Sound)

Hereunder, consideration will be given to a digital content playback apparatus in which the pitch of a sound changes in proportion to the playback speed, such as an analog playback apparatus for cassette tapes. As an example of method to be used for changing the pitch of a sound in proportion to the playback speed, there is a method for converting sampling rate, for example. Hereunder, by referring to FIGS. 12 and 13, examples of methods for converting sampling rate will be briefly described.

(Method for Reducing Sampling Rate)

Figure 12:
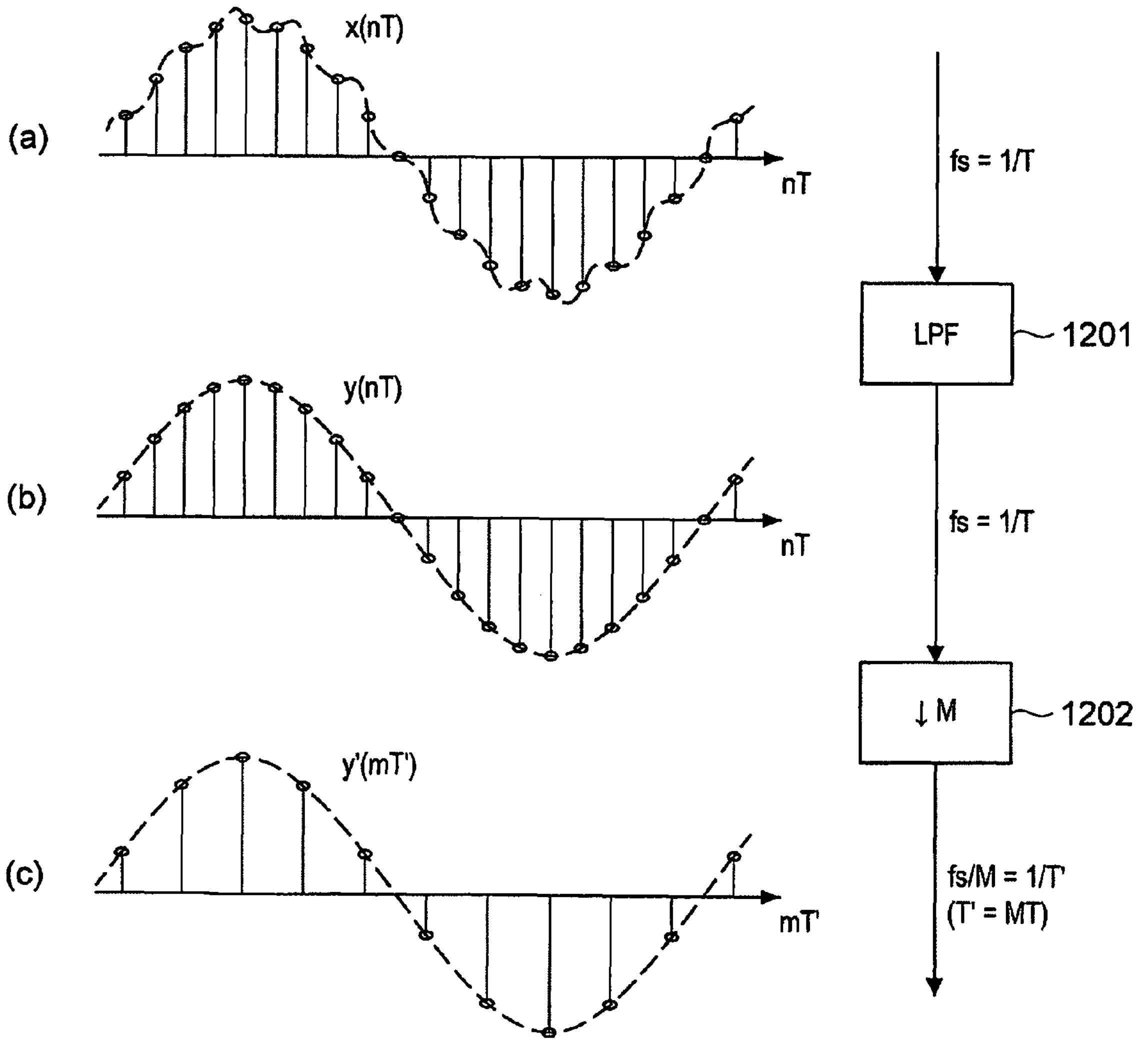
FIG. 12 is an explanatory diagram showing a method for reducing sampling rate.

FIG. 12 is an explanatory diagram showing a method for reducing sampling rate (a method of down-sampling). (A) of FIG. 12 is an original signal to be processed wherein T is a sampling cycle and fs is a sampling frequency.

In a sampling rate conversion, first, the original signal (A) passes through a low-pass filter (LPF) 1201. The low-pass filter 1201 is a filter which sets a cut-off frequency to fs/(2M). The original signal (A) is filtered by the low-pass filter 1201 to be a signal (B). As shown in (B) of FIG. 12, the waveform of the original signal (A) is made smooth by the low-pass filter 1201. Subsequently, a down-sampler 1202 thins out samples by M−1 from a signal (B) and leaves one sample for each M samples. In the example as shown in FIG. 12, M is 2. A signal (C) thus obtained has sampling rate fs/M which is 1/M times that of the original signal (A). Further, the number of samples of the signal (C) is also 1/M times that of the original signal (A). When the low-pass filter 1201 is not used in the operation as described above, an aliasing component might be generated in the signal (C). A configuration including the low-pass filter 1201 and the down-sampler 1202 as shown in FIG. 12 is called a decimator.

(Method for Increasing Sampling Rate)

Figure 13:
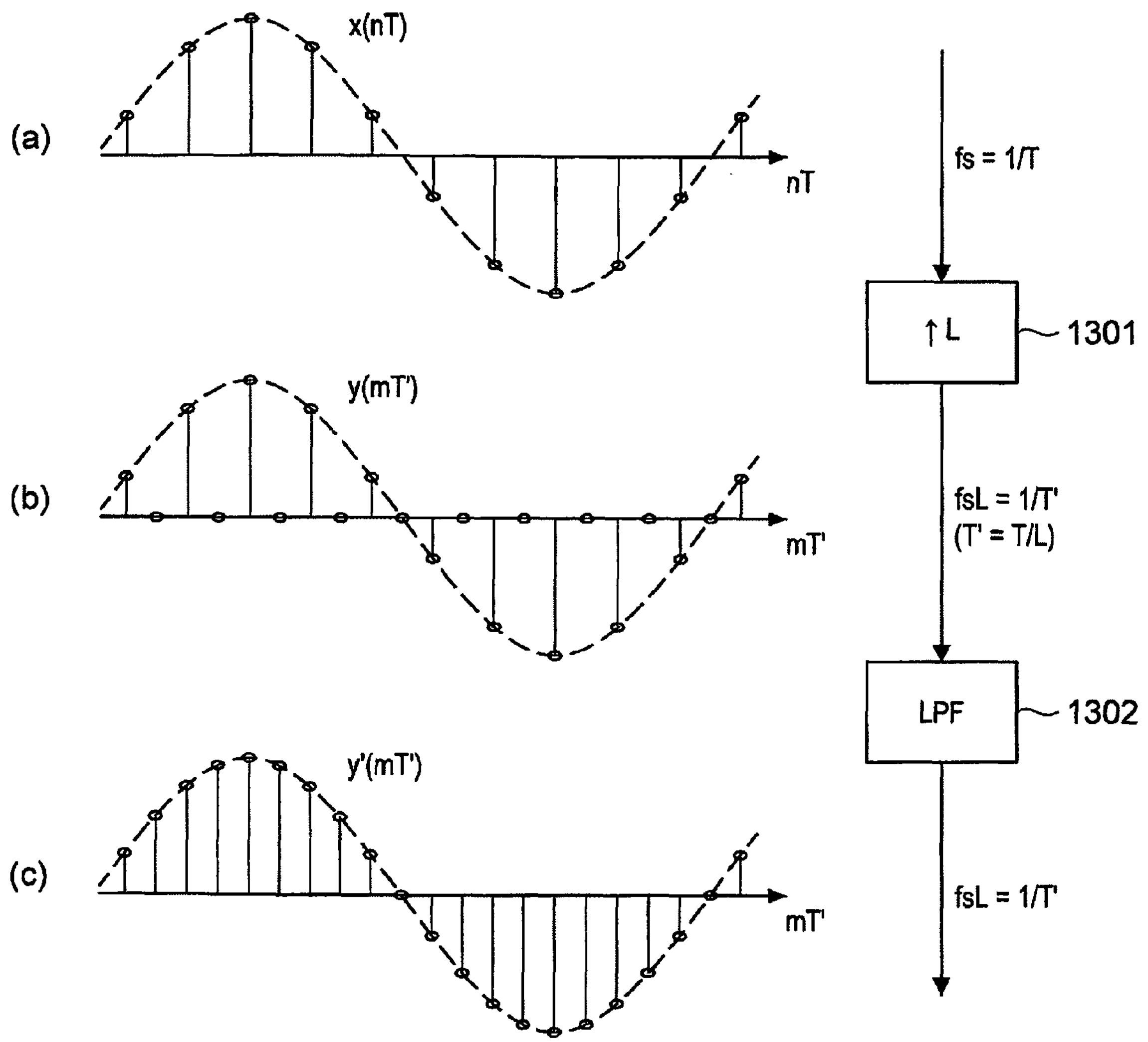
FIG. 13 is an explanatory diagram showing a method for increasing sampling rate.

FIG. 13 is an explanatory diagram showing a method for increasing sampling rate (a method of up-sampling). (A) of FIG. 13 is an original signal to be processed wherein T is a sampling cycle and fs is a sampling frequency.

In a sampling rate conversion, first, a predetermined number of zero values are inserted into an original signal (A). Specifically, an up-sampler 1301 inserts zero values of L−1 in between each sample of the original signal (A). In the example as shown in FIG. 13, L is 2. The up-sampled signal is the signal (B) in the figure. The signal (B) has sampling rate fsL which is L times that of the original signal (A). Further, the number of samples of a signal (C) is also L times that of the original signal (A). Subsequently, with the signal (B) passing through a low-pass filter 1302, the signal (C) is generated. The low-pass filter 1302 is a filter which sets a cut-off frequency to fs/2. Further, after processing the signal (B) with the low-pass filter 1302, the amplitude of the processed signal may be adjusted. When the low-pass filter 1302 is not used in the operation as described above, an imaging component is generated in the signal (C). A configuration including the up-sampler 1301 and the low-pass filter 1302 as shown in FIG. 13 is called an interpolator.

The decimator as shown in FIG. 12 and the interpolator as shown in FIG. 13 can convert only sampling rate of integral ratio. However, by combining these two, conversion of rational sampling rate is made possible. For example, a parameter L of the interpolator is made 3, and a parameter M of the decimator is made 2. An original signal is first processed by the interpolator to obtain a processed signal 1. Subsequently, the processed signal is further processed by the decimator to obtain a processed signal 2. The processed signal 2 thus obtained is up-sampled by a factor of 3, then down-sampled to ½, and thus, the sampling rate is converted to 3/2 times that of the original signal. As such, by combining the decimator and the interpolator, sampling rate conversion of L/M times is made possible.

Figures 14A, 14B, 14C:
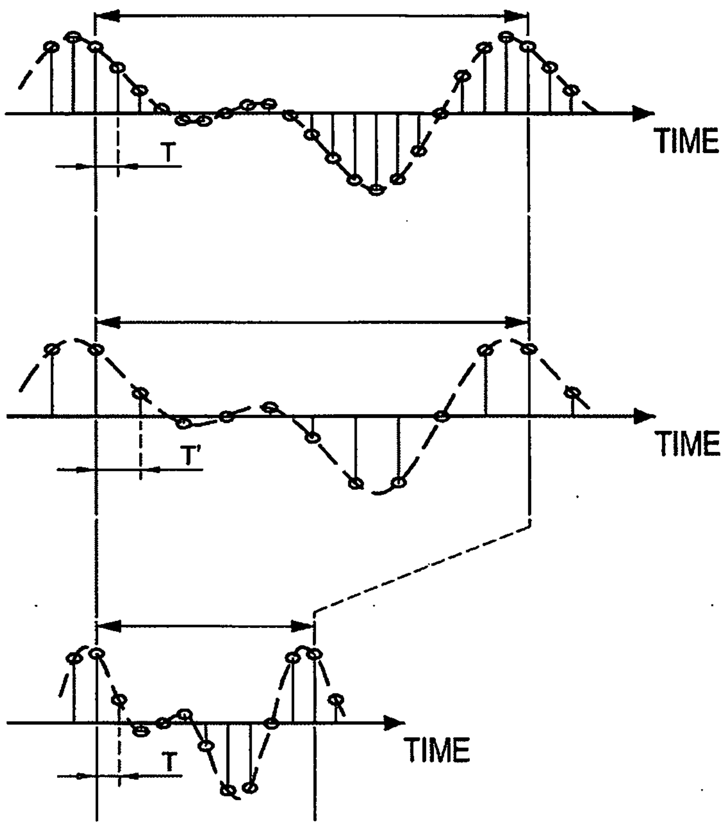
FIG. 14A is an explanatory diagram showing an example of processing for raising pitch of a sound in proportion to playback speed.
FIG. 14B is an explanatory diagram showing an example of processing for raising pitch of a sound in proportion to playback speed.
FIG. 14C is an explanatory diagram showing an example of processing for raising pitch of a sound in proportion to playback speed.

FIGS. 14A to 14C are explanatory diagrams showing an example of processing for raising pitch of a sound in proportion to playback speed. First, an original signal shown in FIG. 14A whose sampling frequency fs (=1/T) is converted to a signal shown in FIG. 14B whose sampling frequency fs' (=1/T') by converting the sampling rate in accordance with a playback speed by using a decimator and an interpolator. Subsequently, a sampling frequency of the signal shown in FIG. 14B whose sampling frequency is fs' (=1/T') is replaced by the sampling frequency fs (=1/T) of the original signal shown in FIG. 14A, and make it a signal shown in FIG. 14C. The pitch of a sound of the signal shown in FIG. 14C thus obtained is higher than the original signal shown in FIG. 14A by the variation amount of the playback speed. The examples as shown in FIGS. 14A to 14C show examples where the playback speed is 2 times. The sampling frequency of the signal shown in FIG. 14B is ½ times the sampling frequency of the original signal shown in FIG. 14A. Further, the pitch of a sound of the signal shown in FIG. 14C is 2 times that of the original signal shown in FIG. 14A, and the number of samples of the signal shown in FIG. 14C is ½ times that of the original signal shown in FIG. 14A.

DESCRIPTION OF THE PRESENT EMBODIMENTS

In the following description, a playback apparatus in which pitch of a sound changes in proportion to a playback speed will be referred to as "a first playback apparatus of the related art" and a playback apparatus in which a constant pitch of a sound is maintained when a playback speed is changed will be referred to as "a second playback apparatus of the related art".

(A First Playback Apparatus of Related Art)

Figure 15A:
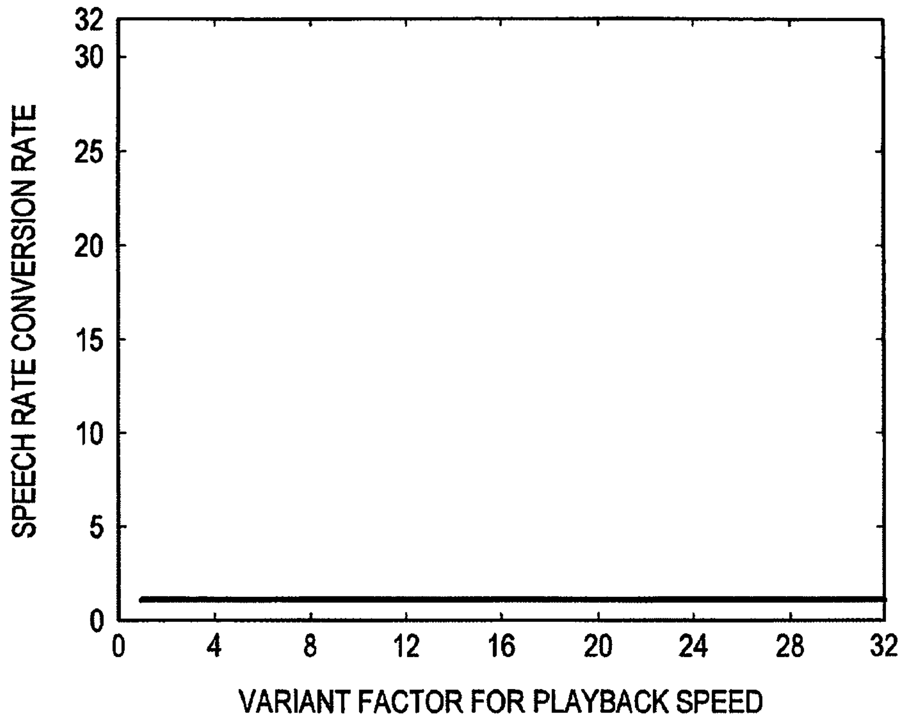
FIG. 15A is a graph chart showing the relationship between a variant factor for playback speed and a speech rate conversion rate in a first playback apparatus of the related art.
Figure 15B:
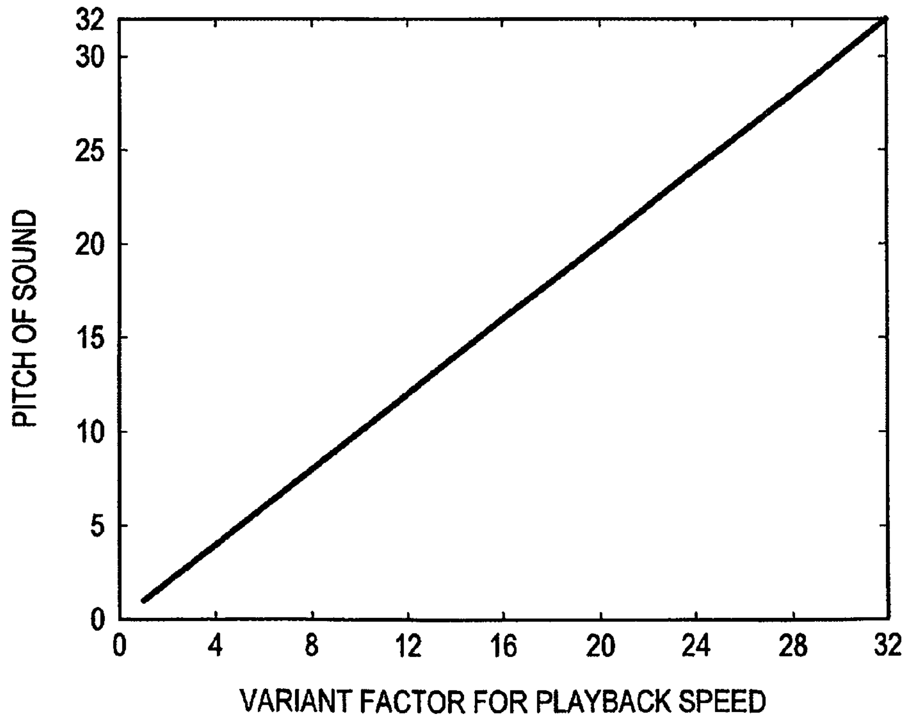
FIG. 15B is a graph chart showing the relationship between the variant factor for playback speed and pitch of a sound in the first playback apparatus of the related art.

FIG. 15A is a graph chart showing the relationship between a variant factor for playback speed and a speech rate conversion rate in the first playback apparatus of the related art, and FIG. 15B is a graph chart showing the relationship between the variant factor for playback speed and pitch of a sound in the first playback apparatus of the related art. Here, the variant factor for playback speed of FIG. 15A represents a ratio of a playback speed over a normal playback speed. For example, when playing back at 2 times the speed of a normal playback, the variant factor for playback speed is 2, and when playing back at half the speed of a normal playback, the variant factor for playback speed is 0.5. Further, the pitch of a sound of FIG. 15B represents a ratio of a frequency compared to a frequency in a normal playback. For example, when playing back with a frequency 2 times that of a normal playback, the pitch of a sound is 2, and when playing back with a frequency half of that of a normal playback, the pitch of a sound is 0.5.

In the first playback apparatus of the related art, since a speech rate conversion is not performed, a speech rate conversion rate is 1 and is constant, as shown in FIG. 15A. Further, as shown in FIG. 15B, in the first playback apparatus of the related art, the pitch of a sound is in proportion to the variant factor for playback speed, and generally, the pitch of a sound is equal to the variant factor for playback speed.

Incidentally, FIGS. 15A and 15B show only a case of playing back at or faster than the normal speed (in other words, the variant factor for playback speed of 1 or more). Hereunder, in order to avoid the argument becoming complicated, a playback speed faster than the normal speed will be discussed. However, it is apparent that the same argument may be made for a case of playing back at less than the normal speed, for example, 0.5 times speed.

(A Second Playback Apparatus of Related Art)

Figure 16A:
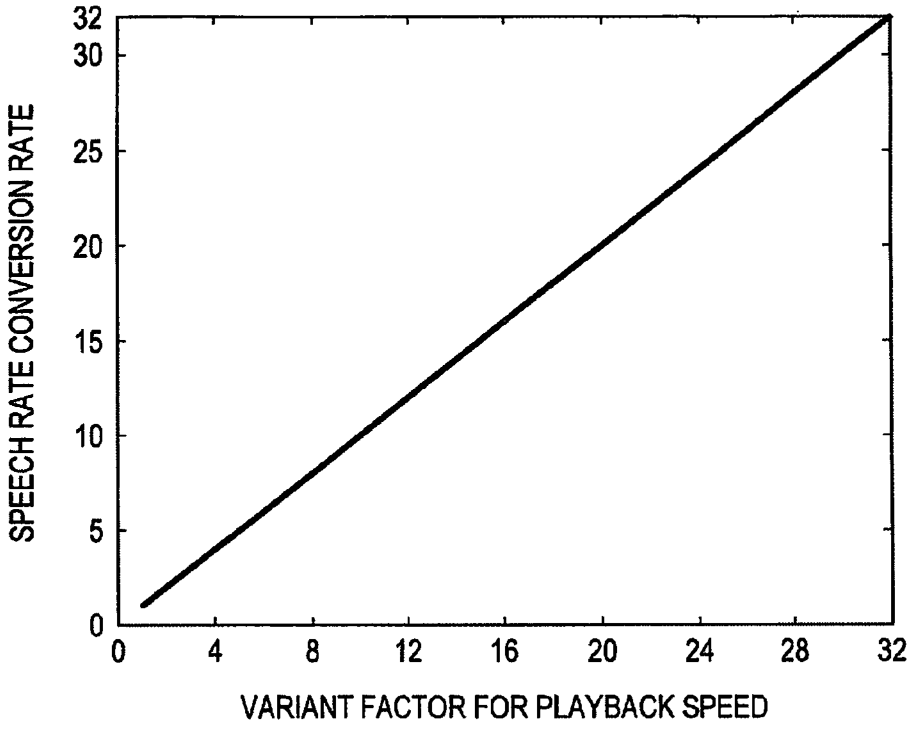
FIG. 16A is a graph chart showing the relationship between a variant factor for playback speed and a speech rate conversion rate in a second playback apparatus of the related art.
Figure 16B:
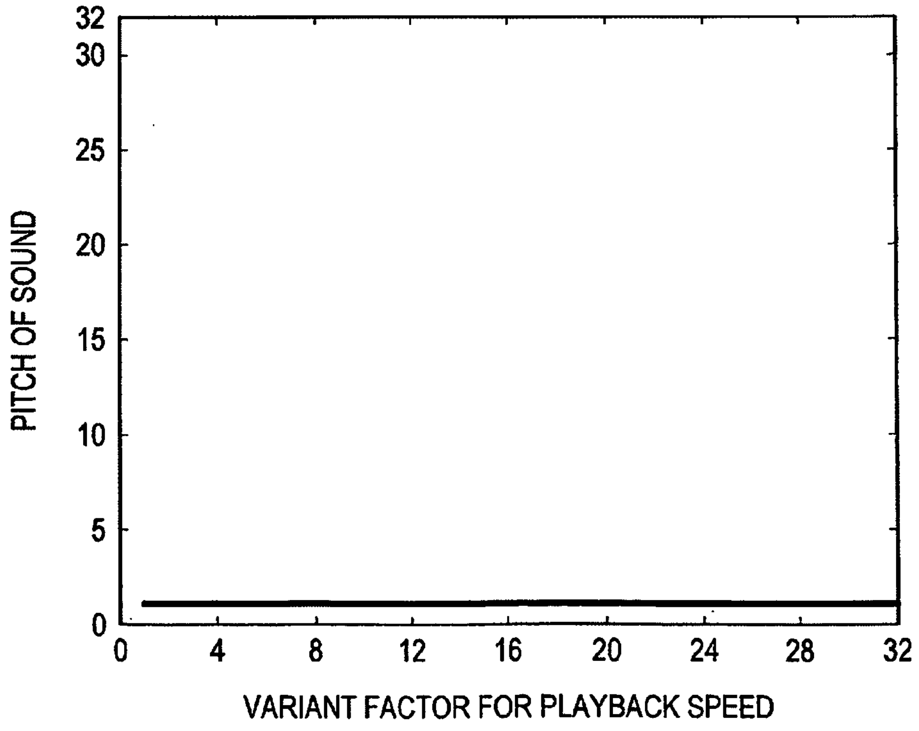
FIG. 16B is a graph chart showing the relationship between the variant factor for playback speed and pitch of a sound in the second playback apparatus of the related art.

FIG. 16A is a graph chart showing the relationship between a variant factor for playback speed and a speech rate conversion rate in a second playback apparatus of the related art, and FIG. 16B is a graph chart showing the relationship between the variant factor for playback speed and pitch of a sound in the second playback apparatus of the related art. In the second playback apparatus of the related art, since a speech rate conversion is performed, the speech rate conversion rate is in proportion to the variant factor for playback speed, as shown in FIG. 16A, and generally, the value of a speech rate conversion rate is equal to the value of a variant factor for playback speed. Further, as shown in FIG. 16B, in the second playback apparatus of the related art, the pitch of a sound is 1 and is constant.

(Reconsideration on Speech Rate Conversion Apparatus of Related Art)

In the second playback apparatus of the related art, it is difficult to auditorily sense a playback speed even if a sound with a playback speed exceeding the first range (in other words, a playback speed in the second range) is generated by speech rate conversion. For example, with a speech rate conversion algorithm such as the PICOLA described above, even if a playback speed of, for example, 10 times or 20 times is specified, it is possible to generate a corresponding sound. However, a sound obtained by the speech rate conversion is physically 10 times or 20 times speed, auditorily sensing, there is practically no difference between 10 times speed and 20 times speed. In other words, even if a speed is accelerated, a listener listening to a sound after conversion cannot auditorily sense the acceleration. Thus, there is a problem that it is difficult to auditorily sense a playback speed in the second range. Such problem will be referred to as the second problem.

As described above, with the first playback apparatus of the related art, although there is the first problem, the second problem does not arise. On the other hand, with the second playback apparatus of the related art, although the first problem is solved, the second problem arises.

Accordingly, the inventors of the present invention have conducted earnest research in light of the above problems, and have realized an information processing apparatus including a variable speed playback method enabling an easy grasp of content of a speech or specifying of a talker with a variable speed playback in the first range, and further, enabling an auditory sensing of a playback speed with a variable speed playback in the second range (in other words, a variable speed playback capable of solving both of the first and the second problems).

First Embodiment

Hereunder, by referring to FIGS. 17 to 32, an information processing apparatus according to a first embodiment of the present invention will be described in detail. Incidentally, in the following description, a variant factor for playback speed will be referred to as a first parameter, a speech rate conversion rate will be referred to as a second parameter, and pitch of a sound will be referred to as a third parameter.

(Playback Speed Conversion System)

Figure 17:
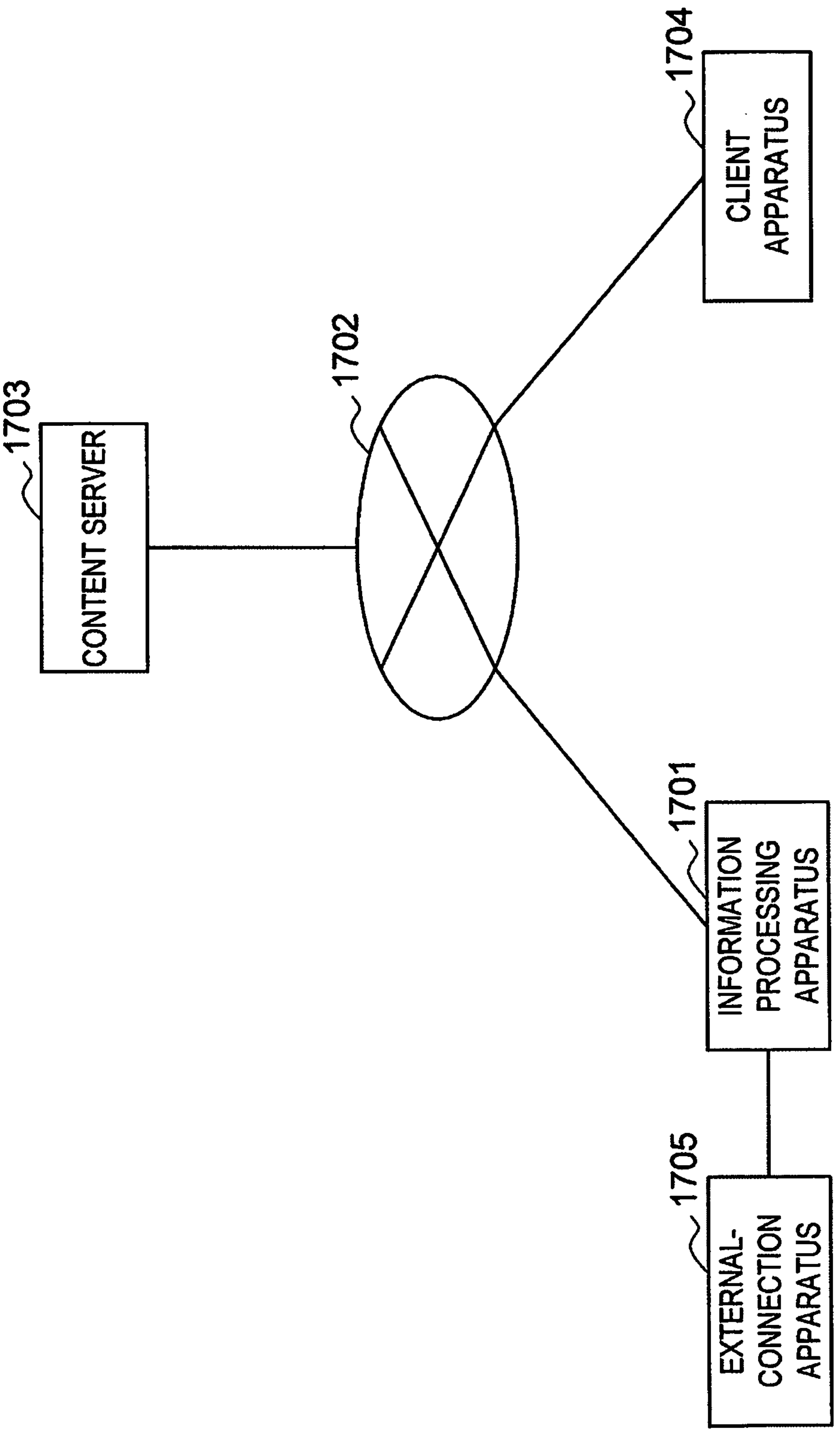
FIG. 17 is an explanatory diagram showing a playback speed conversion system including an information processing apparatus according to a first embodiment of the present invention.

FIG. 17 is an explanatory diagram showing a playback speed conversion system including an information processing apparatus 1701 according to the embodiment. As shown in FIG. 17, in the playback speed conversion system, the information processing apparatus 1701, which is an apparatus for controlling variant factor for playback speed, may be connected to a content server 1703 and a client apparatus 1704 via various networks 1702 such as the Internet and a home network. Further, various external-connection apparatuses 1705 such as AV devices such as a television, a DVD recorder and music components, a computer and the like may be directly connected to the information processing apparatus 1701 according to the embodiment.

Here, the content server 1703 is a server managing content including audio signals in association with location information such as URL (Uniform Resource Locator) and the like, metadata, etc. It may be AV devices such as a television, a DVD recorder and music components, a computer and the like, or a DMS (Digital Media Server) conforming to the DLNA (Digital Living Network Alliance) guidelines, for example. Further, a client apparatus 1704 is a device obtaining various contents from the content server 1703 to playback the same. It may be AV devices such as a television, a DVD recorder and music components, a computer and the like, or a DMP (Digital Media Player) conforming to the DLNA (Digital Living Network Alliance) guidelines.

(Configuration of the Information Processing Apparatus According to the Embodiment)

Figure 18:
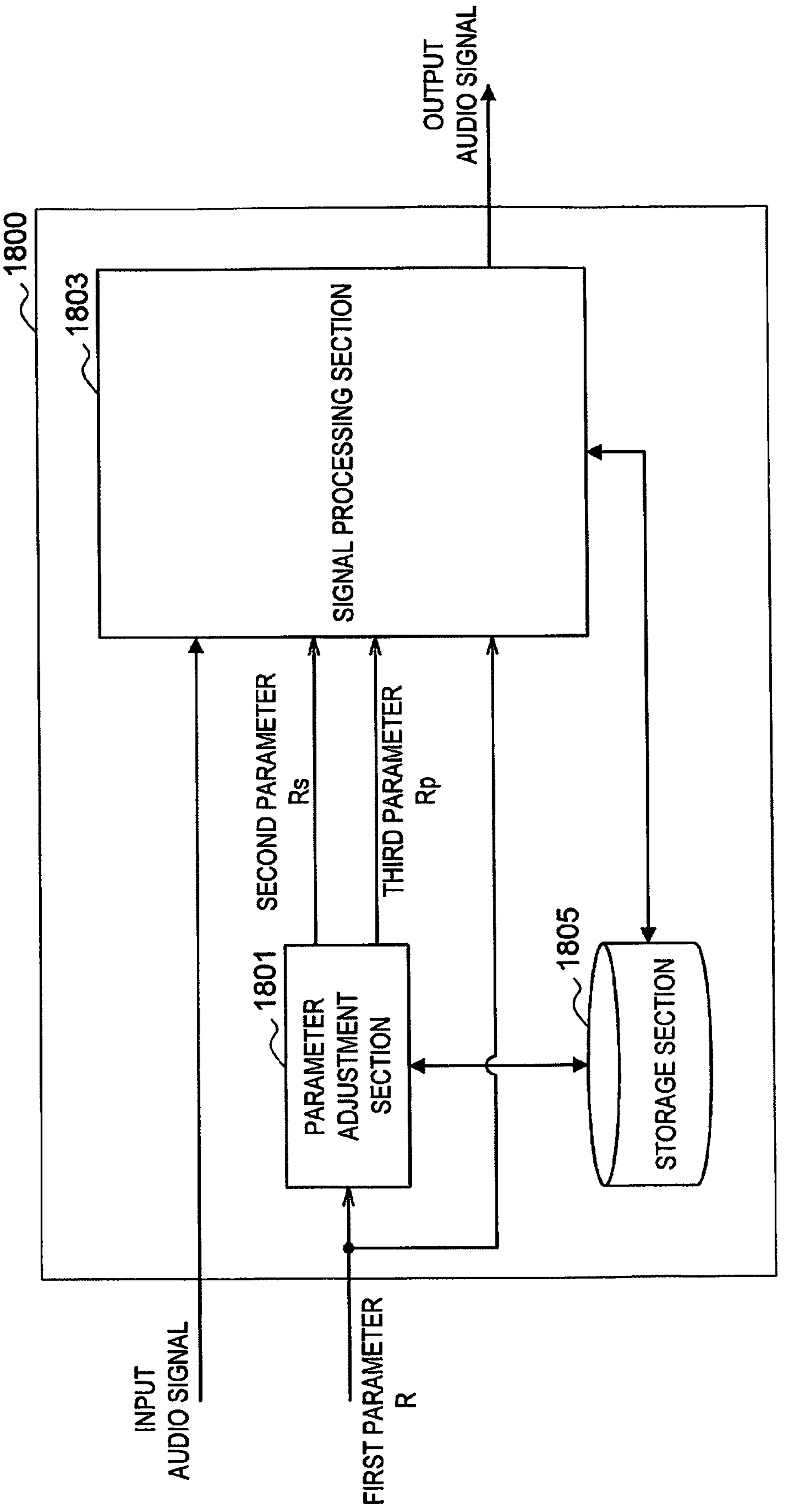
FIG. 18 is a block diagram showing a configuration of the information processing apparatus according to the embodiment.

FIG. 18 is a block diagram showing a configuration of an information processing apparatus 1800 according to the embodiment. As shown in FIG. 18, the information processing apparatus 1800 according to the embodiment mainly includes a parameter adjustment section 1801, a signal processing section 1803 and a storage section 1805. In the information processing apparatus 1800 according to the embodiment, an audio signal and the first parameter R representing a variant factor for playback speed are input, and an audio signal whose variant factor for playback speed is controlled by the firs parameter R is output as an output signal.

Incidentally, in the following description, a case is described where an audio signal is input from outside of the information processing apparatus 1800. However, it is not limited to such case, and the audio signal may be stored in the information processing apparatus 1800.

The parameter adjustment section 1801 is configured with a CPU (Central Processing Unit), a ROM (Read Only Memory), a RAM (Random Access Memory), and the like, for example, and adjusts a second parameter Rs and a third parameter Rp in accordance with the first parameter R input from the outside. A method for setting the second parameter Rs and the third parameter Rp in accordance with the first parameter R will be described later in detail. The parameter adjustment section 1801 sends the second parameter Rs and the third parameter Rp determined in accordance with the first parameter R to the signal processing section 1803 described later.

The signal processing section 1803 is configured with a CPU, a ROM, a RAM, and the like, for example, and adjusts the speech rate and the pitch of a sound of an audio signal based on the audio signal that is input and the first parameter R, and the second parameter Rs and the third parameter Rp sent from the parameter adjustment section 1801. Further, the signal processing section 1803 outputs the audio signal whose speech rate and pitch of a sound are adjusted as an output audio signal. The information processing apparatus 1800 converts such output audio signal to an analog signal by a DA converter not shown and outputs the same from an output device such a speaker.

The storage section 1805 is configured with a RAM, a storage device, and the like, for example, and stores various databases used at the time of determining the second parameter Rs and the third parameter Rp in accordance with the first parameter R, various programs to be executed by the information processing apparatus 1800, and the like. Further, the storage section 1805 may store as needed, besides these data, various parameters that needs to be saved when the information processing apparatus 1800 performs a process, intermediate progress of a processing, and the like. The parameter adjustment section 1801, the signal processing section 1803, and the like may freely perform reading or writing of data in the storage section 1805.

(Relationships of First Parameter to Second Parameter and Third Parameter)

Figure 19A:
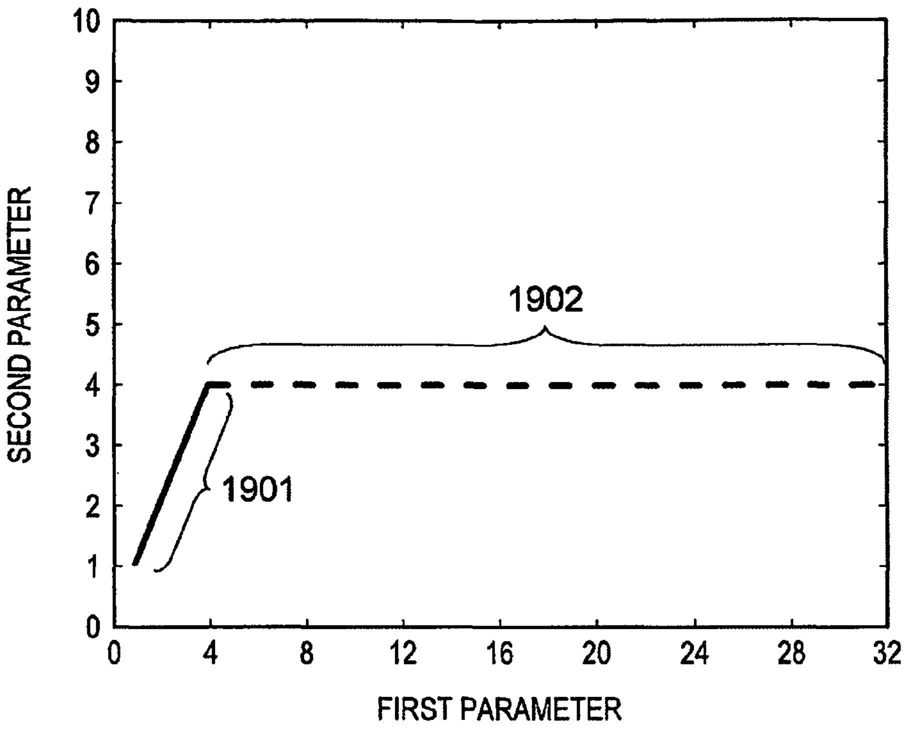
FIG. 19A is a graph chart showing the relationship between a first parameter R and a second parameter Rs.

Subsequently, by referring to FIGS. 19A and 19B, the parameter adjustment section 1801 according to the embodiment will be described in detail. FIG. 19A is a graph chart showing the relationship between the first parameter R and the second parameter Rs, and FIG. 19B is a graph chart showing the relationship between the first parameter R and the third parameter Rp.

Figure 19B:
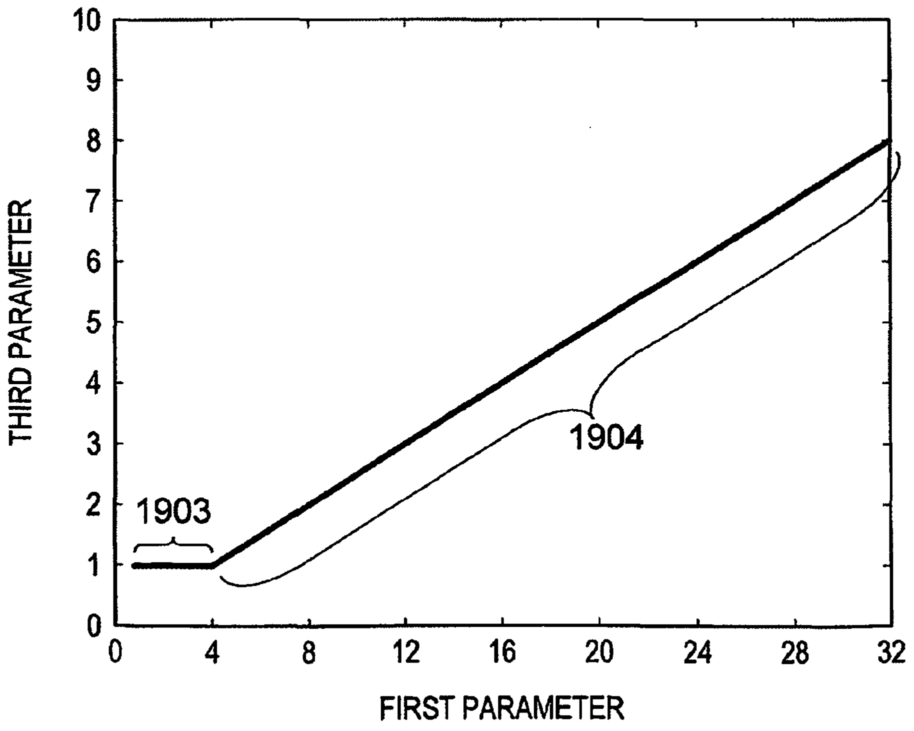
FIG. 19B is a graph chart showing the relationship between the first parameter R and a third parameter Rp.

In the examples as shown in FIGS. 19A and 19B, when the first parameter R is 1 to 4, that is, when playing back at 1 to 4 times speed, only speech rate conversion is performed (period 1901 and period 1903), and when the first parameter R is more than 4, that is, when playing back at more than 4 times speed, pitch of a sound is raised along with converting the speech rate (period 1902 and period 1904). By performing such processing, when playing back at 1 to 4 times speed, speech of a talker gradually accelerates in accordance with the playback speed, and when playing back at more than 4 times speed, the pitch of a sound is gradually raised as the speech of a talker is accelerated.

Incidentally, in FIG. 19A, the period 1902 is shown with a broken line since the value of the second parameter Rs changes depending on the method for changing the pitch of a sound. When using the methods as shown in FIGS. 12 to 14 as a method for changing the pitch of a sound, the number of samples decreases as the pitch of a sound is raised resulting in a broken line of the period 1902. However, when using a method where the number of samples does not decrease or a method where the decrease amount is small is used as a method for changing the pitch of a sound, the period 1902 will be set differently from the broken line as shown in FIG. 19A.

In the period 1903 in FIG. 19B, the third parameter Rp is 1 and is constant when the first parameter R is 1 to 4. However, the third parameter Rp in the period does not have to be constant. Further, the ascending gradient of the third parameter Rp in the period 1904 is not limited to the example as shown in the figure, and it may be arbitrary as long as it has an ascending gradient of more than 0. Further, in FIGS. 19A and 19B, although the second parameter Rs and the third parameter Rp change in a continuous manner (in analog), the second parameter Rs and the third parameter Rp may also change in a discrete manner (in digital).

(Parameter Adjustment Section 1801)

In the information processing apparatus 1800 according to the embodiment, databases of the relationships of the first parameter R to the second parameter Rs and the third parameter Rp as shown in FIGS. 19A and 19B are stored, for example, in the storage section 1805, and the parameter adjustment section 1801 determines the second parameter Rs and the third parameter Rp in accordance with the first parameter R by referring to such databases.

The parameter adjustment section 1801 determines the second parameter Rs and the third parameter Rp in accordance with the first parameter R by referring to the databases as shown in FIGS. 19A and 19B stored in the storage section 1805 under the four conditions indicated below.

Condition 1: The second parameter Rs is determined to be in proportion to the first parameter R when the first parameter R that is input exists in the period 1901 (in other words, the second parameter Rs is determined so that the second parameter Rs is equal to the first parameter R).

Condition 2: The third parameter Rp is constantly set to 1 when the first parameter R that is input exists in the period 1903.

Condition 3: The third parameter Rp increases as the first parameter R increases when the first parameter R that is input exists in the period 1904.

Condition 4: The first parameter R=the second parameter Rs×increase rate of the number of samples Rd.

Here, the period 1901 and the period 1903 correspond to the first range of the first parameter R, and the period 1902 and the period 1904 correspond to the second range of the first parameter R.

Further, when the increase rate of the number of samples in the method for changing the pitch of a sound is Rd, both of the first range and the second range of the parameter adjustment section 1801 have the characteristics as indicated by the Condition 4 described above. Here, for example, when the number of samples is 2 times, the increase rate is 2, and when the number of samples is reduced to half, the increase rate is ½.

(Method for Controlling Variant Factor for Playback Speed According to the Embodiment)

Figure 20:
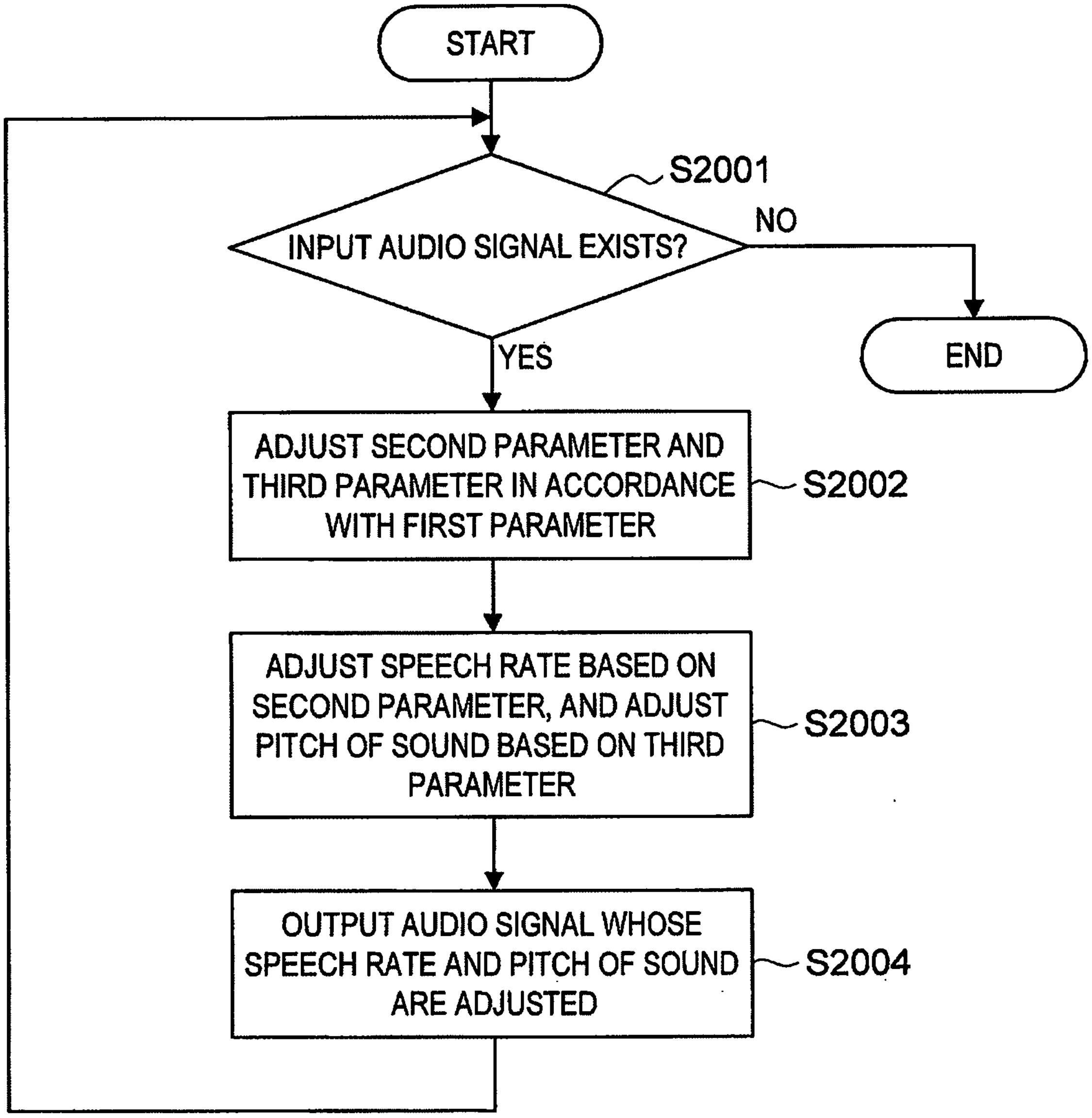
FIG. 20 is a flow chart showing a flow of the processing by the information processing apparatus according to the embodiment.

FIG. 20 is a flow chart showing a flow of the processing by the information processing apparatus 1800 according to the embodiment. First, the information processing apparatus 1800 judges whether there is an input audio signal or not (step S2001), and when there is no input audio signal, the processing is terminated. Further, when an input audio signal does exist, the parameter adjustment section 1801 of the information processing apparatus 1800 adjusts the second parameter Rs and the third parameter Rp in accordance with the first parameter R that is input (step S2002). The adjustment is performed in such a way to meet the Conditions 1 to 4 described above. Subsequently, the signal processing section 1803 of the information processing apparatus 1800 adjusts speech rate and pitch of a sound of the input audio signal in accordance with the second parameter Rs and the third parameter Rp that are adjusted (step S2003). Subsequently, the information processing apparatus 1800 outputs the audio signal whose speech rate and pitch of a sound are adjusted (step S2004). Then, returning to step S2001, the processing above is repeated.

By repeating such processing, the information processing apparatus 1800 according to the embodiment is enabled to control a variant factor for playback speed of an audio signal.

As described by referring to FIGS. 18 to 20, according to the method for controlling a variant factor for playback speed according to the embodiment, it is possible to adjust only the speech rate in the first range of the first parameter R, and adjust the pitch of a sound along with the speech rate in the second range of the first parameter R. Accordingly, the first problem is solved in the first range of the first parameter R and the second problem is solved in the second range of the first parameter R.

(Signal Processing Section 1803)

Figure 21:
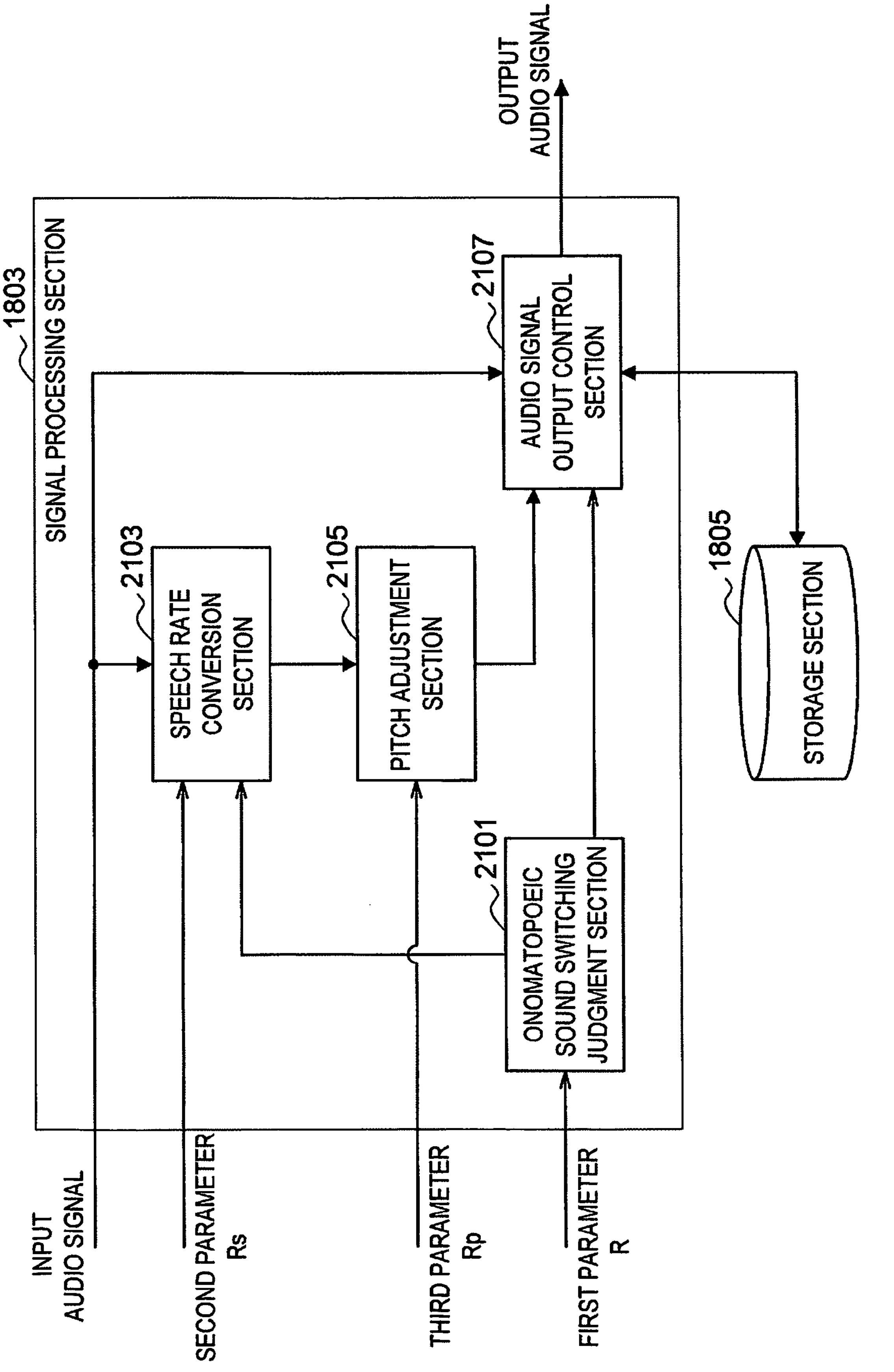
FIG. 21 is a block diagram showing a function of a signal processing section according to the embodiment.

Subsequently, by referring to FIG. 21, an example of the signal processing section 1803 according to the embodiment will be described in detail. FIG. 21 is a block diagram showing a function of the signal processing section 1803 according to the embodiment.

As shown in FIG. 21, the signal processing section 1803 according to the embodiment mainly includes, for example, an onomatopoeic sound switching judgment section 2101, a speech rate conversion section 2103, a pitch adjustment section 2105, and an audio signal output control section 2107.

The onomatopoeic sound switching judgment section 2101 is configured with a CPU, a ROM, a RAM, and the like, for example, and judges, based on the first parameter R sent, whether to perform signal processing such as conversion of speech rate and pitch of a sound on an input audio signal or to switch the input audio signal to an onomatopoeic sound without performing signal processing. Specifically, the onomatopoeic sound switching judgment section 2101 compares the level of the first parameter R sent and a predetermined threshold, and when the first parameter R is above the predetermined threshold (for example, playback at more than 20 times speed), determines to switch the audio signal to a predetermined onomatopoeic sound without performing conversion of speech rate and pitch of a sound. The onomatopoeic sound switching judgment section 2101 sends the judgment result to the speech rate conversion section 2103 and the audio signal output control section 2107 described later.

The speech rate conversion section 2103 is configured with a CPU, a ROM, a RAM, and the like, for example. An input audio signal and the second parameter Rs determined by the parameter adjustment section 1801 are input to the speech rate conversion section 2103, and the speech rate conversion section 2103 converts speech rate of the input audio signal based on the second parameter Rs. The conversion of speech rate is performed by using the algorithms as shown in FIGS. 1 to 7, for example. The speech rate conversion section 2103 sends the audio signal whose speech rate is adjusted to the pitch adjustment section 2105 described later.

Further, the speech rate conversion section 2103 does not have to perform processing for converting speech rate when it is notified of a judgment result, "switch audio signal to onomatopoeic sound", by the onomatopoeic sound switching judgment section 2101.

The pitch adjustment section 2105 is configured with a CPU, a ROM, a RAM, and the like, for example, and adjusts pitch of a sound of an audio signal based on the audio signal whose speech rate is adjusted that is sent from the speech rate conversion section 2103 and the third parameter Rp sent from the parameter adjustment section 1801. An arbitrary method of pitch conversion, for example, the methods as shown in FIGS. 12 to 14C, may be used for the adjustment of pitch. When the adjustment of pitch of a sound is completed, the pitch adjustment section 2105 outputs the audio signal whose speech rate and pitch of a sound are adjusted to the audio signal output control section 2107 described later.

Incidentally, when the methods as shown in FIGS. 12 to 14C are used by the pitch adjustment section 2105, the increase rate Rd of the number of samples in the method for changing pitch of a sound is in proportion to the pitch of a sound, and the increase rate Rd of the number of samples becomes equal to the ascending rate of the pitch of a sound. That is, a relation of Rd=the third parameter Rp is established.

The audio signal output control section 2107 is configured with a CPU, a ROM, a RAM, and the like, for example, and controls output when outputting the audio signal that is input or the audio signal sent from the pitch adjustment section 2105. When it is notified of a judgment result, "switch audio signal to onomatopoeic sound", by the onomatopoeic sound switching judgment section 2101, the audio signal output control section 2107 switches the audio signal that is input to a predetermined onomatopoeic sound that is stored in the storage section 1805, for example, and outputs the signal. Further, when it is notified of a judgment result, "not to switch audio signal to onomatopoeic sound", by the onomatopoeic sound switching judgment section 2101, the audio signal output control section 2107 outputs the audio signal sent from the pitch adjustment section 2105.

Further, the audio signal output control section 2107 can adjust the audio volume of the audio signal to be output. The adjustment of the audio volume of the audio signal is performed by adjusting an absolute value of a signal waveform of an intended audio signal. The audio signal output control section 2107 may turn down the audio volume of the audio signal to be output when the variant factor for playback speed exceeds 1. Further, the audio signal output control section 2107 may control the audio volume regardless of the playback speed.

Figure 22A:
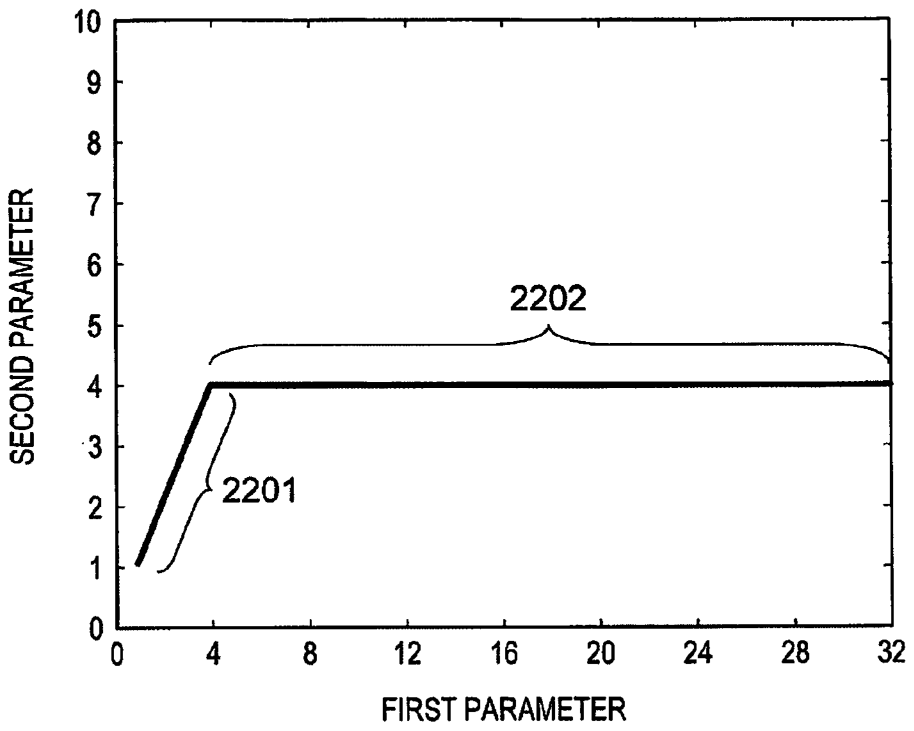
FIG. 22A is a graph chart showing the relationship between the first parameter R and the second parameter Rs.
Figure 22B:
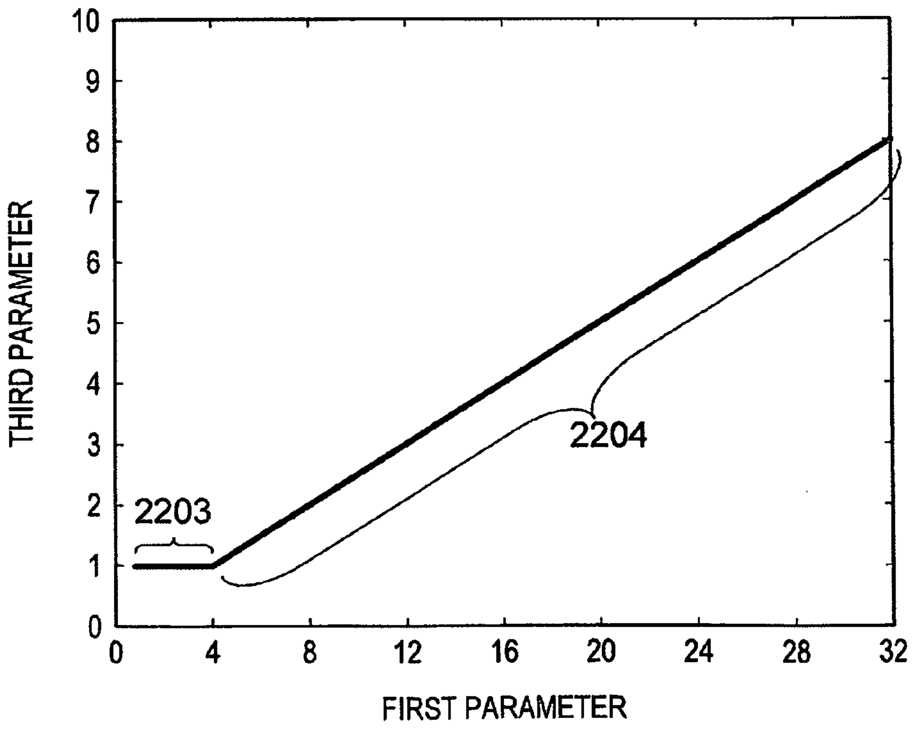
FIG. 22B is a graph chart showing the relationship between the first parameter R and the third parameter Rp.

FIGS. 22A and 22B are explanatory diagrams showing examples of methods for adjusting a parameter performed by the parameter adjustment section 1801 of the information processing apparatus 1800 including the signal processing section 1803 as shown in FIG. 21. FIG. 22A is a graph chart showing the relationship between the first parameter R and the second parameter Rs, and FIG. 22B is a graph chart showing the relationship between the first parameter R and the third parameter Rp.

As shown in FIG. 22A, a graph chart in which the horizontal axis represents the first parameter R and the vertical axis represents the second parameter Rs is configured with at least two regions with different ascending rates (in other words, gradients of the graph chart) of the second parameter Rs. Similarly, as shown in FIG. 22B, a graph chart in which the horizontal axis represents the first parameter R and the vertical axis represents the third parameter Rp is configured with at least two regions with different ascending rates of the third parameter Rp.

When the pitch adjustment section 2105 of the signal processing section 1803 adjusts the pitch with the methods as shown in FIGS. 12 to 14C, the parameter adjustment section 1801 determines the second parameter Rs and the third parameter Rp in accordance with the first parameter R by referring to the databases as shown in FIGS. 22A and 22B stored in the storage section 1805 under the four conditions indicated below.

Condition 1: The second parameter Rs is determined to be in proportion to the first parameter R when the first parameter R that is input exists in a period 2201 (in other words, the second parameter Rs is determined so that the second parameter Rs is equal to the first parameter R).

Condition 2: The third parameter Rp is constantly set to 1 when the first parameter R that is input exists in a period 2203.

Condition 3: The third parameter Rp increases as the first parameter R increases when the first parameter R that is input exists in a period 2204.

Condition 4': The first parameter R=the second parameter Rs×the third parameter Rp is established in both the first range and the second range.

Here, the period 2201 and the period 2203 correspond to the first range of the first parameter R, and the period 2202 and the period 2204 correspond to the second range of the first parameter R.

In the examples as shown in FIGS. 22A and 22B, when the first parameter R is 1 to 4, that is, when playing back at 1 to 4 times speed, only speech rate conversion is performed, and when the first parameter R is more than 4, that is, when playing back at more than 4 times speed, pitch of a sound is raised along with converting the speech rate. By performing such processing, when playing back at 1 to 4 times speed, speech of a talker gradually accelerates in accordance with the playback speed, and when playing back at more than 4 times speed, the pitch of a sound is gradually raised as the speech of a talker is accelerated.

Heretofore, an example of the function of the information processing apparatus 1800 according to the embodiment has been described. Each of the above structural elements may be configured with versatile components or circuits, or may be configured with hardwares specializing in functions of each of the structural elements. Further, a CPU or the like may perform all the functions. Accordingly, it is possible to change the configuration to be used as appropriate in accordance with the various technical levels of carrying out the embodiment.

(Signal Processing Method According to the Embodiment)

Figure 23:
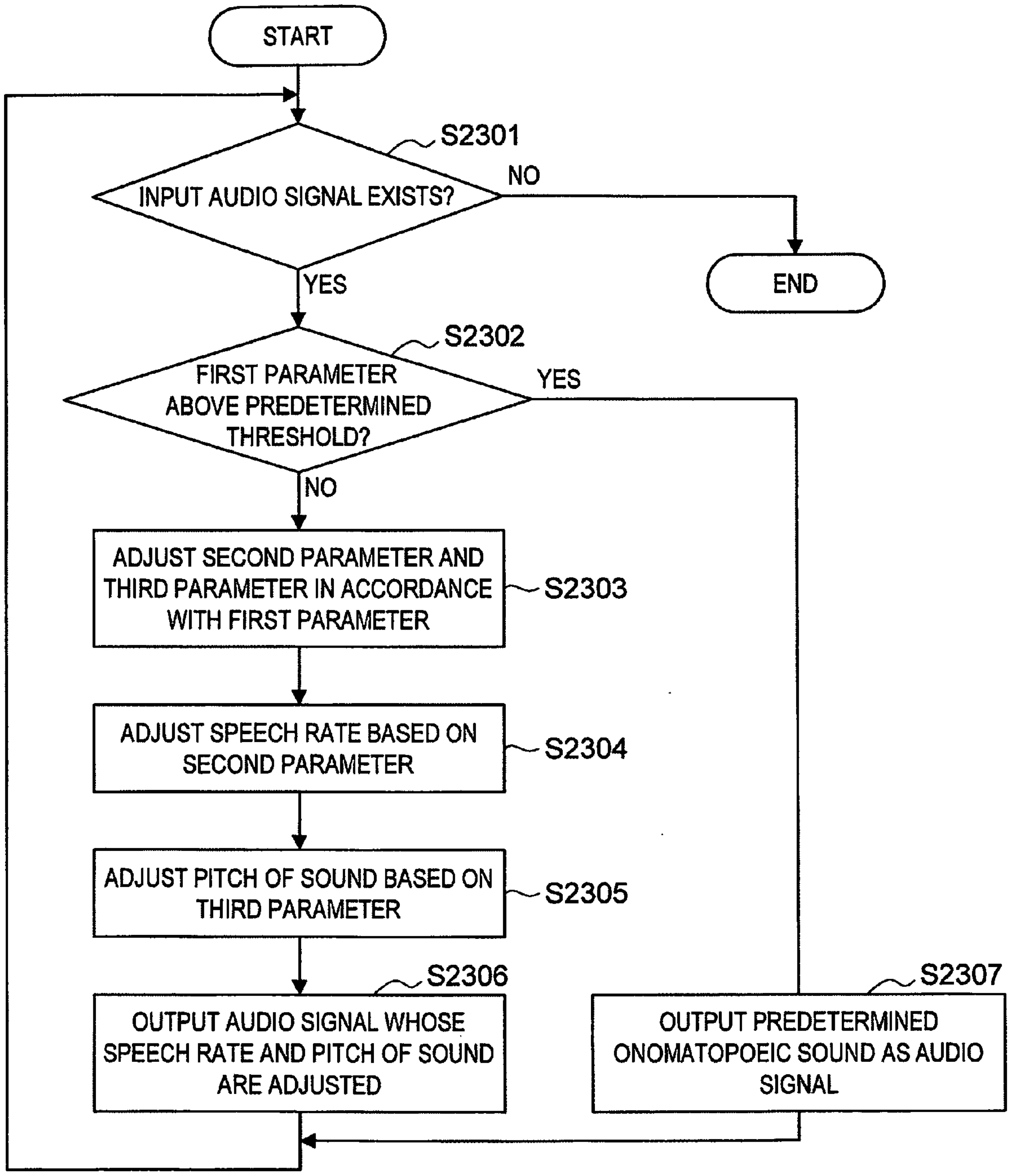
FIG. 23 is a flow chart showing a signal processing method according to the embodiment.

Subsequently, by referring to FIG. 23, a signal processing method according to the embodiment will be described in detail. FIG. 23 is a flow chart showing a signal processing method according to the embodiment.

First, the information processing apparatus 1800 judges whether there is an input audio signal or not (step S2301), and terminates the processing when there is no input audio signal. Further, when an input audio signal does exist, the onomatopoeic sound switching judgment section 2101 of the signal processing section 1803 judges whether the first parameter R that is input is above the predetermined threshold or not (step S2302). When the first parameter R is less than the predetermined threshold, the parameter adjustment section 1801 adjusts the second parameter Rs and the third parameter Rp in accordance with the first parameter R that is input (step S2303), and sends the parameters to the signal processing section 1803. The speech rate conversion section 2103 of the signal processing section 1803 adjusts speech rate of the input audio signal based on the second parameter Rs sent (step S2304), and outputs the audio signal whose speech rate is adjusted to the pitch adjustment section 2105. The pitch adjustment section 2105 adjusts pitch of a sound of the audio signal sent from the speech rate conversion section 2103 based on the third parameter Rp sent (step S2305). The audio signal whose speech rate and pitch of a sound are adjusted is sent to the audio signal output control section 2107, and the audio signal output control section 2107 outputs the audio signal whose speech rate and pitch of a sound are adjusted (step S2306). Then, returning to step S2301, the processing above is repeated.

On the other hand, when it is judged by the onomatopoeic sound switching judgment section 2101 that the first parameter R is above the predetermined threshold, the audio signal output control section 2107 outputs a predetermined onomatopoeic sound stored in the storage section 1805 and the like, and outputs the same as an audio signal (step S2307). Then, returning to step S2301, the processing above is repeated.

By repeating such processing, the information processing apparatus 1800 according to the embodiment is enabled to control a variant factor for playback speed of an audio signal in such a way that a playback speed after conversion can be auditorily recognized.

Subsequently, focusing on the number of samples included in an audio signal to be process, an example of a signal processing performed by the information processing apparatus 1800 according to the embodiment will be described in detail. FIGS. 24A to 24D are explanatory diagrams showing an example of a signal processing performed by the information processing apparatus 1800 according to the embodiment in unit of samples.

Figures 24A, 24B, 24C, 24D:
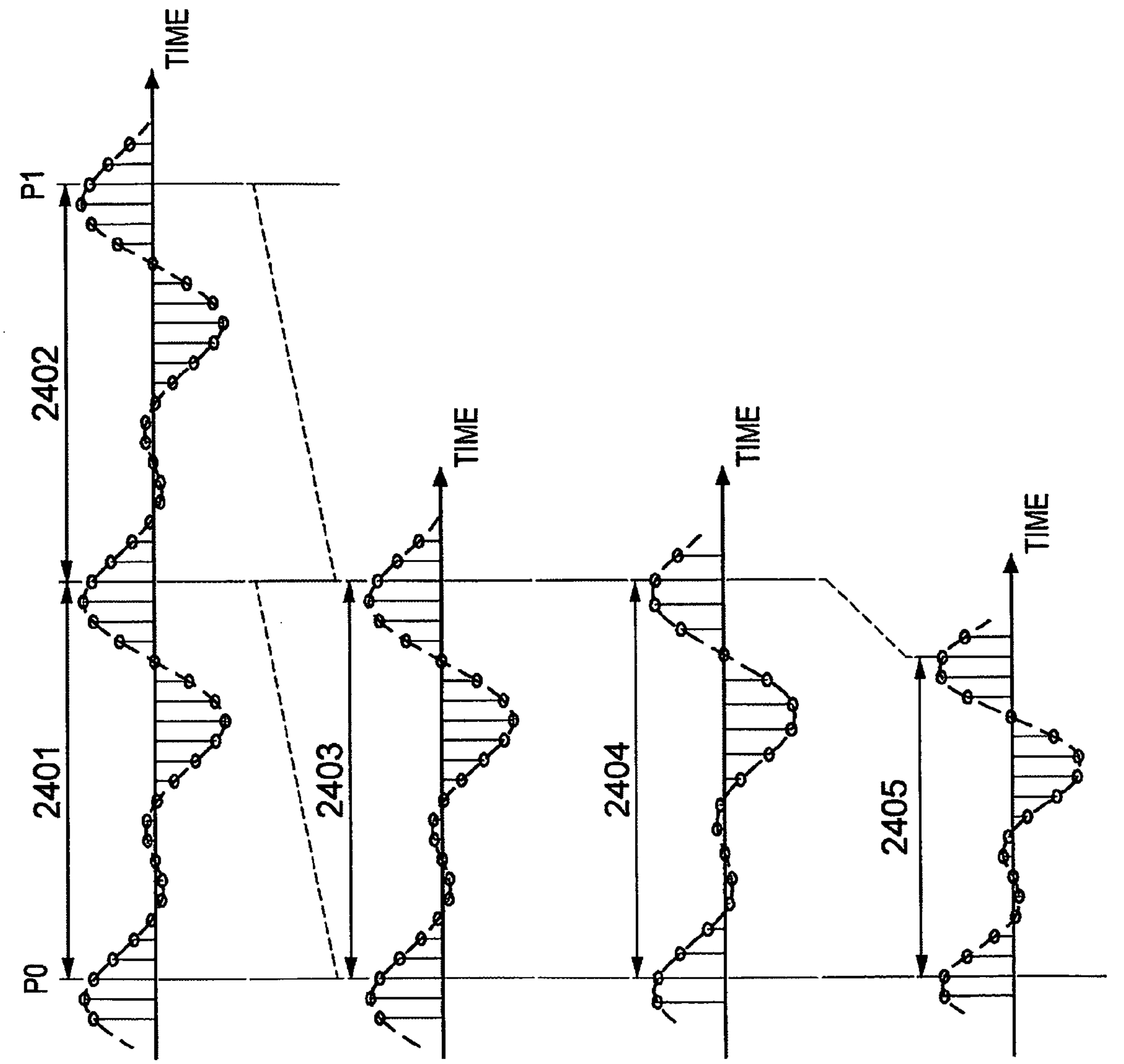
FIG. 24A is an explanatory diagram showing an example of a signal processing performed by the information processing apparatus according to the embodiment in unit of samples.
FIG. 24B is an explanatory diagram showing an example of a signal processing performed by the information processing apparatus according to the embodiment in unit of samples.
FIG. 24C is an explanatory diagram showing an example of a signal processing performed by the information processing apparatus according to the embodiment in unit of samples.
FIG. 24D is an explanatory diagram showing an example of a signal processing performed by the information processing apparatus according to the embodiment in unit of samples.

In the examples as shown in FIGS. 24A to 24D, the second parameter Rs is adjusted to be 2.0 and the third parameter Rp is adjusted to be 1.25 when the first parameter R is 2.5. It is assumed that, in an original signal shown in FIG. 24A, as a result of detecting a similar-waveform length with a processing start point P0 of speech rate conversion as a starting point, a period 2401 and a period 2402 are chosen as a cross-fade period. A cross-fade signal of a signal of the period 2401 and a signal of the period 2402 is obtained and is placed in the period 2402. Subsequently, a signal of the period 2402 is copied to a signal shown in FIG. 24B of the period 2403, and the processing start position of speech rate conversion is moved from the position P0 to a position P1. With the conversion of the original signal shown in FIG. 24A to the signal shown in FIG. 24B, the speech rate becomes 2 times speed (the number of samples becomes ½ times), and the pitch of a sound remains unchanged. Subsequently, a sampling frequency of the signal shown in FIG. 24B is made ⅘ times to obtain a signal shown in FIG. 24C. When the sampling frequency is made ⅘ times, the number of samples also becomes ⅘ times. By replacing the sampling frequency of the signal shown in FIG. 24C with a sampling frequency of the original signal shown in FIG. 24A, a signal shown in FIG. 24D is obtained. The number of samples of the signal shown in FIG. 24D is 0.4=(½)×(⅘) times the number of samples of the original signal shown in FIG. 24A, and the pitch of a sound is 5/4 times. In other words, the playback speed is 2.5=2×(5/4) times speed and the pitch of a sound is 1.25 times.

Figures 25A, 25B, 25C, 25D:
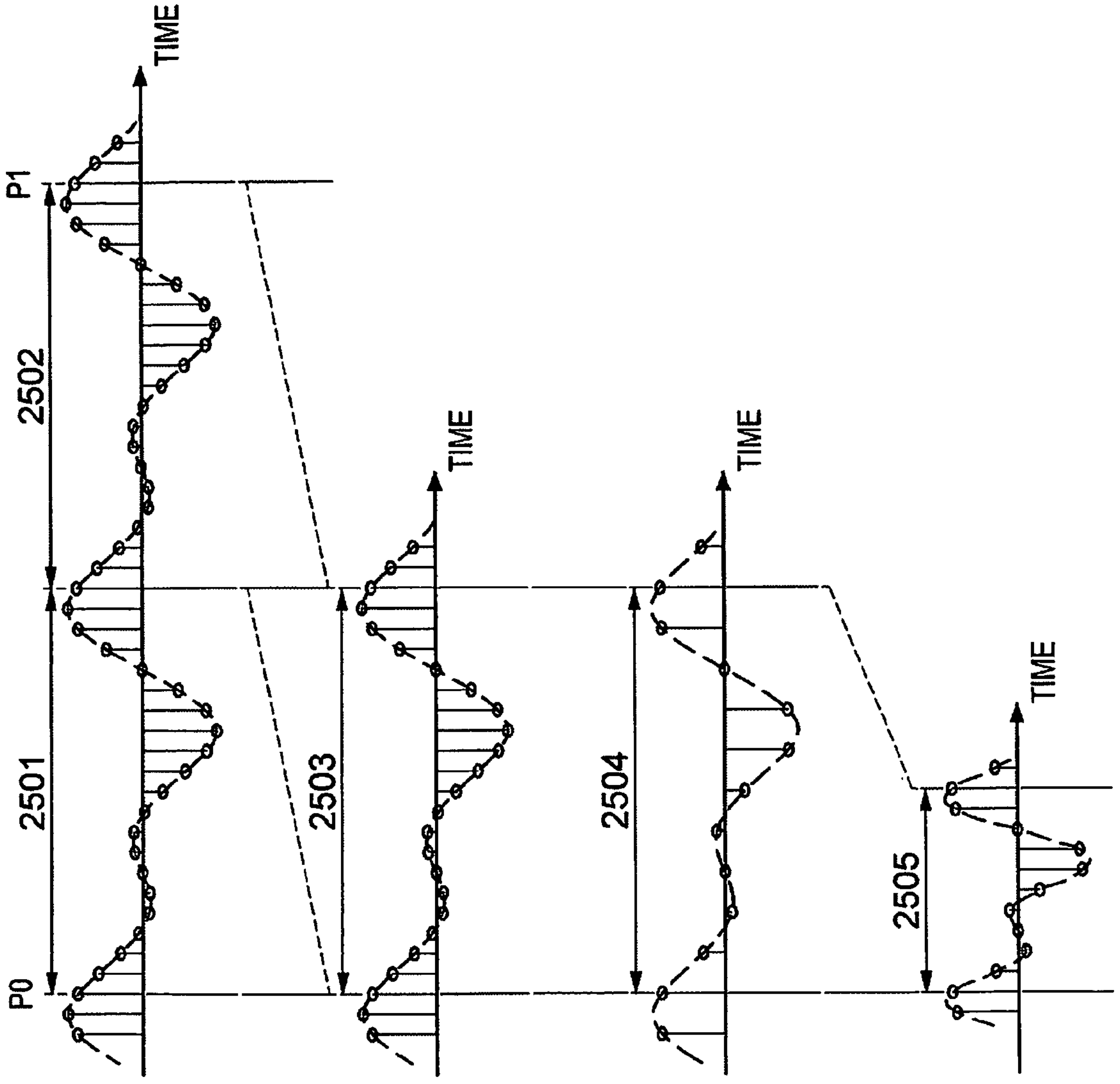
FIG. 25A is an explanatory diagram showing another example of the signal processing performed by the information processing apparatus according to the embodiment in unit of samples.
FIG. 25B is an explanatory diagram showing another example of the signal processing performed by the information processing apparatus according to the embodiment in unit of samples.
FIG. 25C is an explanatory diagram showing another example of the signal processing performed by the information processing apparatus according to the embodiment in unit of samples.
FIG. 25D is an explanatory diagram showing another example of the signal processing performed by the information processing apparatus according to the embodiment in unit of samples.

FIGS. 25A to 25D are explanatory diagrams showing another examples of the signal processing performed by the information processing apparatus according to the embodiment in unit of samples. In the examples as shown in FIGS. 25A to 25D, the second parameter Rs is adjusted to be 2.0 and the third parameter Rp is adjusted to be 2.0 when the first parameter R is 4.0. It is assumed that, in an original signal shown in FIG. 25A, as a result of detecting a similar-waveform length with a processing start point P0 of speech rate conversion as a starting point, a period 2501 and a period 2502 are chosen as a cross-fade period. A cross-fade signal of a signal of the period 2501 and a signal of the period 2502 is obtained and is placed in the period 2502. Subsequently, a signal of the period 2502 is copied to a signal shown in FIG. 25B of the period 2503, and the processing start position of speech rate conversion is moved from the position P0 to a position P1. With the conversion of the original signal shown in FIG. 25A to the signal shown in FIG. 25B, the speech rate becomes 2 times speed (the number of samples becomes ½ times), and the pitch of a sound remains unchanged. Subsequently, a sampling frequency of the signal shown in FIG. 25B is made ½ times to obtain a signal shown in FIG. 25C. When the sampling frequency is made ½ times, the number of samples also becomes ½ times. By replacing the sampling frequency of the signal shown in FIG. 25C with a sampling frequency of the original signal shown in FIG. 25A, a signal shown in FIG. 25D is obtained. The number of samples of the signal shown in FIG. 25D is 0.25=(½)×(½) times the number of samples of the original signal shown in FIG. 25A, and the pitch of a sound is 2 times. In other words, the playback speed is 4.0=2×2 times speed and the pitch of a sound is 2.0 times.

Figure 26A:
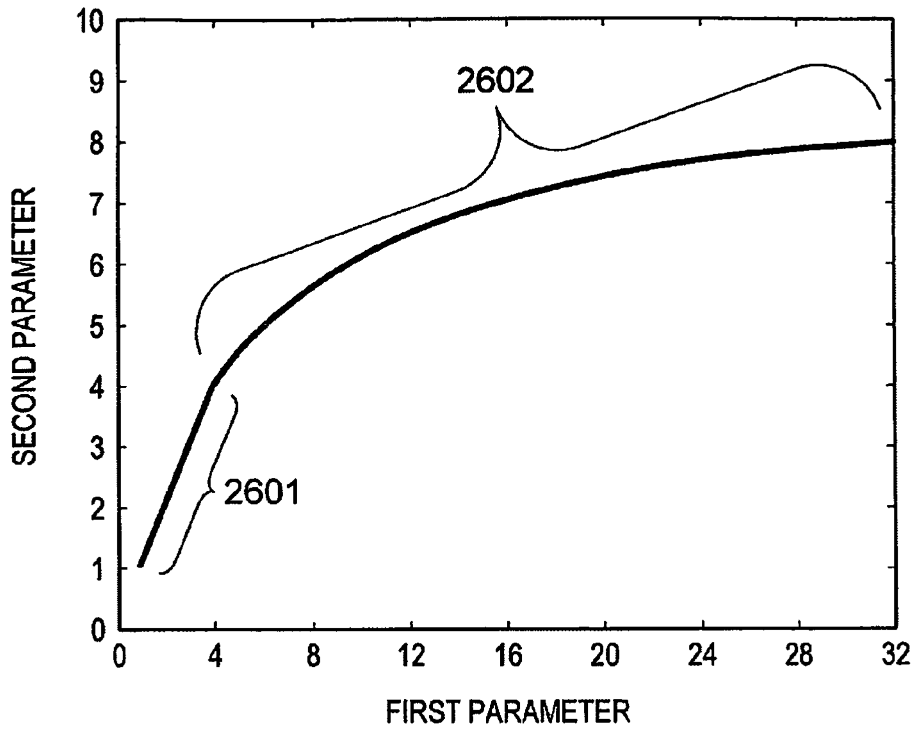
FIG. 26A is a graph chart showing the relationship between the first parameter R and the second parameter Rs.
Figure 26B:
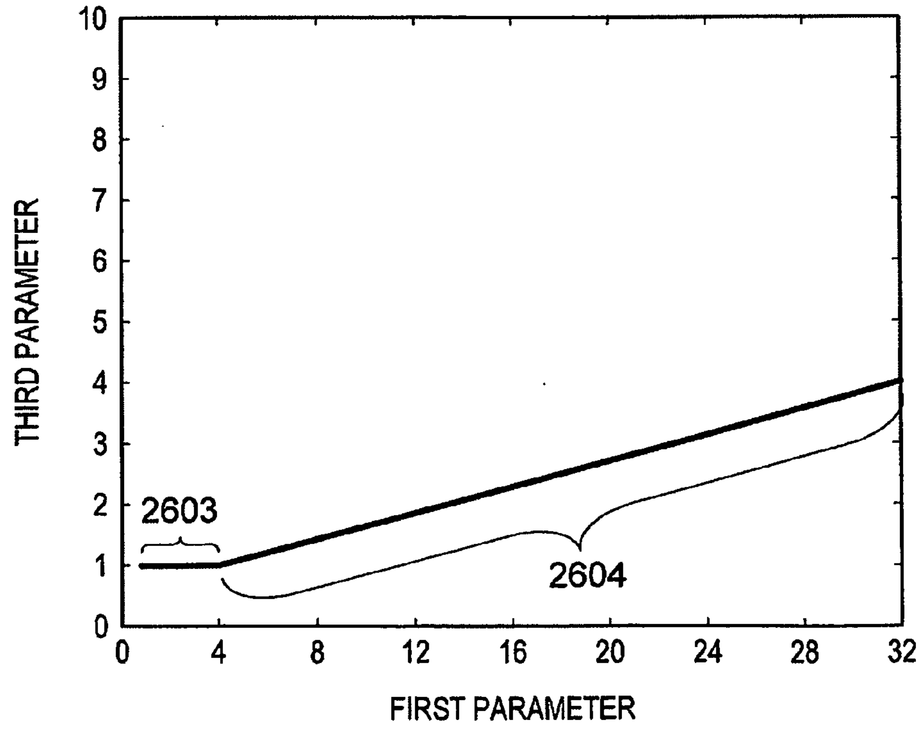
FIG. 26B is a graph chart showing the relationship between the first parameter R and the third parameter Rp.

FIGS. 26A and 26B are graph charts showing other examples of methods for adjusting a parameter performed by the parameter adjustment section 1801. FIG. 26A is a graph chart showing the relationship between the first parameter R and the second parameter Rs, and FIG. 26B is a graph chart showing the relationship between the first parameter R and the third parameter Rp.

As shown in FIG. 26A, a graph chart in which the horizontal axis represents the first parameter R and the vertical axis represents the second parameter Rs is configured with at least two regions with different ascending rates (in other words, gradients of the graph chart) of the second parameter Rs. Similarly, as shown in FIG. 26B, a graph chart in which the horizontal axis represents the first parameter R and the vertical axis represents the third parameter Rp is configured with at least two regions with different ascending rates of the third parameter Rp.

In this case, the parameter adjustment section 1801 determines the second parameter Rs and the third parameter Rp in accordance with the first parameter R by referring to the databases as shown in FIGS. 26A and 26B stored in the storage section 1805 under the five conditions indicated below.

Condition 1: The second parameter Rs is determined to be in proportion to the first parameter R when the first parameter R that is input exists in a period 2601 (in other words, the second parameter Rs is determined so that the second parameter Rs is equal to the first parameter R).

Condition 2: The third parameter Rp is constantly set to 1 when the first parameter R input exists in a period 2603.

Condition 3: The third parameter Rp increases as the first parameter R increases when the first parameter R that is input exists in a period 2604.

Condition 4': The first parameter R=the second parameter Rs×the third parameter Rp is established in both the first range and the second range.

Condition 5: The second parameter Rs increases as the first parameter R increases when the first parameter R that is input exists in a period 2602 (in other word, a differential coefficient of a curved line showing the change in the second parameter Rs is greater than 0).

Here, the period 2601 and the period 2603 correspond to the first range of the first parameter R, and the period 2602 and the period 2604 correspond to the second range of the first parameter R.

In the examples as shown in FIGS. 26A and 26B, when the first parameter R is 1 to 4, that is, when playing back at 1 to 4 times speed, only speech rate conversion is performed, and when the first parameter R is more than 4, that is, when playing back at more than 4 times speed, pitch of a sound is raised along with converting the speech rate. By performing such processing, when playing back at 1 to 4 times speed, speech of a talker gradually accelerates in accordance with the playback speed, and when playing back at more than 4 times speed, the pitch of a sound is gradually raised as the speech of a talker is accelerated.

In the examples as shown in FIGS. 26A and 26B, unlike the examples as shown in FIGS. 22A and 22B, the second parameter Rs increases as the first parameter R increases. In other word, a differential coefficient of a curved line showing the change in the second parameter Rs is more than 0. In the period 2202 in FIG. 22A, the second parameter Rs is constant in spite of the increase in the first parameter R. In other words, a differential coefficient of the second parameter Rs is 0. In such a case, a speech rate conversion rate of does not change in spite of the acceleration of the playback speed, and discomfort may be experienced regarding a sound being played back. On the other hand, in the period 2602 in FIG. 26A, since the second parameter Rs increases as the first parameter R increases (since the differential coefficient is greater than 0), a speech rate conversion rate can be prevented from not changing in spite of the acceleration of the playback speed, and discomfort caused by the a sound being played back can be prevented.

Figure 27A:
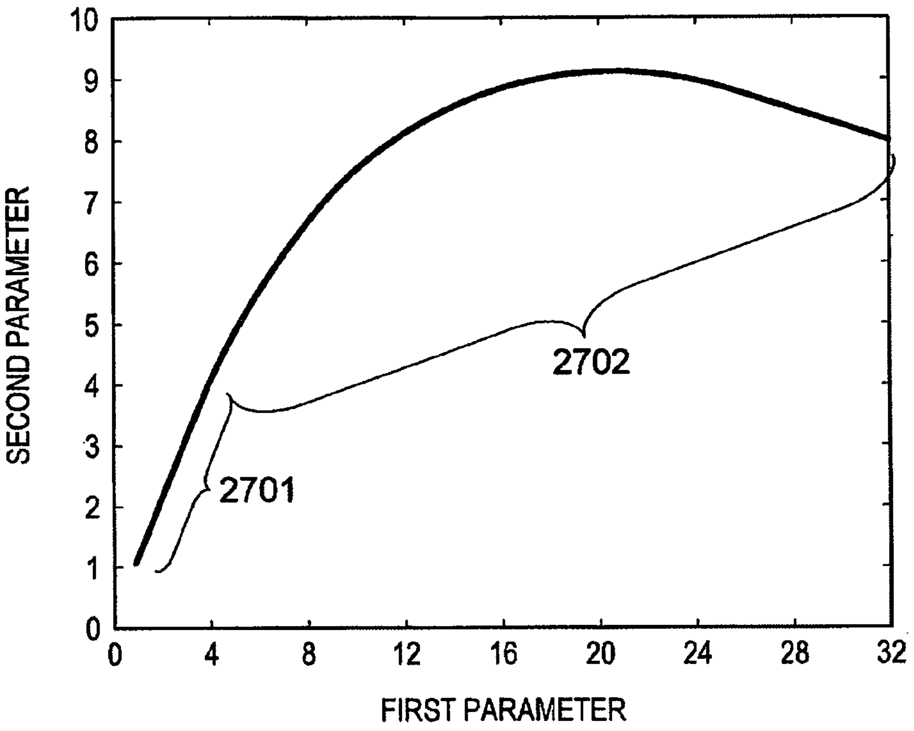
FIG. 27A is a graph chart showing the relationship between the first parameter R and the second parameter Rs.
Figure 27B:
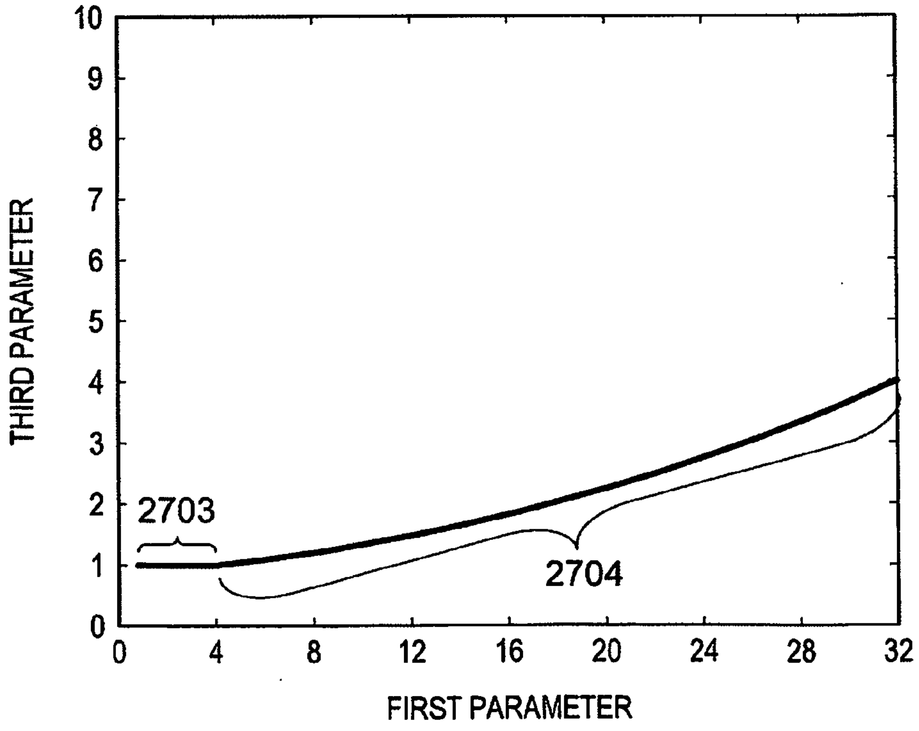
FIG. 27B is a graph chart showing the relationship between the first parameter R and the third parameter Rp.

FIGS. 27A and 27B are graph charts showing other examples of methods for adjusting a parameter performed by the parameter adjustment section 1801. FIG. 27A is a graph chart showing the relationship between the first parameter R and the second parameter Rs, and FIG. 27B is a graph chart showing the relationship between the first parameter R and the third parameter Rp.

As shown in FIG. 27A, a graph chart in which the horizontal axis represents the first parameter R and the vertical axis represents the second parameter Rs is configured with at least two regions with different ascending rates (in other words, gradients of the graph chart) of the second parameter Rs. Similarly, as shown in FIG. 27B, a graph chart in which the horizontal axis represents the first parameter R and the vertical axis represents the third parameter Rp is configured with at least two regions with different ascending rates of the third parameter Rp.

In this case, the parameter adjustment section 1801 determines the second parameter Rs and the third parameter Rp in accordance with the first parameter R by referring to the databases as shown in FIGS. 27A and 27B stored in the storage section 1805 under the five conditions indicated below.

Condition 1: The second parameter Rs is determined to be in proportion to the first parameter R when the first parameter R that is input exists in a period 2701 (in other words, the second parameter Rs is determined so that the second parameter Rs is equal to the first parameter R).

Condition 2: The third parameter Rp is constantly set to 1 when the first parameter R that is input exists in a period 2703.

Condition 3: The third parameter Rp increases as the first parameter R increases when the first parameter R that is input exists in a period 2704.

Condition 4': The first parameter R=the second parameter Rs×the third parameter Rp is established in both the first range and the second range.

Condition 6: The period 2703 and the period 2704 are connected smoothly (in other words, a curved line showing the change in the third parameter Rp at the connection point of the period 2703 and the period 2704 is differentiable).

Here, the period 2701 and the period 2703 correspond to the first range of the first parameter R, and the period 2702 and the period 2704 correspond to the second range of the first parameter R.

In the examples as shown in FIGS. 27A and 27B, when the first parameter R is 1 to 4, that is, when playing back at 1 to 4 times speed, only speech rate conversion is performed, and when the first parameter R is more than 4, that is, when playing back at more than 4 times speed, pitch of a sound is raised along with converting the speech rate. By performing such processing, when playing back at 1 to 4 times speed, speech of a talker gradually accelerates in accordance with the playback speed, and when playing back at more than 4 times speed, the pitch of a sound is gradually raised as the speech of a talker is accelerated.

In the examples as shown in FIGS. 27A and 27B, unlike the examples as shown in FIGS. 22A and 22B, in the third parameter Rp, the period 2703 and the period 2704 are connected smoothly. In other words, a curved line showing the change in the third parameter Rp at the connection point of the period 2703 and the period 2704 is differentiable. In a case where a connection point of the period 2203 and the period 2204 is not differentiable as shown in FIGS. 22A and 22B, when the first parameter R is gradually increased, an increase amount of units (differential value) of the third parameter Rp drastically increases at the connection point, and discomfort may be experienced regarding a sound being played back. On the other hand, in a case where curved lines are smoothly connected as in the case of the period 2703 and the period 2704 in FIG. 27B, when the first parameter R is gradually increased, a pitch of a sound can be prevented from starting to rise drastically at the connection point of the period 2703 and the period 2704, and discomfort regarding the a sound being played back can be prevented.

Figure 28A:
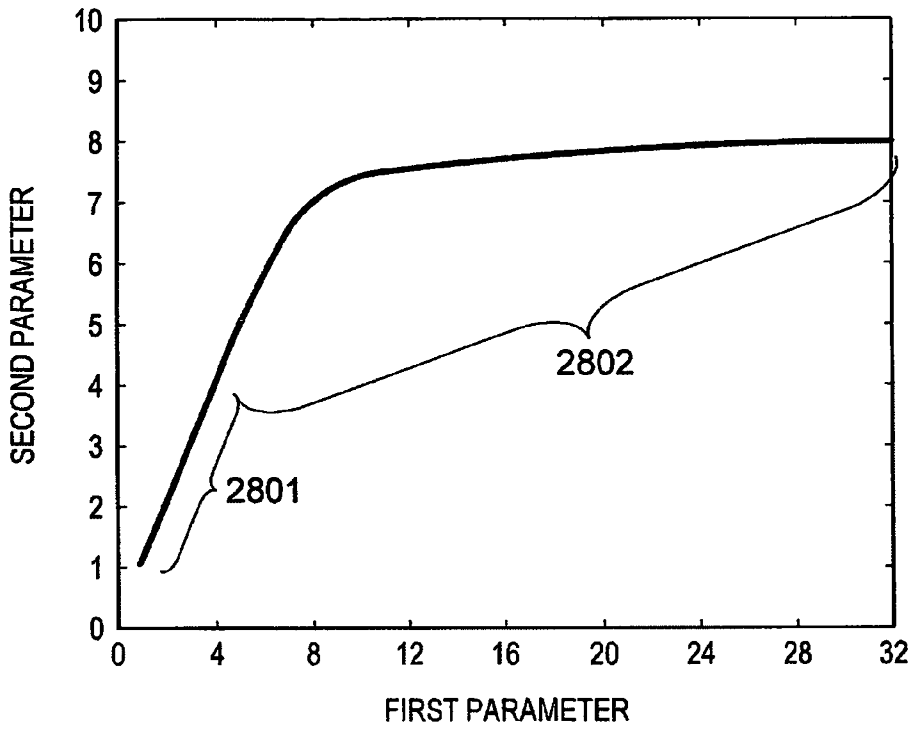
FIG. 28A is a graph chart showing the relationship between the first parameter R and the second parameter Rs.
Figure 28B:
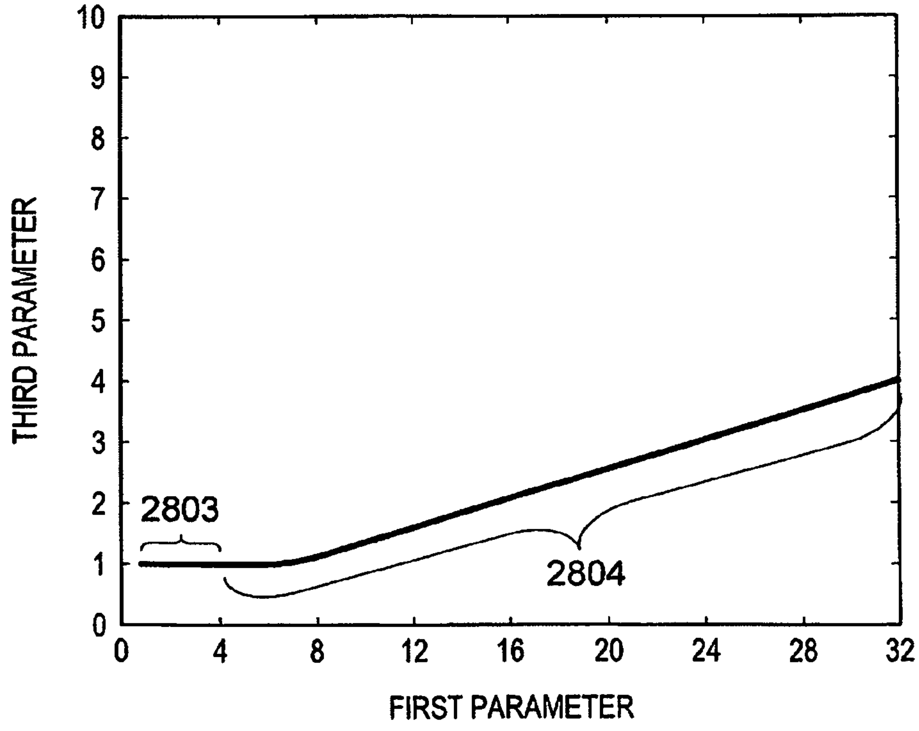
FIG. 28B is a graph chart showing the relationship between the first parameter R and the third parameter Rp.

FIGS. 28A and 28B are graph charts showing other examples of methods for adjusting a parameter performed by the parameter adjustment section 1801. FIG. 28A is a graph chart showing the relationship between the first parameter R and the second parameter Rs, and FIG. 28B is a graph chart showing the relationship between the first parameter R and the third parameter Rp.

As shown in FIG. 28A, a graph chart in which the horizontal axis represents the first parameter R and the vertical axis represents the second parameter Rs is configured with at least two regions with different ascending rates (in other words, gradients of the graph chart) of the second parameter Rs. Similarly, as shown in FIG. 28B, a graph chart in which the horizontal axis represents the first parameter R and the vertical axis represents the third parameter Rp is configured with at least two regions with different ascending rates of the third parameter Rp.

In this case, the parameter adjustment section 1801 determines the second parameter Rs and the third parameter Rp in accordance with the first parameter R by referring to the databases as shown in FIGS. 28A and 28B stored in the storage section 1805 under the six conditions indicated below.

Condition 1: The second parameter Rs is determined to be in proportion to the first parameter R when the first parameter R that is input exists in a period 2801 (in other words, the second parameter Rs is determined so that the second parameter Rs is equal to the first parameter R).

Condition 2: The third parameter Rp is constantly set to 1 when the first parameter R that is input exists in a period 2803.

Condition 3: The third parameter Rp increases as the first parameter R increases when the first parameter R that is input exists in a period 2804.

Condition 4': The first parameter R=the second parameter Rs×the third parameter Rp is established in both the first range and the second range.

Condition 5: The second parameter Rs increases as the first parameter R increases when the first parameter R that is input exists in a period 2802 (in other word, a differential coefficient of a curved line showing the change in the second parameter Rs is greater than 0).

Condition 6: The period 2803 and the period 2804 are connected smoothly (in other words, a curved line showing the change in the third parameter Rp at the connection point of the period 2803 and the period 2804 is differentiable).

Here, the period 2801 and the period 2803 correspond to the first range of the first parameter R, and the period 2802 and the period 2804 correspond to the second range of the first parameter R.

In the examples as shown in FIGS. 28A and 28B, when the first parameter R is 1 to 4, that is, when playing back at 1 to 4 times speed, only speech rate conversion is performed, and when the first parameter R is more than 4, that is, when playing back at more than 4 times speed, pitch of a sound is raised along with converting the speech rate. By performing such processing, when playing back at 1 to 4 times speed, speech of a talker gradually accelerates in accordance with the playback speed, and when playing back at more than 4 times speed, the pitch of a sound is gradually raised as the speech of a talker is accelerated.

In the examples as shown in FIGS. 28A and 28B, similarly to the examples as shown in FIGS. 27A and 27B, in the third parameter Rp, the period 2803 and the period 2804 are connected smoothly. In other words, a curved line showing the change in the third parameter Rp at the connection point of the period 2803 and the period 2804 is differentiable. On the other hand, in the examples as shown in FIGS. 28A and 28B, unlike the examples as shown in FIGS. 27A and 27B, the second parameter Rs increases as the first parameter R increases. In other words, a differential coefficient of a curved line showing the change in the second parameter Rs is more than 0. In the period 2702 in FIG. 27A, in spite of the increase in the first parameter R, there exists a portion where the second parameter Rs decreases. In other words, there exists a portion where a differential value of a curved line showing the change in the second parameter Rs is negative. In such a case, a speech rate conversion rate does not change in spite of the acceleration of the playback speed, and discomfort may be experienced regarding a sound being played back. On the other hand, in the period 2802 in FIG. 28A, since the second parameter Rs increases as the first parameter R increases (since the differential coefficient is 0), the speech rate conversion rate can be prevented from decreasing in spite of the acceleration of the playback speed, and discomfort regarding the a sound being played back can be prevented.

As described above, by converting speech rate before adjusting pitch of a sound when converting a variant factor for playback speed of an audio signal that is input, detection of a similar-waveform length of the audio signal input can be performed more accurately in the speech rate conversion, and it becomes possible to maintain the sound quality of the audio signal output at its best.

(Modified Example of Signal Processing Section 1803)

Figure 29:
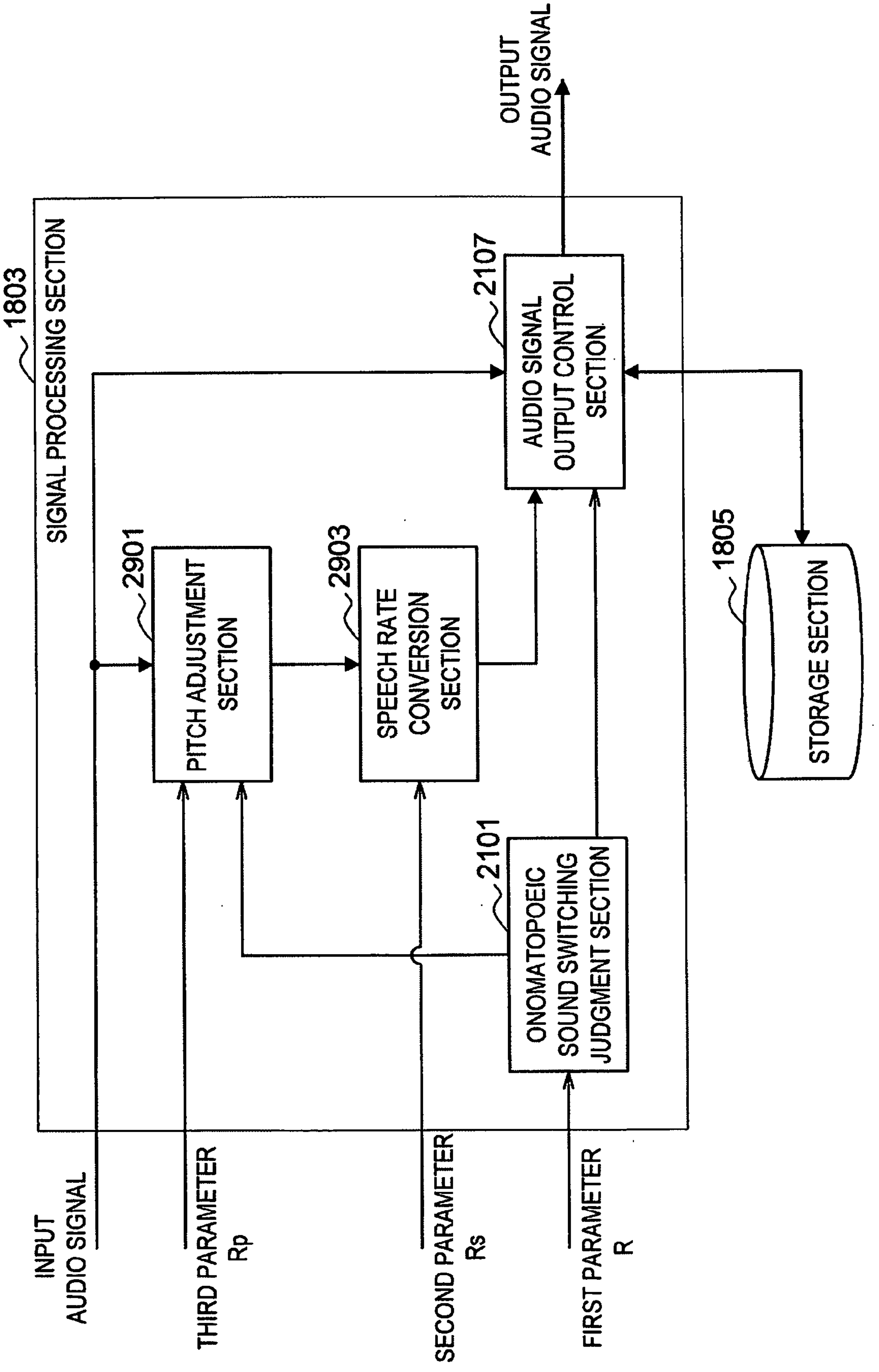
FIG. 29 is a block diagram showing a modified example of the signal processing section according to the embodiment.

Subsequently, by referring to FIG. 29, a modified example of the signal processing section 1803 according to the embodiment will be described in detail. FIG. 29 is a block diagram showing a modified example of the signal processing section 1803 according to the embodiment.

As shown in FIG. 29, the signal processing section 1803 according to the modified example mainly includes, for example, an onomatopoeic sound switching judgment section 2101, a pitch adjustment section 2901, a speech rate conversion section 2903, and an audio signal output control section 2107.

The onomatopoeic sound switching judgment section 2101 has the same configuration and functions as those of the onomatopoeic sound switching judgment section according to the first embodiment of the present invention, except that the onomatopoeic sound switching judgment section 2101 outputs a judgment result to the pitch adjustment section 2901 and the audio signal output control section 2107, and thus, a detailed description thereof will be omitted.

The pitch adjustment section 2901 is configured with a CPU, a ROM, a RAM, and the like, for example, and adjusts pitch of a sound of an audio signal based on an input audio signal sent and a third parameter Rp sent from the parameter adjustment section 1801. An arbitrary method of pitch conversion, for example, the methods as shown in FIGS. 12 to 14C, may be used for the adjustment of pitch. When the adjustment of pitch of a sound is completed, the pitch adjustment section 2901 outputs the audio signal whose pitch of a sound is adjusted to the speech rate conversion rate 2903 described later.

Incidentally, when the methods as shown in FIGS. 12 to 14C are used by the pitch adjustment section 2901, the increase rate Rd of the number of samples in the method for changing pitch of a sound is in proportion to the pitch of a sound, and the increase rate Rd of the number of samples becomes equal to the ascending rate of the pitch of a sound. That is, a relation of Rd=the third parameter Rp is established.

Further, the pitch adjustment section 2901 does not have to perform processing for converting pitch of a sound when it is notified of a judgment result, "switch audio signal to onomatopoeic sound", by the onomatopoeic sound switching judgment section 2101.

The speech rate conversion section 2903 is configured with a CPU, a ROM, a RAM, and the like, for example. An input audio signal, a second parameter Rs determined by the parameter adjustment section 1801 and the audio signal whose pitch of a sound is adjusted that is sent from the pitch adjustment section 2901 are input to the speech rate conversion section 2903, and the speech rate conversion section 2903 converts speech rate of the audio signal based on the second parameter Rs. The conversion of speech rate is performed by using the algorithms as shown in FIGS. 1A to 7, for example. The speech rate conversion section 2903 sends the audio signal whose speech rate and pitch of a sound are adjusted to the audio signal output control section 2107 described later.

The audio signal output control section 2107 is configured with a CPU, a ROM, a RAM, and the like, for example, and controls output when outputting the audio signal that is input or the audio signal sent from the speech rate conversion section 2903. When it is notified of a judgment result, "switch audio signal to onomatopoeic sound", by the onomatopoeic sound switching judgment section 2101, the audio signal output control section 2107 switches the audio signal that is input to a predetermined onomatopoeic sound that is stored in the storage section 1805, for example, and outputs the signal. Further, when it is notified of a judgment result, "not to switch audio signal to onomatopoeic sound", by the onomatopoeic sound switching judgment section 2101, the audio signal output control section 2107 outputs the audio signal sent from the speech rate conversion section 2903.

Further, the audio signal output control section 2107 can adjust the audio volume of the audio signal to be output. The adjustment of the audio volume of the audio signal is performed by adjusting an absolute value of a signal waveform of an intended audio signal. The audio signal output control section 2107 may turn down the audio volume of the audio signal to be output when the variant factor for playback speed exceeds 1. Further, the audio signal output control section 2107 may control the audio volume regardless of the playback speed.

Heretofore, an example of the function of the signal processing section 1803 according to the modified example has been described. Each of the above structural elements may be configured with versatile components or circuits, or may be configured with hardwares specializing in functions of each of the structural elements. Further, a CPU or the like may perform all the functions. Accordingly, it is possible to change the configuration to be used as appropriate in accordance with the various technical levels of carrying out the embodiment.

(Signal Processing Method according to the Modified Example)

Figure 30:
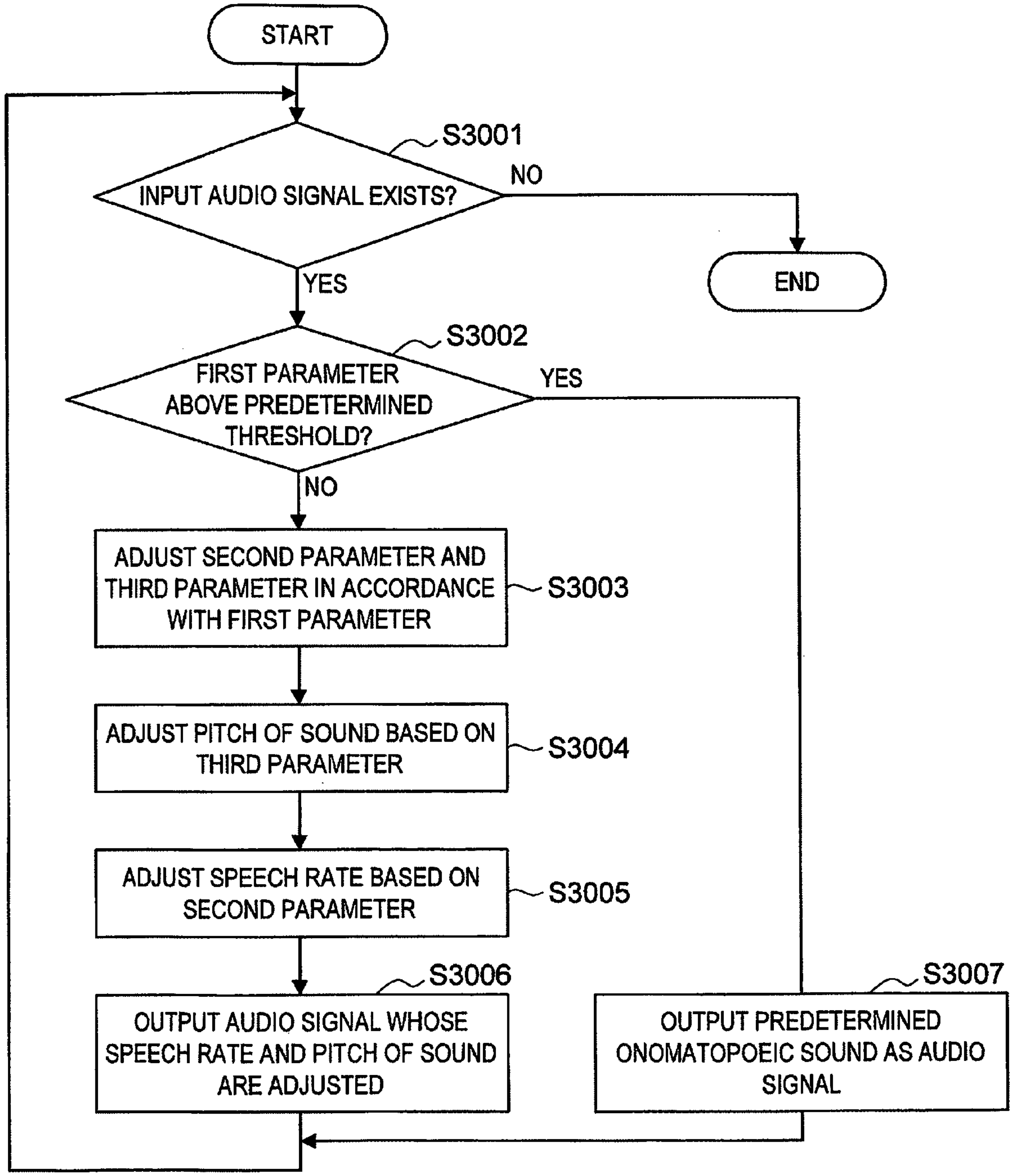
FIG. 30 is a flow chart showing a signal processing method according to the modified example.

Subsequently, by referring to FIG. 30, a signal processing method according to the modified example will be described in detail. FIG. 30 is a flow chart showing a signal processing method according to the modified example.

First, the information processing apparatus 1800 judges whether there is an input audio signal or not (step S3001), and terminates the processing when there is no input audio signal. Further, when an input audio signal does exist, the onomatopoeic sound switching judgment section 2101 of the signal processing section 1803 judges whether the first parameter R that is input is above the predetermined threshold or not (step S3002). When the first parameter R is less than the predetermined threshold, the parameter adjustment section 1801 adjusts the second parameter Rs and the third parameter Rp in accordance with the first parameter R that is input (step S3003), and sends the parameters to the signal processing section 1803. The pitch adjustment section 2901 of the signal processing section 1803 adjusts pitch of a sound of the input audio signal sent based on the third parameter Rp sent (step S3004), and sends the audio signal whose pitch of a sound is adjusted to the speech rate conversion section 2903. The speech rate conversion section 2903 adjusts speech rate of the audio signal whose pitch of a sound is adjusted based on the second parameter Rs sent (step S3005). The audio signal whose speech rate and pitch of a sound are adjusted is sent to the audio signal output control section 2107, and the audio signal output control section 2107 outputs the audio signal whose speech rate and pitch of a sound are adjusted (step S3006). Then, returning to step S3001, the processing above is repeated.

On the other hand, when it is judged by the onomatopoeic sound switching judgment section 2101 that the first parameter R is above the predetermined threshold, the audio signal output control section 2107 outputs a predetermined onomatopoeic sound stored in the storage section 1805 and the like as an audio signal (step S3007). Then, returning to step S3001, the processing above is repeated.

By repeating such processing, the information processing apparatus 1800 according to the modified example is enabled to control a variant factor for playback speed of an audio signal in such a way that a playback speed after conversion can be auditorily recognized.

As described above, by adjusting pitch of a sound before converting speech rate when converting a variant factor for playback speed of an audio signal that is input, it becomes possible to reduce the number of samples of the input audio signal whose speech rate is to be converted, and to reduce resource to be processed, and thus, speeding up of the processing can be achieved. Incidentally, when converting the speech rate of an audio signal whose pitch of a sound is adjusted, frequency range in which the speech rate conversion is performed may be changed as appropriate in accordance with the degree of the pitch adjustment.

(Other Method for Converting Sampling Rate)

Figure 31:
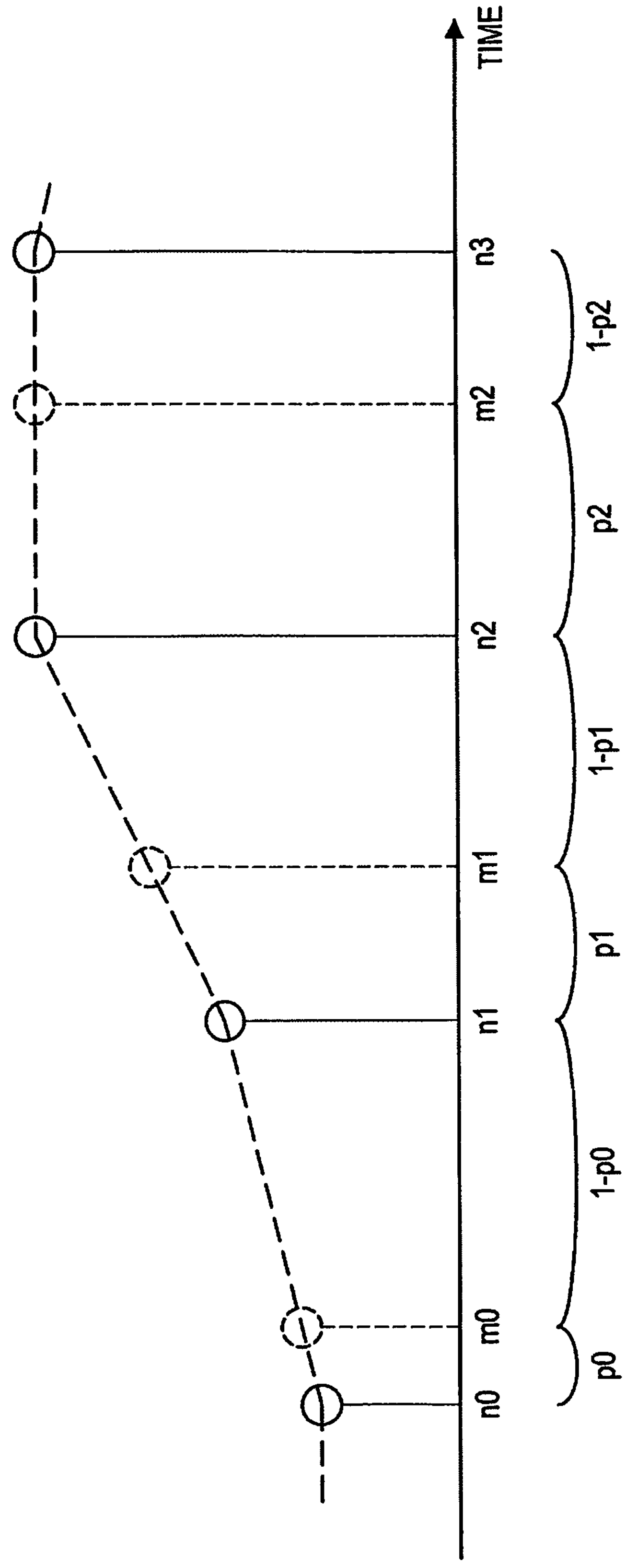
FIG. 31 is an explanatory diagram showing another method for converting sampling rate.

FIG. 31 is an explanatory diagram showing a method for converting sampling rate with a method different from the methods for converting sampling as shown in FIGS. 12 and 13. Normally, in the methods as shown in FIGS. 12 and 13, processing amount is large, and thus, for example, it is hard to realize them in playback apparatuses where high processing capability is not expected such as a portable playback apparatus. In such a case, the method for converting sampling rate as shown in FIG. 31 proves useful. FIG. 31 is an explanatory diagram showing a case where, when sample points n0, n1, n2, n3, . . . exist in a signal before conversion, new sample points m0, m1, m2, . . . are obtained by linear interpolation. The linear interpolation obtains, in relation to the sample value of m1, for example, position of the sample point m1 between the sample point n1 and the sample point n2 by calculating a ratio p1:1−p1, and according to the ratio, obtains the sample value of m1 from the sample value of n1 and the sample value of n2.

As such, in the embodiment, methods for adjusting pitch of a sound are not limited to those as shown in FIGS. 12 and 13, and arbitrary methods such as the method as shown in FIG. 31 and those that satisfy the conditions of the information processing apparatus according to the embodiment may be used.

(Transition of Variant Factor for Playback Speed)

Figure 32:
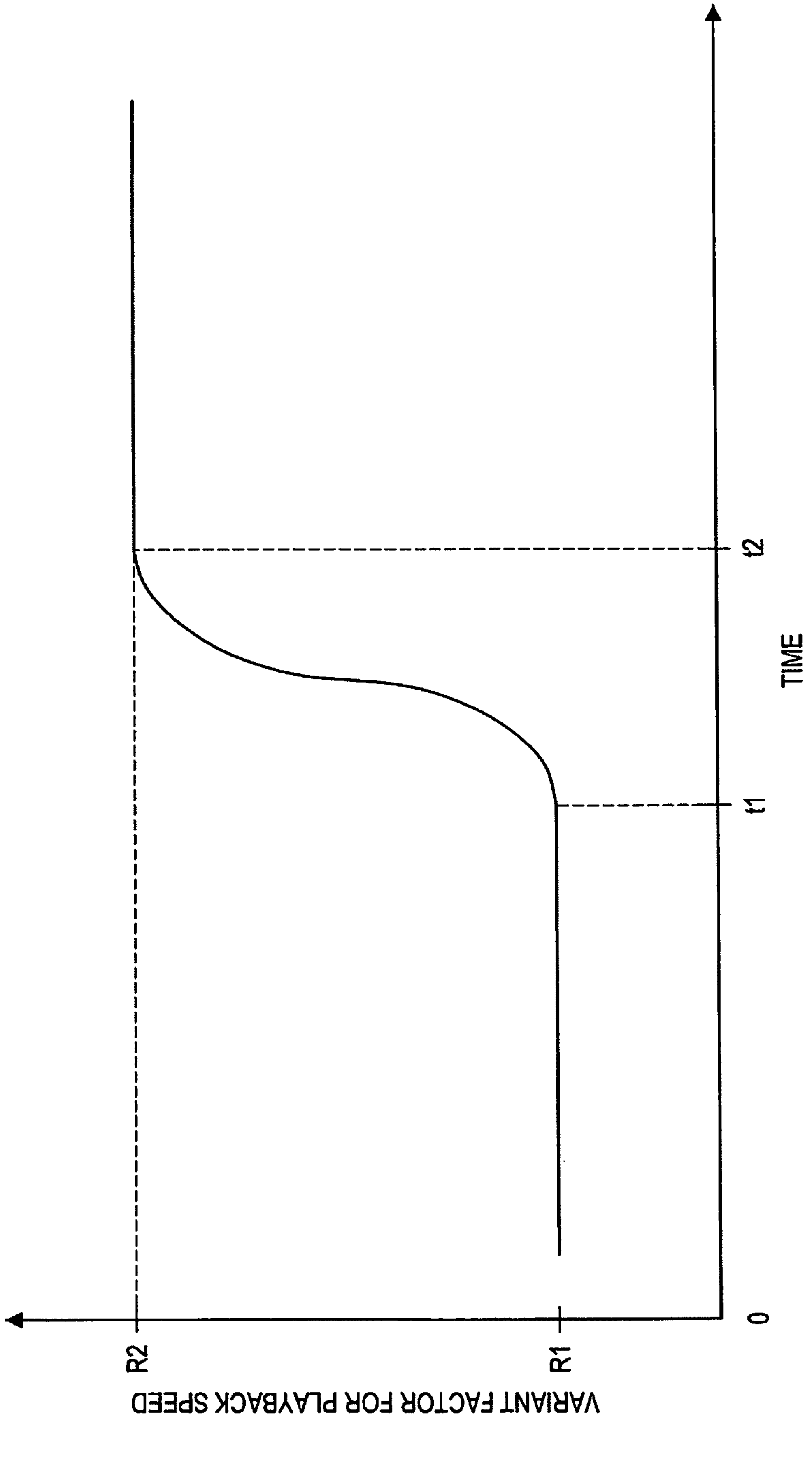
FIG. 32 is an explanatory diagram schematically showing the change of the variant factor for playback speed with time.

Subsequently, by referring to FIG. 32, a case of changing continuously a first parameter R representing a variant factor for playback speed will be described. FIG. 32 is an explanatory diagram schematically showing the change of the variant factor for playback speed with time.

In contrast to an information processing apparatus 1800 in which a first parameter R representing a variant factor for playback speed is set to R1 and that outputs an audio signal, when a signal to change the first parameter R to R2 at a time point t1 is input, the information processing apparatus 1800 according to the embodiment does not immediately switch the first parameter R digitally, but may control a second parameter and a third parameter so that the first parameter is gradually switched from R1 to R2, as shown in FIG. 32, for example.

In such a case, a parameter adjustment section 1801 changes the first parameter R continuously from R1 to R2, and sets a second parameter Rs and a third parameter Rp for each parameter R in transition. By performing such processing, a listener of an audio signal may listen to the audio signal without feeling discomfort even during the changing of speech rate and pitch of a sound of the audio signal.

As described above, with the method for controlling variant factor for playback speed according to the embodiment, when playing back at approximately the normal speed, the playback speed is changed but pitch of a sound does not change, and it becomes easy to comprehend the content of speech of a talker or to identify the talker. Further, in high speed playback/low speed playback, when the playback speed is changed, and thus the playback speed at the time can be auditorily sensed and the operability can be improved.

Second Embodiment

Subsequently, by referring to FIGS. 33 to 46, an information processing apparatus 3300 according to a second embodiment of the present invention will be described in detail.

When a so-called content playback apparatus plays back content, the apparatus obtains an audio signal from a recording medium playback apparatus, such as a hard disk drive, a DVD drive, and a Blu-ray drive, of the content playback apparatus. However, there is an upper limit for data read speed of such recording medium playback apparatus. In other words, there is an upper limit for data amount that can be read from a recording medium per unit time. Thus, even if it is possible to obtain amount of data enough to playback content at 10 times speed, amount of data enough to playback content at 20 times speed might not be obtained. There exist other similar cases. For example, in recent years, content data is usually encoded by MPEG and the like, and when playing back the encoded content, first, it has to be decoded. Thus, even if data read speed of a recording medium playback apparatus such as a hard disk drive, a DVD drive, and Blu-ray drive is sufficient, if computing power of a decoding device is not sufficient, the decoding processing cannot keep up. A similar situation occurs when bandwidth of a bus connecting a recording medium playback apparatus, such as a hard disk drive, a DVD drive, and a Blu-ray drive, and a CPU or a memory is not sufficient.

As such, structural elements configuring a content playback apparatus each has its limit of processing capability, and when playing back at a variable speed, limit of processing capability of the entire apparatus is determined by the structural element with the lowest limit of processing capability. There is the problem that there exists a case where, because of this limit of processing capability, a desired playback speed is not achieved. Hereunder, this problem will be referred to as the third problem.

Accordingly, the inventors of the present invention have conducted earnest research in light of the above problem, and have achieved a variable speed playback method enabling an easy grasp of content of a speech or specifying of a talker with a variable speed playback in the first range, and further, enabling an auditory sensing of a playback speed with a variable speed playback in the second range, and further, enabling a higher upper limit of the playback speed. In other words, the variable speed playback method according to the embodiment is a variable speed playback method capable of solving the first, the second and the third problems all together.

(Configuration of Information Processing Apparatus According to the Embodiment)

Figure 33:
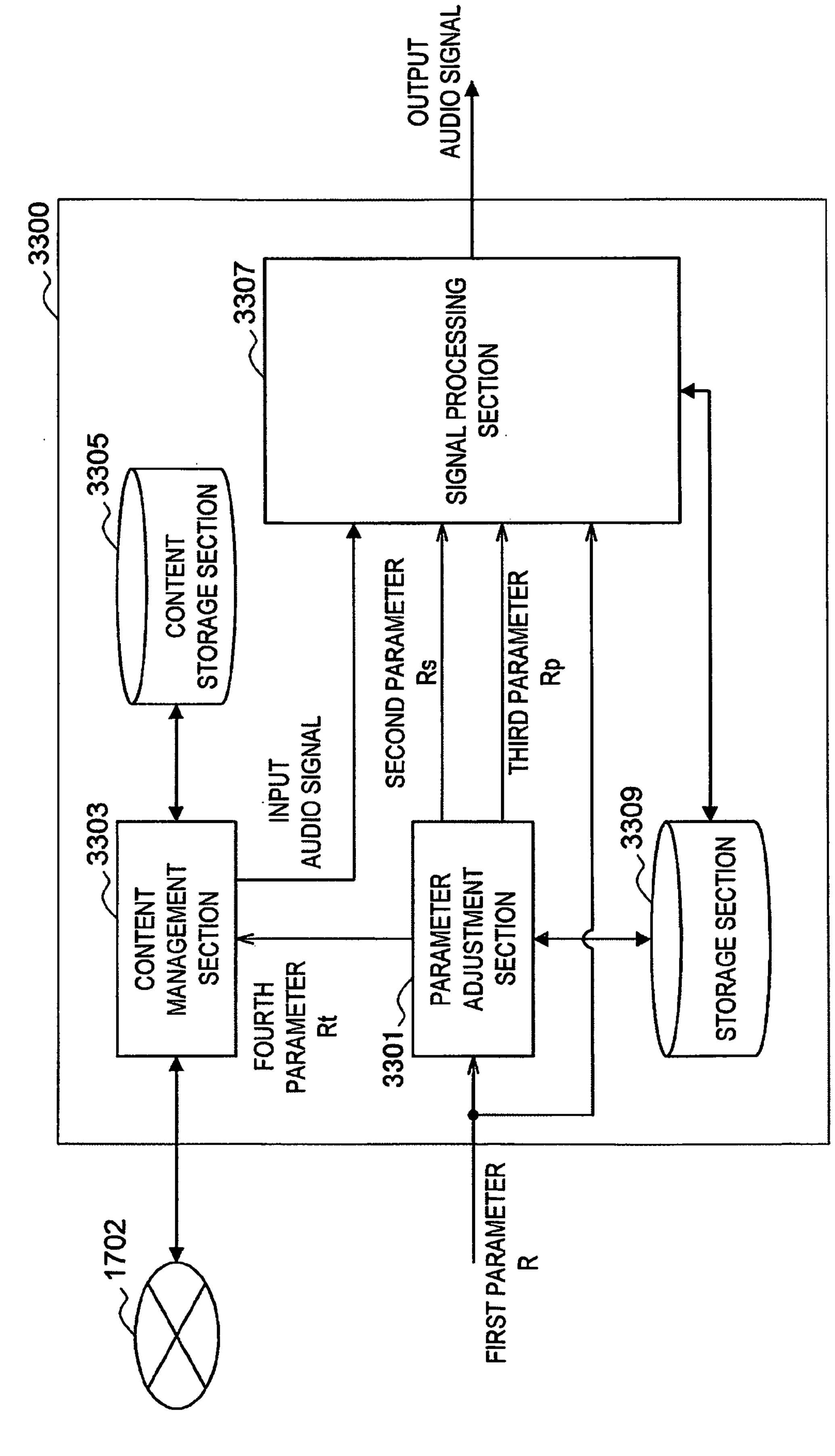
FIG. 33 is a block diagram showing a function of an information processing apparatus according to a second embodiment of the present invention.

First, by referring to FIG. 33, a configuration of the information processing apparatus 3300 according to the embodiment will be described in detail. FIG. 33 is a block diagram showing a function of the information processing apparatus 3300 according to the embodiment.

The information processing apparatus 3300 according to the embodiment mainly includes, as shown in FIG. 33, a parameter adjustment section 3301, a content management section 3303, a content storage section 3305, a signal processing section 3307 and a storage section 3309, for example.

The parameter adjustment section 3301 is configured with a CPU, a ROM, a RAM, and the like, for example, and adjusts a second parameter Rs, a third parameter Rp and a fourth parameter Rt in accordance with a first parameter R that is input from the outside. A method for setting the second parameter Rs, the third parameter Rp and the fourth parameter Rt in accordance with the first parameter R will be described later in detail. The parameter adjustment section 3301 sends the fourth parameter Rt determined in accordance with the first parameter R to the content management section 3303 described later, and sends the second parameter Rs and the third parameter Rp to the signal processing section 3307 described later.

The content management section 3303 is configured with a CPU, a ROM, a RAM, and the like, for example, and manages content including an audio signal which may be played back by the information processing apparatus 3300 according to the embodiment. The content management section 3303 records, in the content storage section 3305 described later, the content including the audio signal in association with the title of the content, the ID and the attribute information and the like of the content, for example. The content management section 3303 obtains content from the content storage section 3305 in accordance with a playback instruction for the content input from outside of the information processing apparatus 3300 and outputs the same to the signal processing section 3307 describe later. At the time of outputting the content to the signal processing section 3307, amount of data to be sent is determined based on the fourth parameter Rt sent from the parameter adjustment section 3301. Further, when the content data read from the content storage section 3305 is an encoded data, the content management section 3303 decodes the same by a decoder not shown and outputs the same to the signal processing section 3307.

Further, the content management section 3303 may obtain content including an audio signal to be played back via the network 1702 such as the Internet and a home network. The content management section 3303 may record the content obtained via the network 1702 in the content storage section 3305.

The content storage section 3305 is configured with a recording medium such as a hard disk drive, a DVD drive, a Blu-ray drive, and stores content including an audio signal in association with the title, the ID, the attribute information and the like of the content. Further, control information including upper limit value of the read speed of various recording medium configuring the content storage section 3305 and the like may be stored in the content storage section 3305 as a database.

The signal processing section 3307 is configured with a CPU, a ROM, a RAM, and the like, for example, and adjusts speech rate and pitch of a sound of an audio signal based on the audio signal sent from the content management section 3303, the first parameter R, and the second parameter Rs and the third parameter Rp sent from the parameter adjustment section 3301. Further, the signal processing section 3307 outputs the audio signal whose speech rate and pitch of a sound are adjusted as an output audio signal. The information processing apparatus 3300 converts such output audio signal to an analog signal by a DA converter not shown and outputs the same from an output device such a speaker.

The storage section 3309 is configured with a RAM, a storage device, and the like, for example, and stores various databases used at the time of determining the second parameter Rs, the third parameter Rp and the fourth parameter Rt in accordance with the first parameter R, various programs to be executed by the information processing apparatus 3300, and the like. Further, the storage section 3309 may store as needed, besides these data, various parameters that needs to be saved when the information processing apparatus 3300 performs a process, intermediate progress of a processing, and the like. The parameter adjustment section 3301, the content management section 3303, the signal processing section 3307, and the like may freely perform reading or writing of data in the storage section 3309.

(Relationship between First Parameter and Fourth Parameter)

Figure 34A:
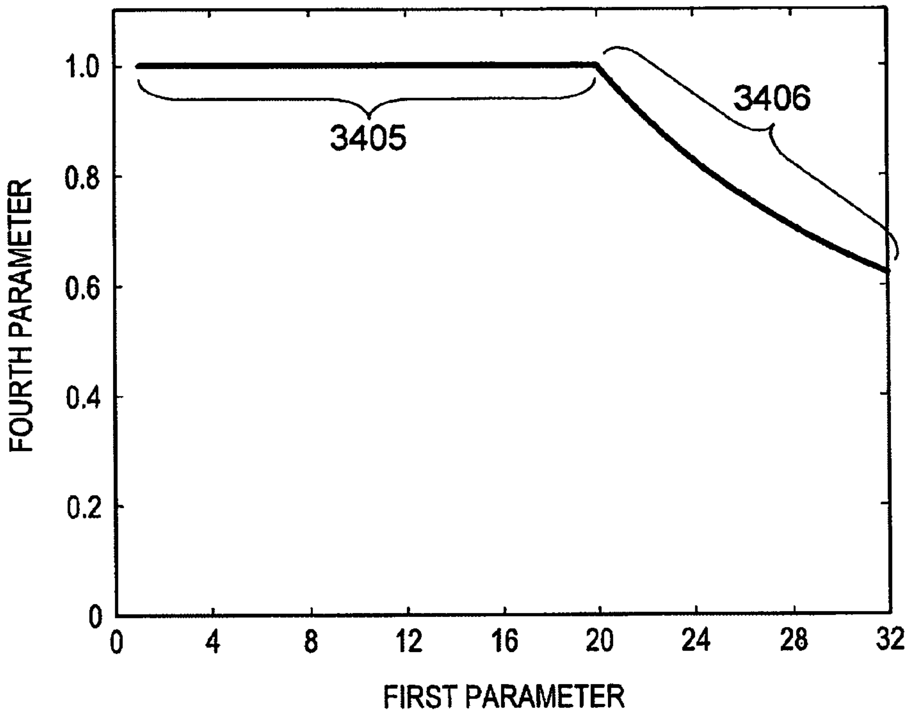
FIG. 34A is a graph chart showing the relationship between a first parameter R and a fourth parameter Rt.
Figure 34B:
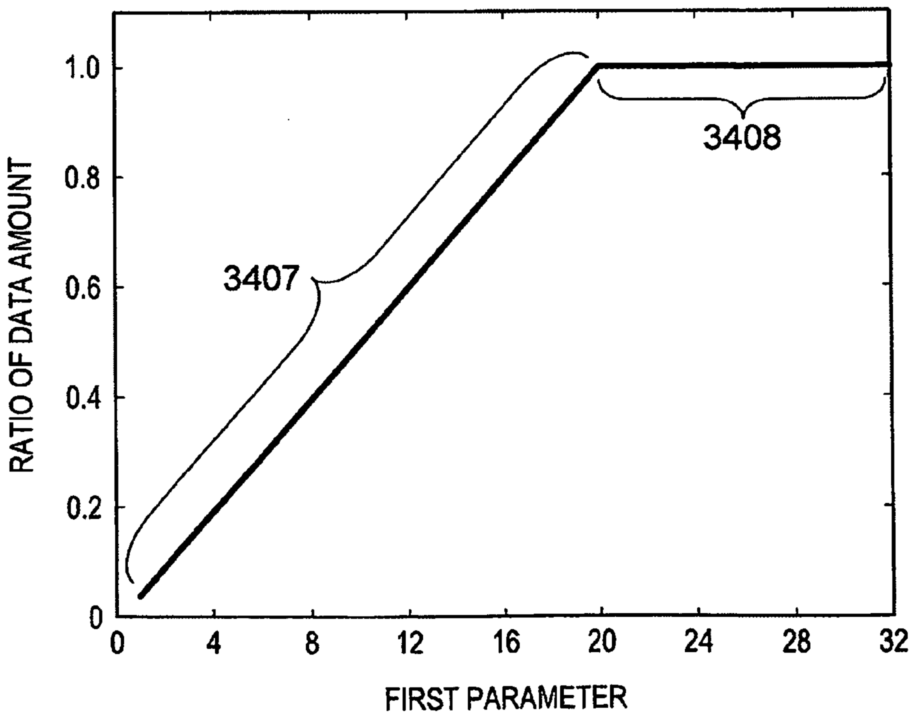
FIG. 34B is a graph chart showing the relationship between the first parameter R and a data amount of an audio signal to be input to the signal processing section.

Subsequently, by referring to FIGS. 34A and 34B, a method for adjusting a fourth parameter by the parameter adjustment section 3301 according to the embodiment will be described in detail. FIG. 34A is a graph chart showing the relationship between the first parameter R and the fourth parameter Rt, and FIG. 34B is a graph chart showing the relationship between the first parameter R and a data amount of an audio signal to be input to the signal processing section 3307.

As shown in FIG. 34A, a graph chart in which the horizontal axis represents the first parameter R and the vertical axis represents the fourth parameter Rt is configured with two regions with different ascending rates (in other words, gradients of the graph chart) of the fourth parameter Rt.

The parameter adjustment section 3301 adjusts the fourth parameter Rt under the conditions indicated below. Here, an upper limit for data read speed at the time of the content management section 3303 reading the content data from the content storage section 3305 and sending the same to the signal processing section 3307 will be abbreviated as Sm. Incidentally, in the following description, the data read speed is speed including the data read speed of the content management section 3303 reading a predetermined content data from the content storage section 3305 and the speed required when sending the content data read from the content management section 3303 to the signal processing section 3307.

Condition A: The fourth parameter Rt is constantly 1.0 when the first parameter R that is input exists in a period 3405.

Condition B: The upper limit speed Sm=the first parameter R×the fourth parameter Rt is established when the first parameter R that is input exists in a period 3406.

The upper limit speed Sm is a constant value determined in accordance with the processing capabilities of the content management section 3303 and the content storage section 3305, and thus, in the period 3406, as the value of the first parameter R becomes larger, the fourth parameter Rt becomes smaller.

FIG. 34B shows the ratio of the amount of audio signal that is input to the signal processing section 3307 per unit time to the upper limit Sm of the data read speed. In the period 3407, the ratio of the data amount is proportional to the first parameter R. However, in the period 3408, the proportion of the data amount is constantly 1.0. This is because the data read speed is adjusted according to the fourth parameter Rt so that the data read speed does not exceed its upper limier Sm. As such, it may be said that the fourth parameter Rt is a thinning-out rate of data at the time of reading content data from the content storage section 3305 and sending the same to the signal processing section 3307.

(Adjustment of Data Read Speed According to Fourth Parameter)

The adjustment of data read speed according to the fourth parameter is performed by methods as shown in FIGS. 35A to 37C, for example. FIGS. 35A to 37C are explanatory diagrams showing examples of the method for adjusting data read speed according to the embodiment.

Figures 35A, 35B:
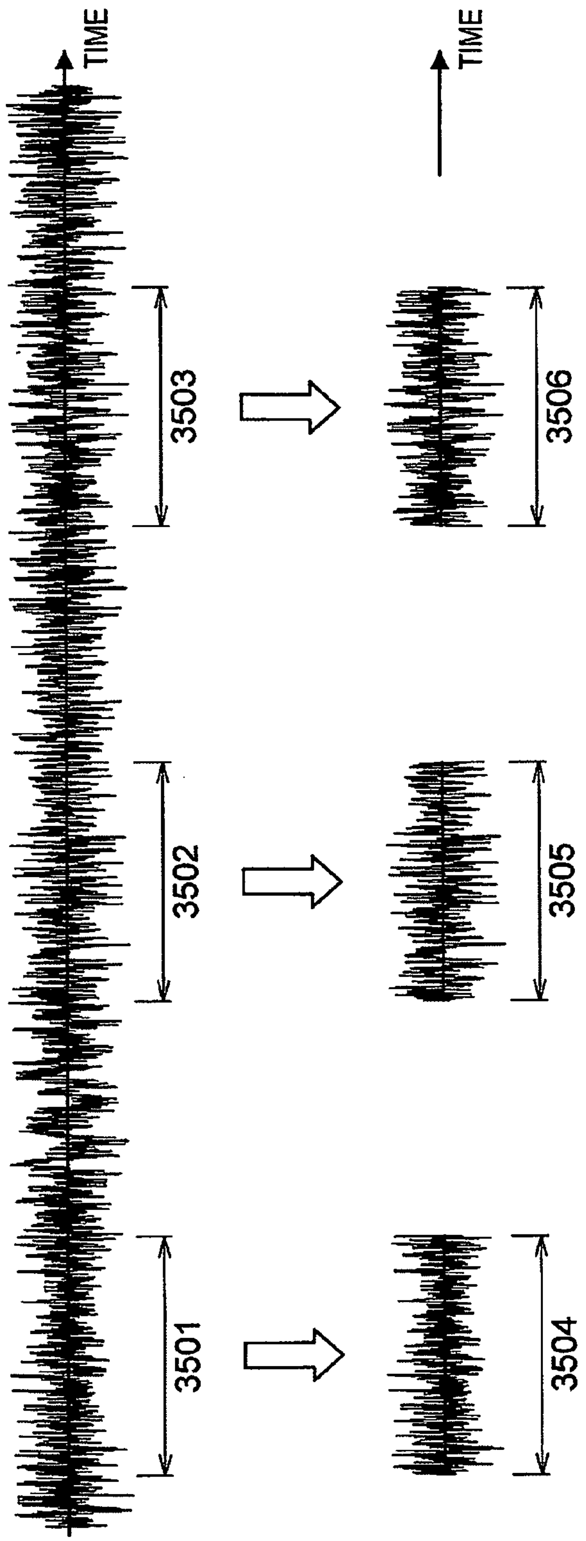
FIG. 35A is an explanatory diagram showing an example of a method for adjusting data read speed according to the embodiment.
FIG. 35B is an explanatory diagram showing an example of a method for adjusting data read speed according to the embodiment.

In the examples as shown in FIGS. 35A and 35B, segments of an original signal such as a period 3501, a period 3502 and a period 3503 are selected from an original signal shown in FIG. 35A recorded in a recording medium. Signals shown in FIG. 35B represent signals that are read, and a period 3504, a period 3505 and a period 3506 correspond to the period 3501, the period 3502 and the period 3503 of the original signal shown in FIG. 35A, respectively. A signal that is read from the content storage section 3305 and output to the signal processing section 3307 is a signal made of the period 3504, the period 3505 and the period 3506 of the signal shown in FIG. 35B connected. Here, when connecting each period, a signal of each period may be faded in or faded out so as to connect smoothly. Further, each period may be taken to be slightly longer so as to be connected by cross-fading. The signal shown in FIG. 35B is processed by the signal processing section 3307 to be made a playback sound at the time of variable speed playback.

Figures 36A, 36B:
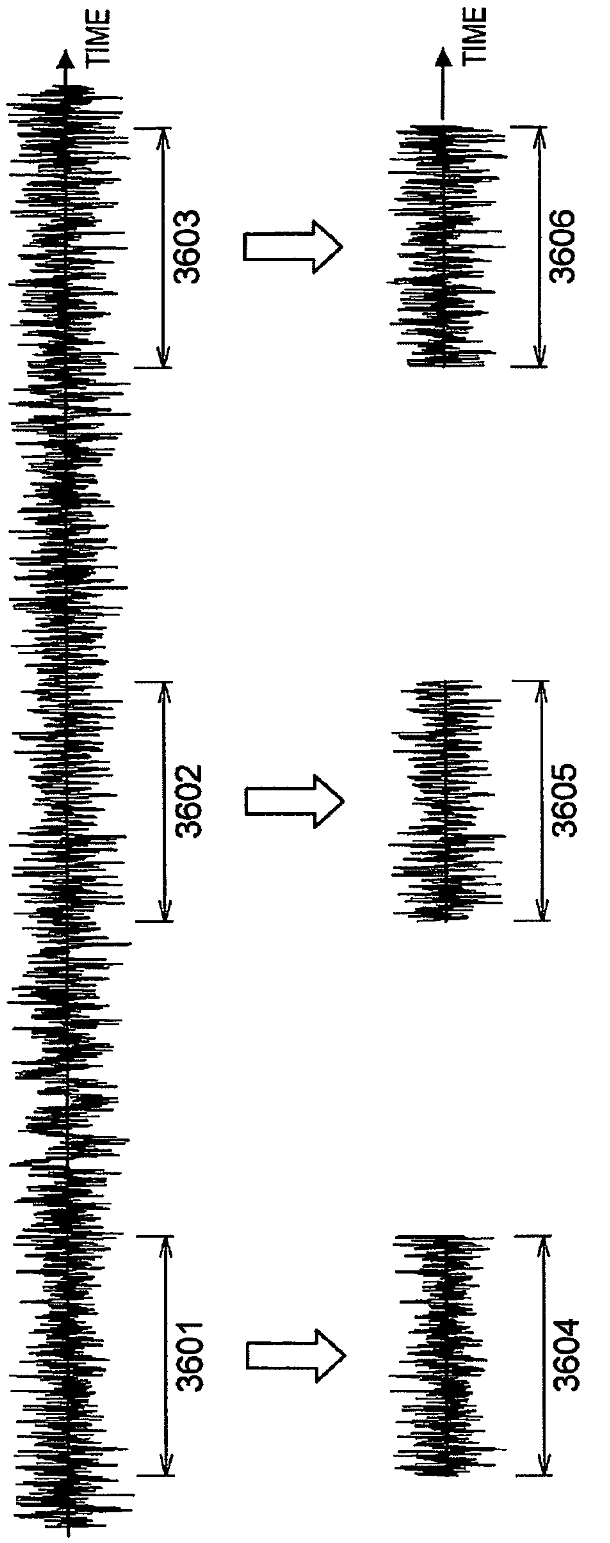
FIG. 36A is an explanatory diagram showing an example of a method for adjusting data read speed according to the embodiment.
FIG. 36B is an explanatory diagram showing an example of a method for adjusting data read speed according to the embodiment.

In the examples as shown in FIGS. 35A and 35B, regarding the original signal shown in FIG. 35A, the length of a read period and the length of a skip period are equal to each other (that is, the length of the period 3501 and a length of a section lying between the period 3501 and the period 3502 are equal to each other), and thus, the fourth parameter Rt amounts to ½. On the other hand, FIGS. 36A and 36B show examples where the value of the fourth parameter Rt is different from the examples as shown in FIGS. 35A and 35B. In the example as shown in FIGS. 36A and 36B, regarding the original signal shown in FIG. 36A, the ratio of the length of a read period to the length of a skip period is 3:4, and thus, the fourth parameter Rt amounts to 3/7.

Figures 37A, 37B, 37C:
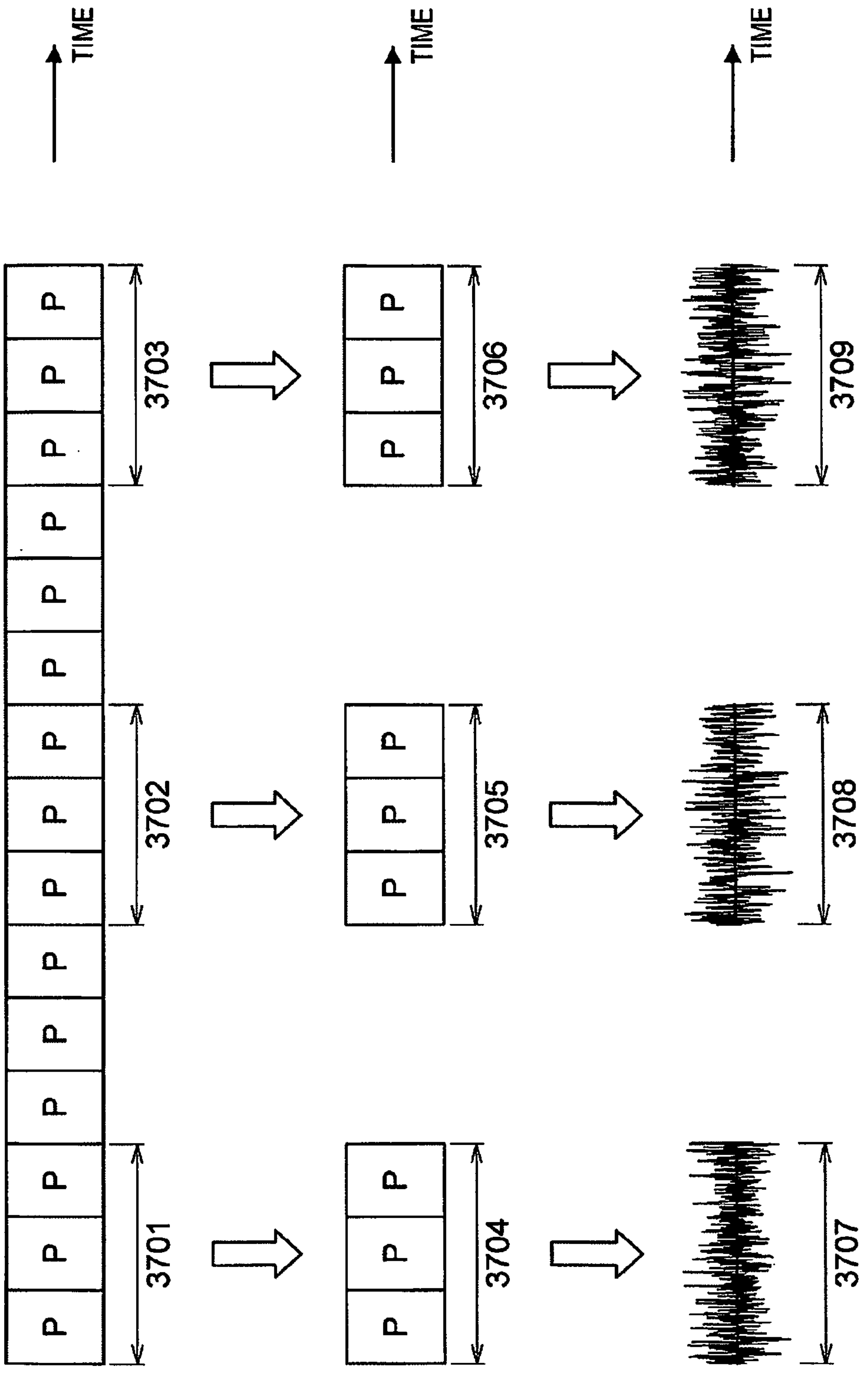
FIG. 37A is an explanatory diagram showing an example of a method for adjusting data read speed according to the embodiment.
FIG. 37B is an explanatory diagram showing an example of a method for adjusting data read speed according to the embodiment.
FIG. 37C is an explanatory diagram showing an example of a method for adjusting data read speed according to the embodiment.

FIGS. 37A to 37C show examples similar to those as shown in FIGS. 35A to 36B, however, it is different in that content data recorded in a recording medium is encoded. In many cases, although names may vary depending on the codec, encoded data are managed in collective units. For example, with the MPEG, encoded data are managed in unit P such as pack or packet.

In the examples as shown in FIGS. 37A to 37C, segments of stream data such as a period 3701, a period 3702 and a period 3703 are read from stream data (encoded data) shown in FIG. 37A recorded in a recording medium. A period 3704, a period 3705 and a period 3706 of the stream data shown in FIG. 37B that is read correspond to the period 3701, the period 3702 and the period 3703 of the stream data shown in FIG. 37A, respectively. The period 3704, the period 3705 and the period 3706 read from the stream data shown in FIG. 37B are decoded by a decoder, respectively, to become a period 3707, a period 3708 and a period 3709 of an audio signal shown in FIG. 37C. Here, when connecting each period, a signal of each period may be faded in or faded out so as to connect smoothly. Further, each period may be taken to be slightly longer so as to be connected by cross-fading. The audio signal shown in FIG. 37C is processed by the signal processing section 3307 to be made a playback sound at the time of variable speed playback.

In the examples as shown in FIGS. 37A to 37C, regarding the stream data shown in FIG. 37A, the length of a read period and the length of a skip period are equal to each other, and thus, the fourth parameter Rt amounts to ½. However, in case of an encoded signal, each unit of management P may have an overlapping period in an audio data before encoding. In such case, extra read period in the stream data shown in FIG. 37A may have to be read in accordance with the overlapping period. Further, depending on a codec, management information is added to each unit of management, and the management information may have to be read to read the next unit of management. In such case, even in a skip period, at least the management information has to be read. As such, when handling stream data, although a processing depending on a codec may have to be added, basic processing is the same as that shown in FIGS. 35A to 36B.

In the following description, the range of the first parameter R corresponding to a period where the fourth parameter Rt is 1.0 such as the period 3405 in FIG. 34A is referred to as a third range, and the range of the first parameter R corresponding to a period where the fourth parameter Rt is affected by the upper limit speed Sm such as the period 3406 in FIG. 34B is referred to as a fourth range.

(Relationships of First Parameter to Second Parameter and Third Parameter)

Figure 38A:
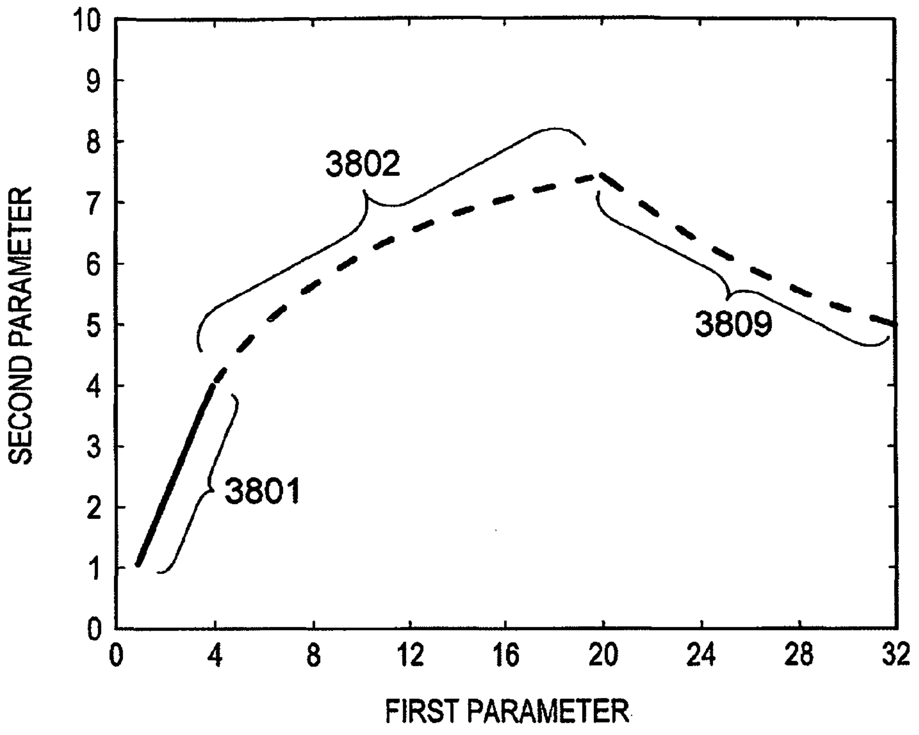
FIG. 38A is a graph chart showing the relationship between the first parameter R and a second parameter Rs.
Figure 38B:
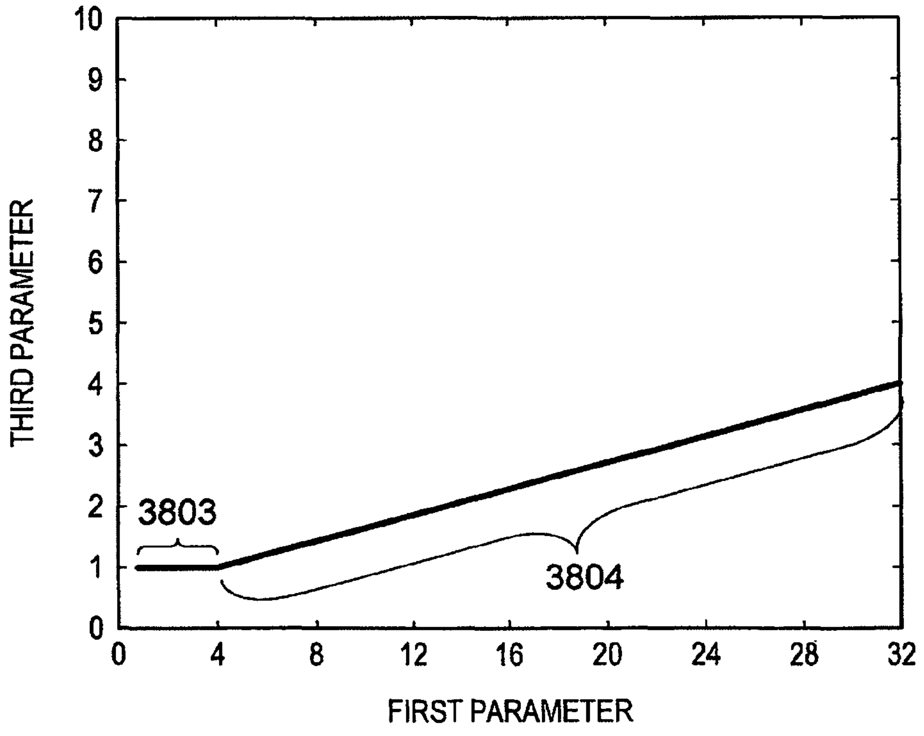
FIG. 38B is a graph chart showing the relationship between the first parameter R and a third parameter Rp.

FIGS. 38A and 38B describe examples of a method for adjusting parameters by the parameter adjustment section 3301 according to the embodiment in detail. FIG. 38A is a graph chart showing the relationship between the first parameter R and a second parameter Rs, and FIG. 38B is a graph chart showing the relationship between the first parameter R and the third parameter Rp.

In the information processing apparatus 3300 according to the embodiment, databases showing the relationships of the first parameter R to the second parameter Rs and the third parameter Rp as shown in FIGS. 38A and 38B and database showing the relationship between the first parameter R and the fourth parameter Rt as shown in FIG. 34A are stored in the storage section 3309, for example, and the parameter adjustment section 3301 determines the second parameter Rs, the third parameter Rp and the fourth parameter Rt in accordance with the first parameter R by referring to such databases.

Here, the parameter adjustment section 3301 determines the second parameter Rs and the third parameter Rp in accordance with the first parameter R that is input by referring to the databases as shown in FIGS. 38A and 38B stored in the storage section 3309 under the four conditions indicated below.

Condition 1: The second parameter Rs is determined to be in proportion to the first parameter R when the first parameter R that is input exists in the period 3801 (in other words, the second parameter Rs is determined so that the second parameter Rs is equal to the first parameter R).

Condition 2: The third parameter Rp is constantly set to 1 when the first parameter R that is input exists in the period 3803.

Condition 3: The third parameter Rp increases as the first parameter R increases when the first parameter R that is input exists in the period 3804.

Condition 4: The first parameter R×the fourth parameter Rt=the second parameter Rs×increase rate of the number of samples Rd.

Here, in a period 3809 in FIG. 38A, the second parameter Rs is reduced since it is affected by the Condition B described above. Incidentally, as is apparent from FIGS. 38A and 38B, the fourth parameter Rt affects the second parameter Rs, but does not affect the third parameter Rp. In other words, when the data amount of an audio signal sent to the signal processing section 3307 is reduced, the reduction in the data amount affects the degree of speech rate conversion, but does not affect the adjustment of pitch of a sound.

Further, the period 3801 and the period 3803 correspond to the first range of the first parameter R, and the period 3802, the period 3809 and the period 3804 correspond to the second range of the first parameter R. Further, the period 3801 and the period 3802 correspond to the third range of the first parameter R, and the period 3809 corresponds to the fourth range of the first parameter R.

In the examples as shown in FIGS. 38A and 38B, when the first parameter R is 1 to 4, that is, when playing back at 1 to 4 times speed, only speech rate conversion is performed, and when the first parameter R is more than 4, that is, when playing back at more than 4 times speed, pitch of a sound is raised along with converting the speech rate. By performing such processing, when playing back at 1 to 4 times speed, speech of a talker gradually accelerates in accordance with the playback speed, and when playing back at more than 4 times speed, the pitch of a sound is gradually raised as the speech of a talker is accelerated.

Further, when the first parameter R is 1 to 20, that is, when playing back at 1 to 20 times speed, signal is read continuously, and when the first parameter R is more than 20, that is, when playing back at more than 20 times speed, signal is read intermittently. By performing such processing, playback speed exceeding 20 times speed, which is considered to be the upper limit for playback in a case of reading signal continuously, can be realized.

Incidentally, in FIG. 38A, the period 3802 and the period 3809 are shown with broken lines since the value of the second parameter Rs changes depending on the method for changing the pitch of a sound. When using the methods as shown in FIGS. 12 to 14 as a method for changing the pitch of a sound, the number of samples decreases as the pitch of a sound is raised, and thus, the lines of the period 3802 and the period 3809 are shown in broken lines. However, when using a method where the number of samples does not decrease or a method where the decrease amount is small is used as a method for changing the pitch of a sound, the period 3802 and the period 3809 will be set differently from the broken lines as shown in FIG. 38A.

Further, when the increase rate of the number of samples in the method for changing the pitch of a sound is Rd, the parameter adjustment section 3301 has the characteristics as indicated by the Condition 4 described above. Here, for example, when the number of samples is 2 times, the increase rate is 2, and when the number of samples is reduced to half, the increase rate is ½.

(Method for Controlling Variant Factor for Playback Speed According to the Embodiment)

Figure 39:
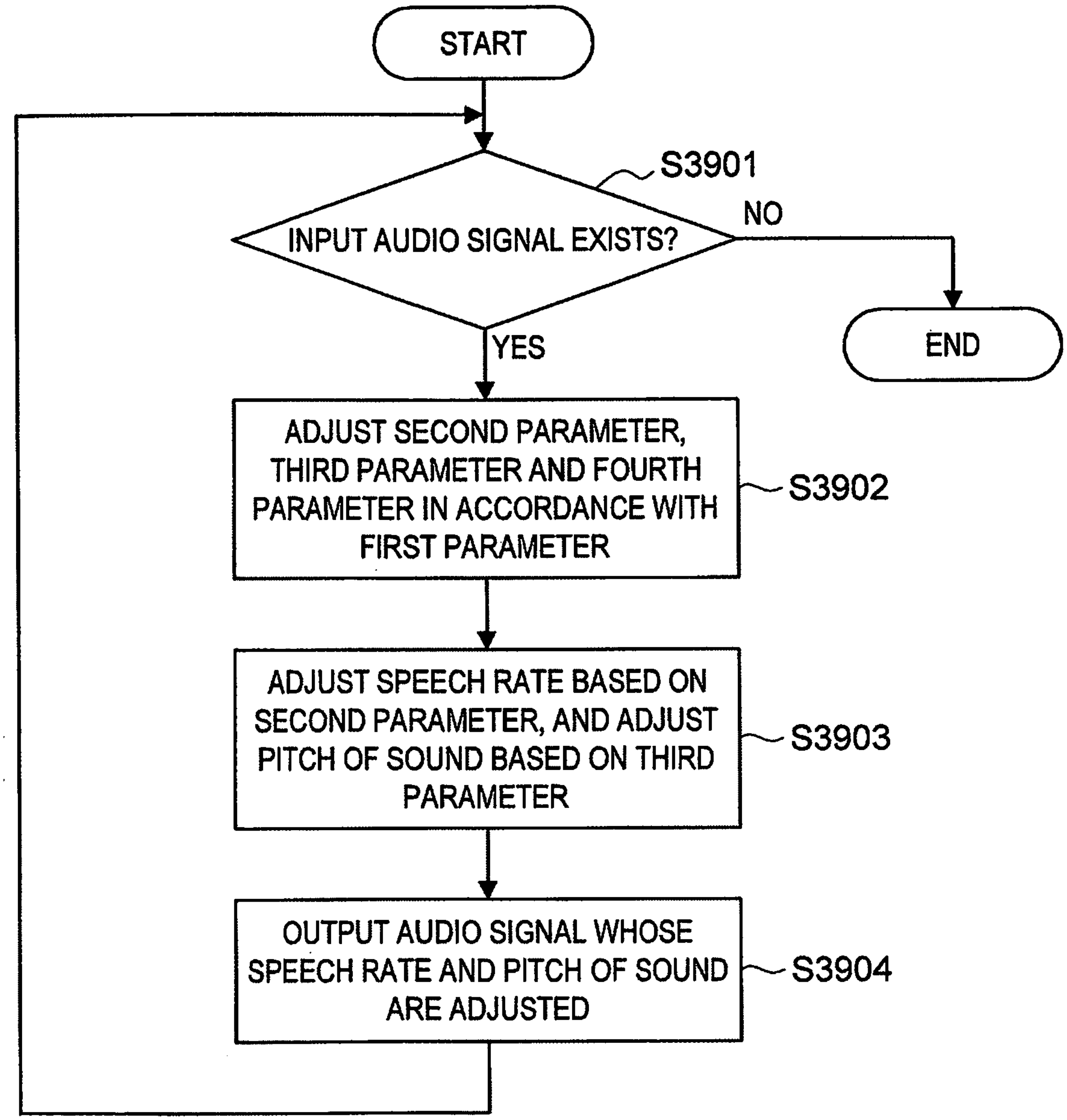
FIG. 39 is a flow chart showing a flow of the processing by the information processing apparatus according to the embodiment.

FIG. 39 is a flow chart showing a flow of the processing by the information processing apparatus 3300 according to the embodiment. First, the information processing apparatus 3300 judges whether there is an input audio signal or not (step S3901), and when there is no input audio signal, the processing is terminated. Further, when an input audio signal does exist, the parameter adjustment section 3301 of the information processing apparatus 3300 adjusts the second parameter Rs, the third parameter Rp and the fourth parameter Rt in accordance with the first parameter R that is input (step S3902). The adjustment is performed in such a way to meet the Conditions 1 to 4 and the Conditions A and B described above. Subsequently, the signal processing section 3307 of the information processing apparatus 3300 adjusts speech rate and pitch of a sound of the audio signal sent from the content management section 3303 in accordance with the second parameter Rs and the third parameter Rp that are adjusted (step S3903). Subsequently, the information processing apparatus 3300 outputs the audio signal whose speech rate and pitch of a sound are adjusted (step S3304). Then, returning to step S3901, the processing above is repeated.

By repeating such processing, the information processing apparatus 3300 according to the embodiment is enabled to control a variant factor for playback speed of an audio signal.

As described by referring to FIGS. 33 to 39, according to the method for controlling a variant factor for playback speed according to the embodiment, it is possible to adjust only the speech rate in the first range of the first parameter R, and adjust the pitch of a sound along with the speech rate in the second range of the first parameter R. Accordingly, the first problem is solved in the first range of the first parameter R and the second problem is solved in the second range of the first parameter R. Further, signal may be read continuously in the third range of the first parameter R, and intermittently in the fourth range of the first parameter R. Accordingly, the third problem may be remedied in the fourth range, and the fourth range may be extended and the upper limit of playback speed may be raised.

(Signal Processing Section 3307)

Figure 40:
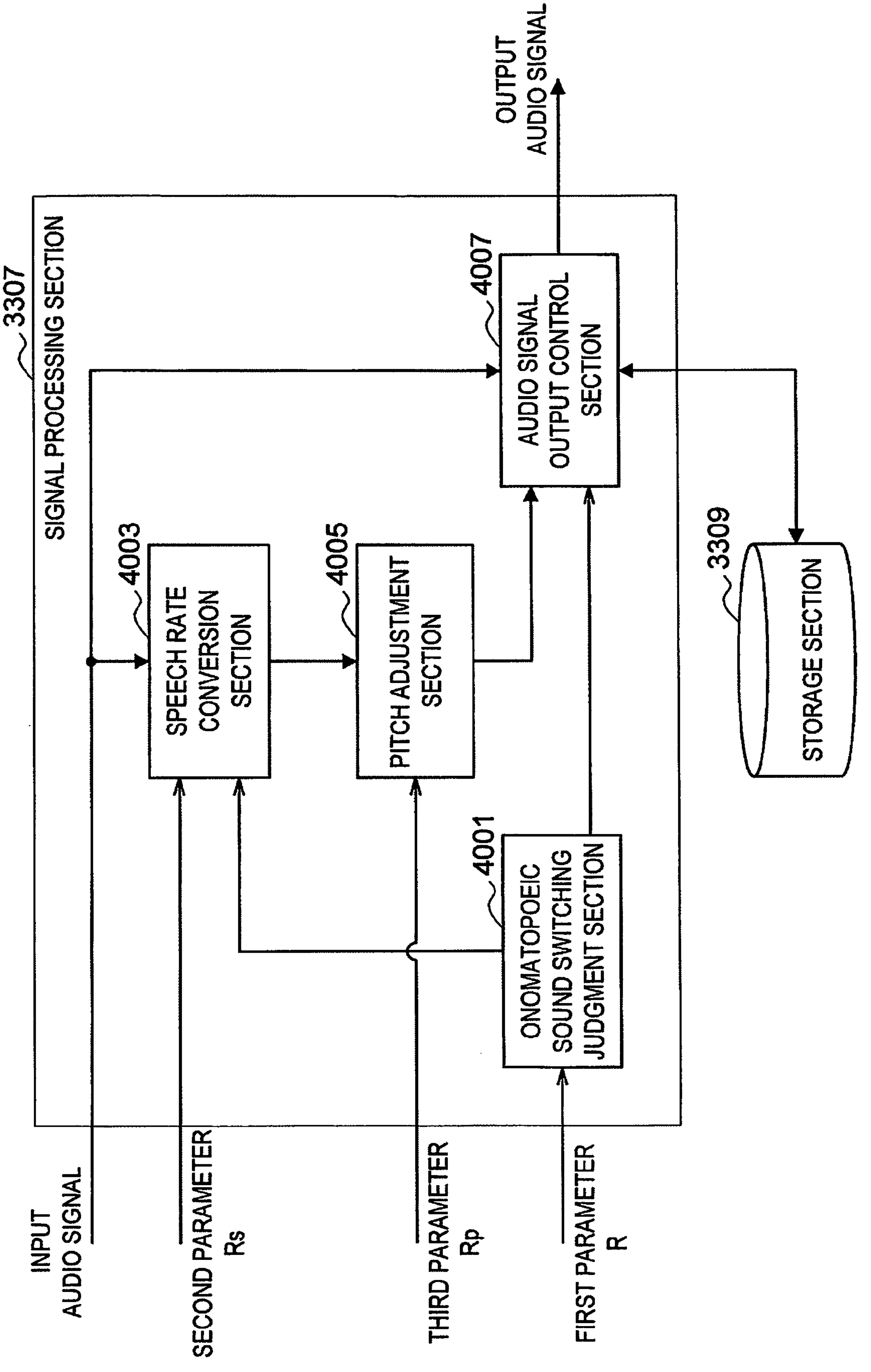
FIG. 40 is a block diagram showing a function of a signal processing section according to the embodiment.

Subsequently, by referring to FIG. 40, an example of the signal processing section 3307 according to the embodiment will be described in detail. FIG. 40 is a block diagram showing a function of the signal processing section 3307 according to the embodiment.

As shown in FIG. 40, the signal processing section 3307 according to the embodiment mainly includes, for example, an onomatopoeic sound switching judgment section 4001, a speech rate conversion section 4003, a pitch adjustment section 4005, and an audio signal output control section 4007.

The onomatopoeic sound switching judgment section 4001, the speech rate conversion section 4003, the pitch adjustment section 4005 and the audio signal output control section 4007 according to the embodiment respectively has configuration almost identical to that of the onomatopoeic sound switching judgment section 2101, the speech rate conversion section 2103, the pitch adjustment section 2105 and the audio signal output control section 2107 according to the first embodiment of the present invention, and achieves the similar effect, and thus, a detailed description thereof will be omitted.

Figure 41A:
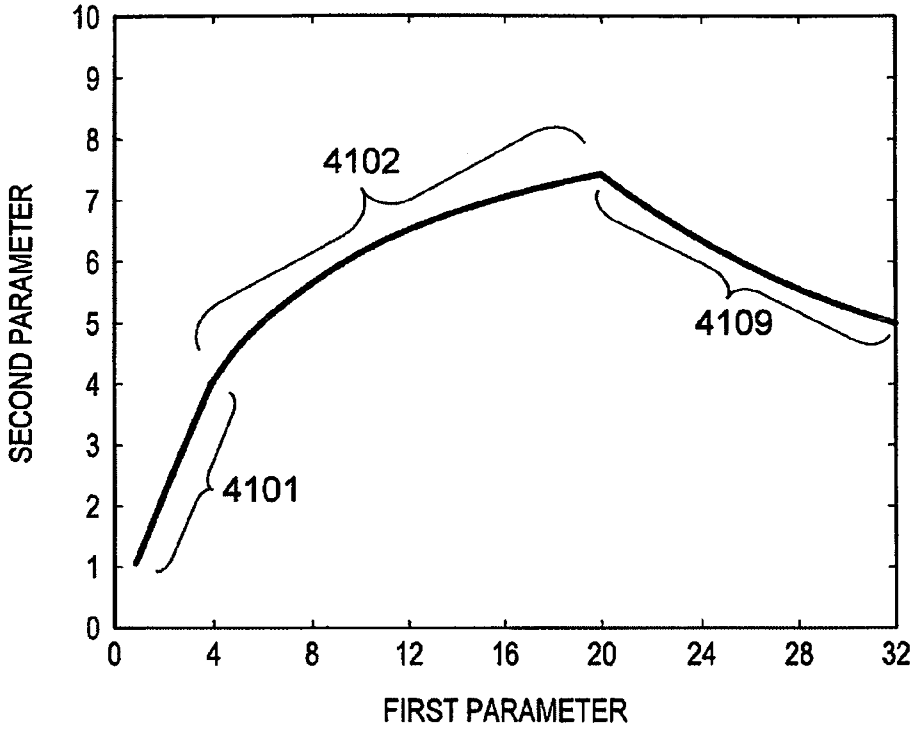
FIG. 41A is a graph chart showing the relationship between the first parameter R and the second parameter Rs.
Figure 41B:
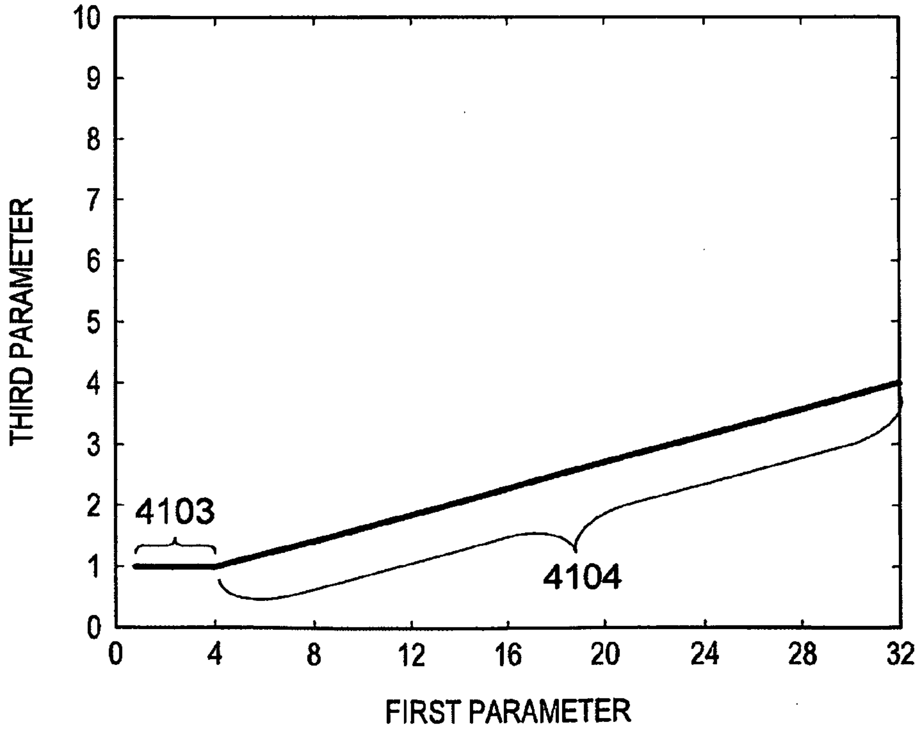
FIG. 41B is a graph chart showing the relationship between the first parameter R and the third parameter Rp.

FIGS. 41A and 41B are explanatory diagrams showing examples of method for adjusting a parameter performed by the parameter adjustment section 3301 of the information processing apparatus 3300 having the signal processing section 3307 as shown in FIG. 40.

The parameter adjustment section 3301 includes both of the Condition A and the Condition B described above. FIG. 41A is a graph chart showing the relationship between the first parameter R and the second parameter Rs, and FIG. 41B is a graph chart showing the relationship between the first parameter R and the third parameter Rp.

As shown in FIG. 41A, a graph chart in which the horizontal axis represents the first parameter R and the vertical axis represents the second parameter Rs is configured with more than three regions with different ascending rates (in other words, gradients of the graph chart) of the second parameter Rs. Similarly, as shown in FIG. 41B, a graph chart in which the horizontal axis represents the first parameter R and the vertical axis represents the third parameter Rp is configured with at least two regions with different ascending rates of the third parameter Rp.

When the pitch adjustment section 4005 of the signal processing section 3307 adjusts the pitch with the methods as shown in FIGS. 12 to 14C, the parameter adjustment section 3301 determines the second parameter Rs and the third parameter Rp in accordance with the first parameter R that is input by referring to the databases as shown in FIGS. 41A and 41B stored in the storage section 3309 under the four conditions indicated below.

Condition 1: The second parameter Rs is determined to be in proportion to the first parameter R when the first parameter R that is input exists in a period 4101 (in other words, the second parameter Rs is determined so that the second parameter Rs is equal to the first parameter R).

Condition 2: The third parameter Rp is constantly set to 1 when the first parameter R that is input exists in a period 4103.

Condition 3: The third parameter Rp increases as the first parameter R increases when the first parameter R that is input exists in a period 4104.

Condition 4': The first parameter R×the fourth parameter Rt=the second parameter Rs×the third parameter Rp is established in the first range and the second range (the third range and the fourth range).

Here, in a period 4109, the second parameter Rs is reduced since it is affected by the Condition B described above. Incidentally, as is apparent from FIGS. 41A and 41B, the fourth parameter Rt affects the second parameter Rs, but does not affect the third parameter Rp. In other words, when the data amount of an audio signal sent to the signal processing section 3307 is reduced, the reduction in the data amount affects the degree of speech rate conversion, but does not affect the adjustment of pitch of a sound.

Further, the period 4101 and the period 4103 correspond to the first range of the first parameter R, and the period 4102, the period 4109 and the period 4104 correspond to the second range of the first parameter R. Further, the period 4101 and the period 4102 correspond to the third range of the first parameter R, and the period 4109 corresponds to the fourth range of the first parameter R.

In the examples as shown in FIGS. 41A and 41B, when the first parameter R is 1 to 4, that is, when playing back at 1 to 4 times speed, only speech rate conversion is performed, and when the first parameter R is more than 4, that is, when playing back at more than 4 times speed, pitch of a sound is raised along with converting the speech rate. By performing such processing, when playing back at 1 to 4 times speed, speech of a talker gradually accelerates in accordance with the playback speed, and when playing back at more than 4 times speed, the pitch of a sound is gradually raised as the speech of a talker is accelerated.

Further, when the first parameter R is 1 to 20, that is, when playing back at 1 to 20 times speed, signal is read continuously, and when the first parameter R is more than 20, that is, when playing back at more than 20 times speed, signal is read intermittently. By performing such processing, playback speed exceeding 20 times speed, which is the upper limit for playback when thinned playback is not performed, can be realized.

Heretofore, an example of the function of the information processing apparatus 3300 according to the embodiment has been described. Each of the above structural elements may be configured with versatile components or circuits, or may be configured with hardwares specializing in functions of each of the structural elements. Further, a CPU or the like may perform all the functions. Accordingly, it is possible to change the configuration to be used as appropriate in accordance with the various technical levels of carrying out the embodiment.

(Signal Processing Method According to the Embodiment)

Figure 42:
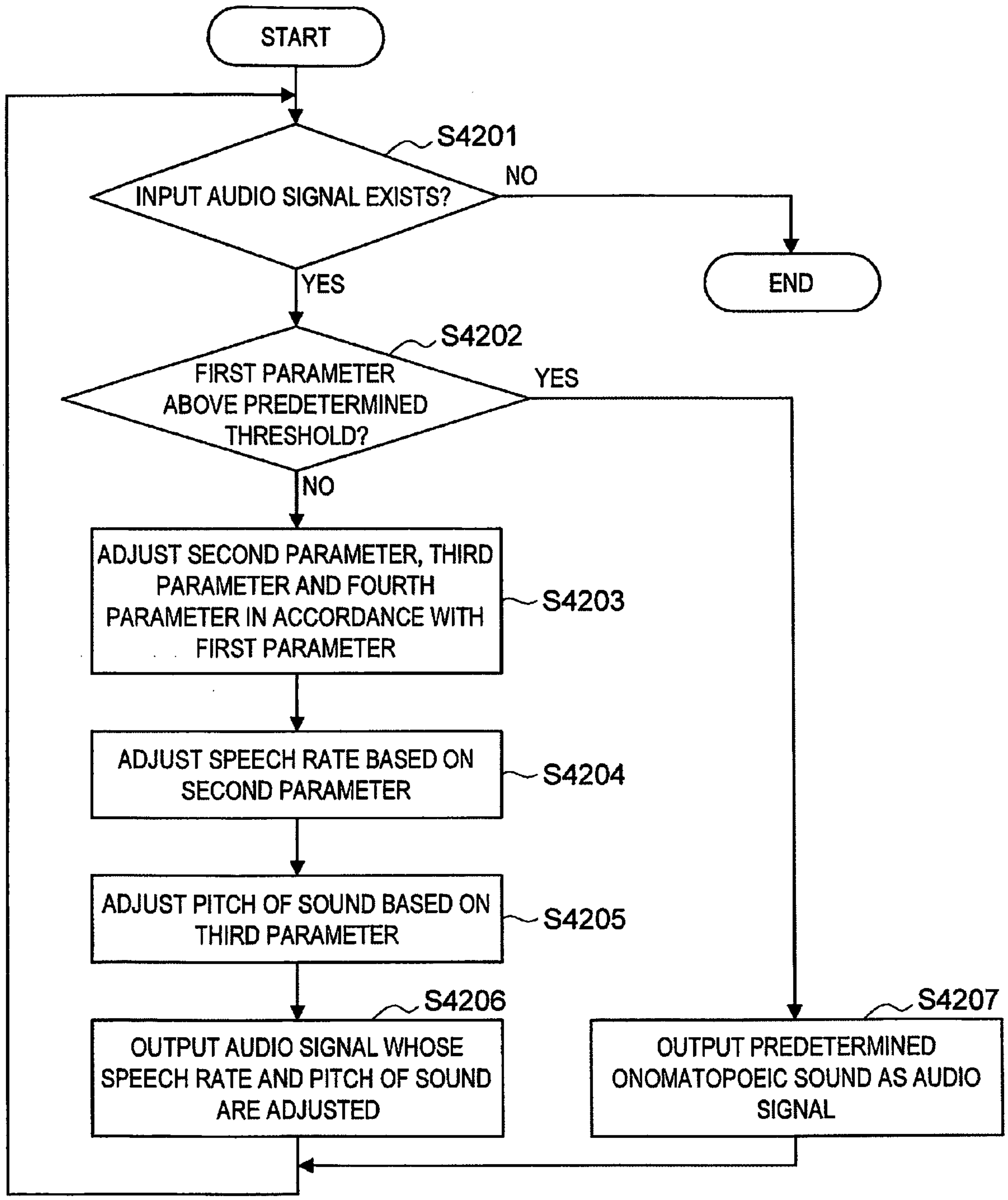
FIG. 42 is a flow chart showing a signal processing method according to the embodiment.

Subsequently, by referring to FIG. 42, a signal processing method according to the embodiment will be described in detail. FIG. 42 is a flow chart showing a signal processing method according to the embodiment.

First, the signal processing section 3307 of the information processing apparatus 3300 judges whether there is an audio signal sent from the content management section 3303 or not (step S4201), and terminates the processing when there is no audio signal sent from the content management section 3303. Further, when an audio signal sent from the content management section 3303 does exist, the onomatopoeic sound switching judgment section 4001 of the signal processing section 3307 judges whether the first parameter R that is input is above a predetermined threshold or not (step S4202). When the first parameter R is less than the predetermined threshold, the parameter adjustment section 3301 adjusts the second parameter Rs, the third parameter Rp and the fourth parameter Rt in accordance with the first parameter R that is input (step S4203), and sends the parameters to the signal processing section 3307. The speech rate conversion section 4003 of the signal processing section 3307 adjusts speech rate of the input audio signal based on the second parameter Rs sent (step S4204), and outputs the audio signal whose speech rate is adjusted to the pitch adjustment section 4005. The pitch adjustment section 4005 adjusts pitch of a sound of the audio signal sent from the speech rate conversion section 4003 based on the third parameter Rp sent (step S4205). The audio signal whose speech rate and pitch of a sound are adjusted is sent to the audio signal output control section 4007, and the audio signal output control section 4007 outputs the audio signal whose speech rate and pitch of a sound are adjusted (step S4206). Then, returning to step S4201, the processing above is repeated.

On the other hand, when it is judged by the onomatopoeic sound switching judgment section 4001 that the first parameter R is above the predetermined threshold, the audio signal output control section 4007 outputs a predetermined onomatopoeic sound stored in the storage section 3309 and the like as an audio signal (step S4207). Then, returning to step S4201, the processing above is repeated.

By repeating such processing, the information processing apparatus 3300 according to the embodiment is enabled to control a variant factor for playback speed of an audio signal in such a way that a playback speed after conversion can be auditorily recognized.

(First Modified Example of Second Embodiment)

Figure 43:
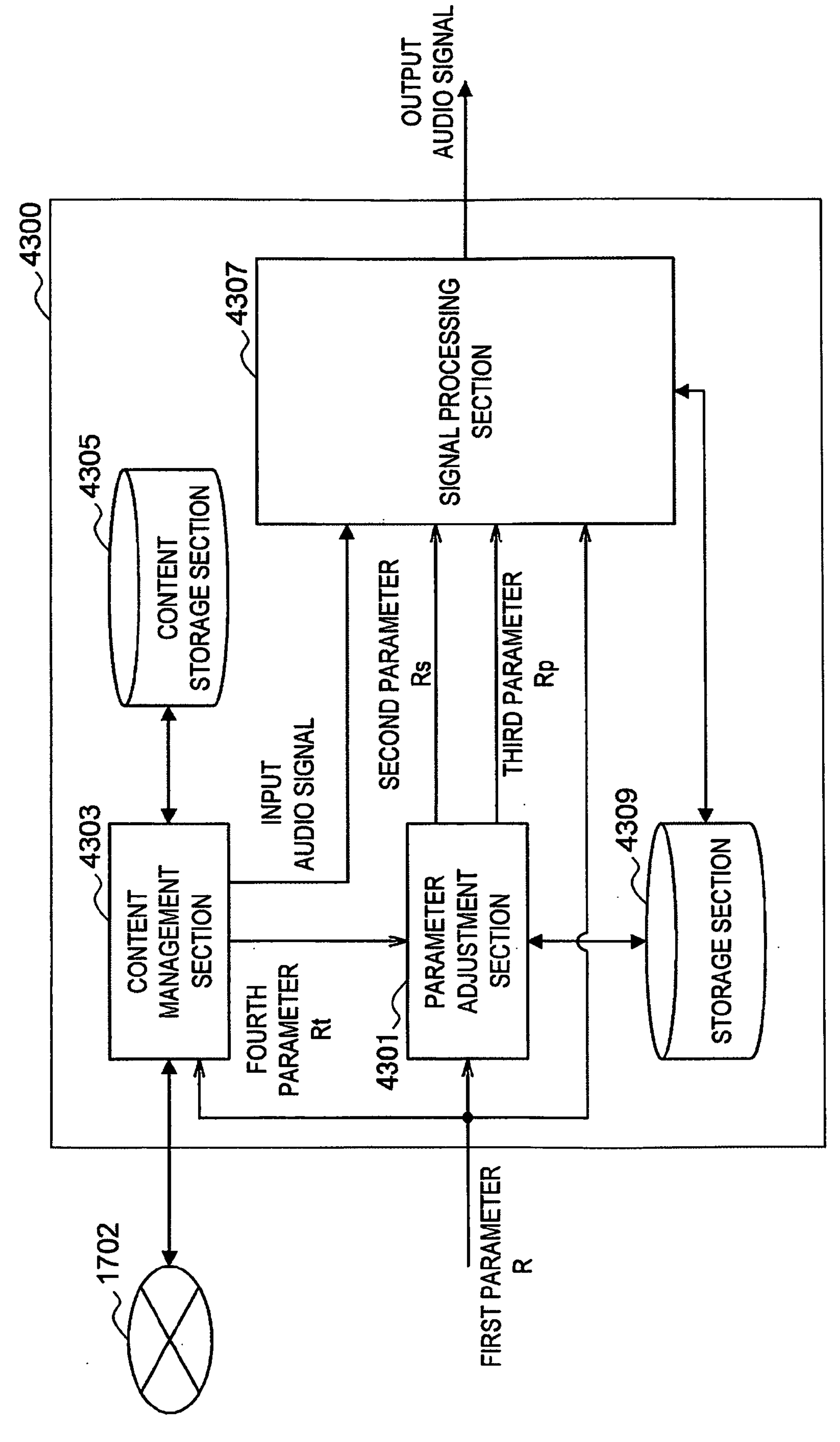
FIG. 43 is a block diagram showing a function of a first modified example of the information processing apparatus according to the embodiment.

Subsequently, by referring to FIG. 43, a configuration of an information processing apparatus 4300 according to a first modified example of the second embodiment of the present invention will be described in detail. FIG. 43 is a block diagram showing a function of the information processing apparatus 4300 according to the modified embodiment.

The modified example as shown in FIG. 43 is an example where a content management section 4303 sets the fourth parameter Rt. For example, when the information processing apparatus 4300 according to the modified example is used as a video-recording/playback apparatus, there is a case where playback of content and video-recording of another program are performed simultaneously. In such a case, the video-recording/playback apparatus has to perform playback and recording simultaneously and amount of the processing that can be allocated to the playback processing is reduced compared to a case of performing only the playback. As such, since the amount of processing on a playback processing possibly changes depending on the circumstances, thinning rate should be determined in accordance with the amount of processing that can be spared on the processing amount. The information processing apparatus 4300 according to the modified example enables such processing by including the content management section 4303 as described below.

As shown in FIG. 43, the information processing apparatus 4300 according to the modified example mainly includes, for example, a parameter adjustment section 4301, a content management section 4303, a content storage section 4305, a signal processing section 4307 and a storage section 4309.

Here, the content storage section 4305, the signal processing section 4307 and the storage section 4309 respectively has configuration almost identical to that of the content storage section 3305, the signal processing section 3307 and the storage section 3309 of the information processing apparatus 3300 according to the second embodiment of the present invention, and achieves the similar effect, and thus, a detailed description thereof will be omitted.

The parameter adjustment section 4301 is configured with a CPU, a ROM, a RAM, and the like, for example, and adjusts a second parameter Rs and a third parameter Rp in accordance with a first parameter R that is input from the outside and a fourth parameter Rt sent from the content management section 4303 described later. As described in the second embodiment of the present invention, settings of the second parameter Rs and the third parameter Rp are determined so as to satisfy the conditions as described in the second embodiment, by referring to the databases stored in the storage section 4309 showing the relationships of the first parameter R to the second parameter Rs and the third parameter Rp. The parameter adjustment section 4301 sends the second parameter Rs and the third parameter Rp determined to the signal processing section 4307.

The content management section 4303 is configured with a CPU, a ROM, a RAM, and the like, for example, and manages content including an audio signal which may be played back by the information processing apparatus 4300 according to the embodiment. The content management section 4303 stores, in the content storage section 4305, the content including the audio signal in association with the title of the content, the ID and the attribute information and the like of the content, for example. The content management section 4303 obtains content from the content storage section 4305 in accordance with a playback instruction for the content input from outside of the information processing apparatus 4300 and outputs the same to the signal processing section 4307. At the time of outputting the content to the signal processing section 4307, the content management section 4303 determines a fourth parameter Rt corresponding to the thinning rate of data in accordance with amount of resource which may be used for the output of the content, and determines amount of data to be sent in accordance with the fourth parameter Rt determined. Further, the content management section 4303 sends the fourth parameter Rt determined to the parameter adjustment section 3401. Incidentally, when content data read from the content storage section 4305 is encoded data, the content management section 4303 decodes the data by a decoder not shown and outputs the data to the signal processing section 4307.

Further, the content management section 4303 may obtain content including an audio signal to be played back via the network 1702 such as the Internet and a home network. The content management section 4303 may record the content obtained via the network 1702 in the content storage section 4305.

Heretofore, an example of the function of the information processing apparatus 4300 according to the modified example has been described. Each of the above structural elements may be configured with versatile components or circuits, or may be configured with hardwares specializing in functions of each of the structural elements. Further, a CPU or the like may perform all the functions. Accordingly, it is possible to change the configuration to be used as appropriate in accordance with the various technical levels of carrying out the modified example.

(Signal Processing Method According to Modified Example)

Figure 44:
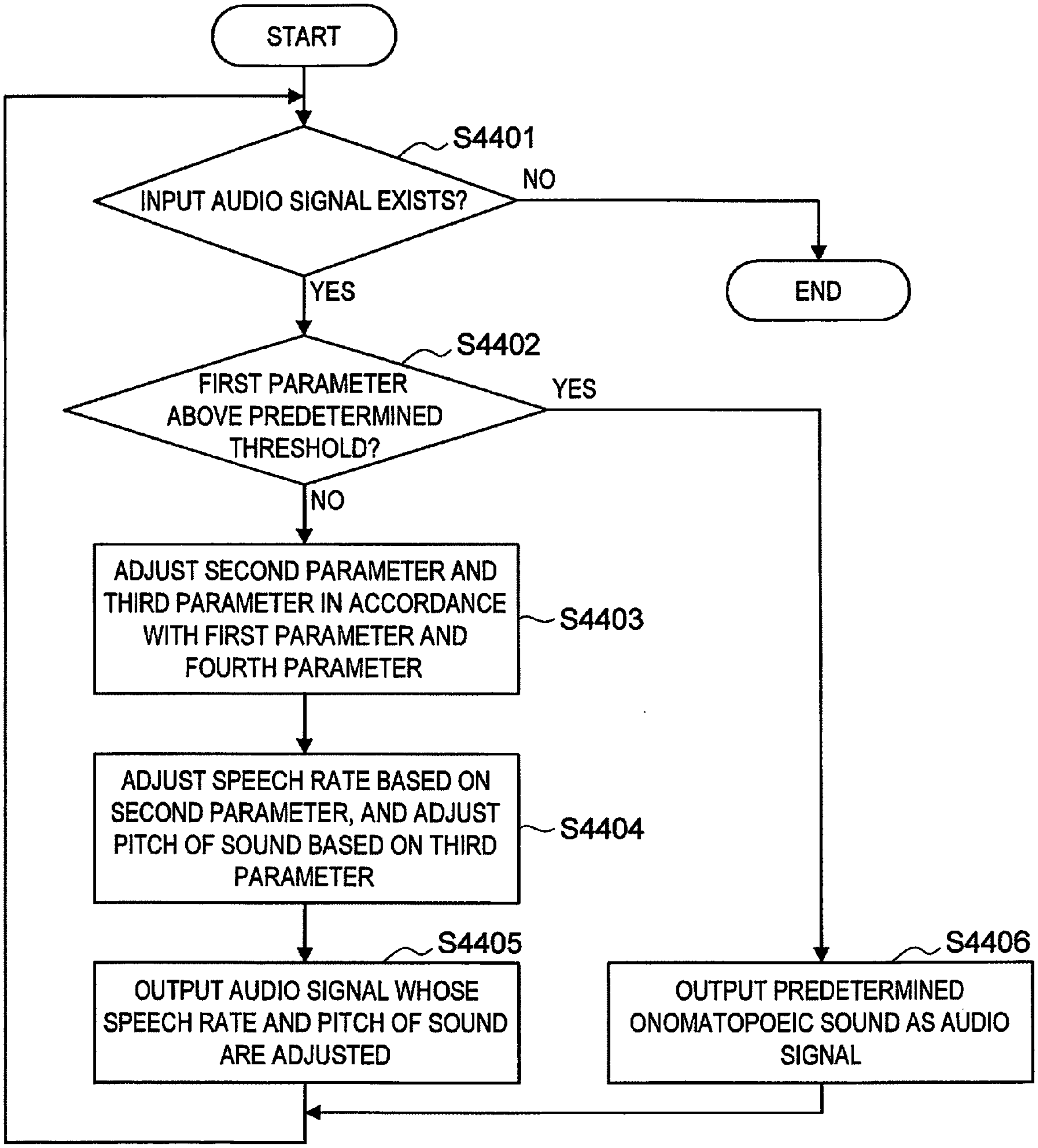
FIG. 44 is a flow chart showing a signal processing method according to the modified example.

Subsequently, by referring to FIG. 44, the signal processing method according to the modified example will be described in detail. FIG. 44 is a flow chart showing the signal processing method according to the modified example.

First, the signal processing section 4307 of the information processing apparatus 4300 judges whether there is an audio signal sent from the content management section 4303 or not (step S4401), and terminates the processing when there is no audio signal sent from the content management section 4303. Further, when an audio signal sent from the content management section 4303 does exist, an onomatopoeic sound switching judgment section of the signal processing section 4307 judges whether the first parameter R that is input is above the predetermined threshold or not (step S4402). When the first parameter R is less than the predetermined threshold, the parameter adjustment section 4301 adjusts the second parameter Rs and the third parameter Rp in accordance with the first parameter R that is input and the fourth parameter Rt sent from the content management section 4303 (step S4403), and sends the parameters to the signal processing section 4307. The signal processing section 4307 adjusts speech rate and pitch of a sound of the input audio signal based on the second parameter Rs and the third parameter Rp sent (step S4404). The audio signal whose speed rate and pitch of a sound are adjusted is sent to an audio signal output control section, and the audio signal output control section outputs the audio signal whose speech rate and pitch of a sound are adjusted (step S4405). Then, returning to step S4401, the processing above is repeated On the other hand, when it is judged by the onomatopoeic sound switching judgment section that the first parameter R is above the predetermined threshold, the audio signal output control section outputs a predetermined onomatopoeic sound stored in the storage section 4309 and the like as an audio signal (step S4406). Then, returning to step S4401, the processing above is repeated.

By repeating such processing, the information processing apparatus 4300 according to the embodiment is enabled to control a variant factor for playback speed of an audio signal in such a way that a playback speed after conversion can be auditorily recognized.

(Modified Example of Signal Processing Sections 3307, 4307)

Figure 45:
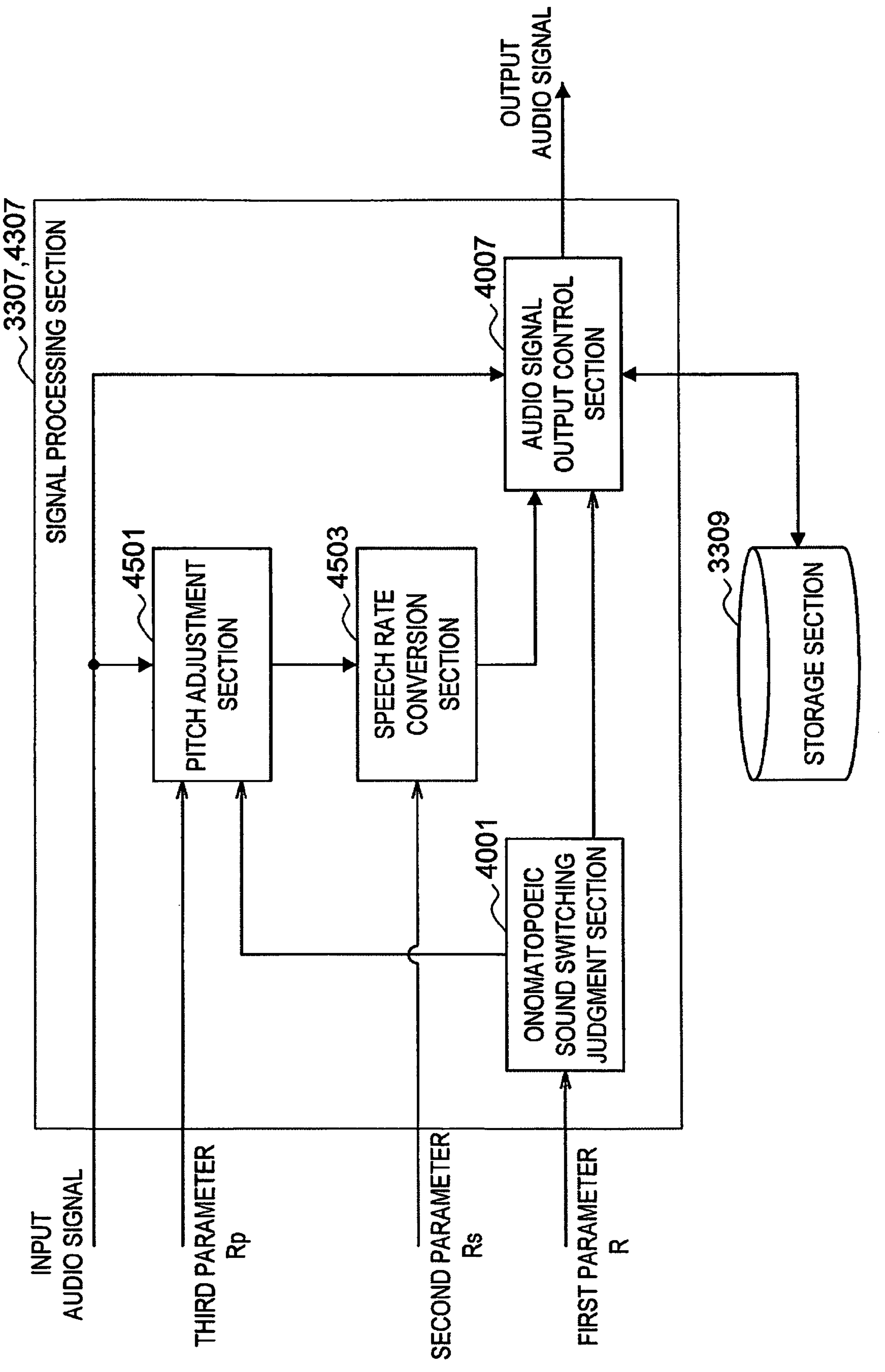
FIG. 45 is a block diagram showing a modified example of the signal processing section according to the embodiment and the modified example.

Subsequently, by referring to FIG. 45, a modified example of the signal processing sections 3307, 4307 according to the embodiment and the modified example will be described. FIG. 45 is a block diagram showing a modified example of the signal processing sections 3307, 4307.

As shown in FIG. 45, the signal processing section according to the modified example mainly includes the onomatopoeic sound switching judgment section 4001, a pitch adjustment section 4501, a speech rate conversion section 4503 and the audio signal output control section 4007.

The onomatopoeic sound switching judgment section 4001, the pitch adjustment section 4501, the speech rate conversion section 4503 and the audio signal output control section 4007 according to the modified example respectively has configuration almost identical to that of the onomatopoeic sound switching judgment section 2101, the pitch adjustment section 2901, the speech rate conversion section 2903 and the audio signal output control section 2107 according to the first modified example of the first embodiment of the present invention, and achieves the similar effect, and thus, a detailed description thereof will be omitted.

(Signal Processing Method According to Modified Example)

Figure 46:
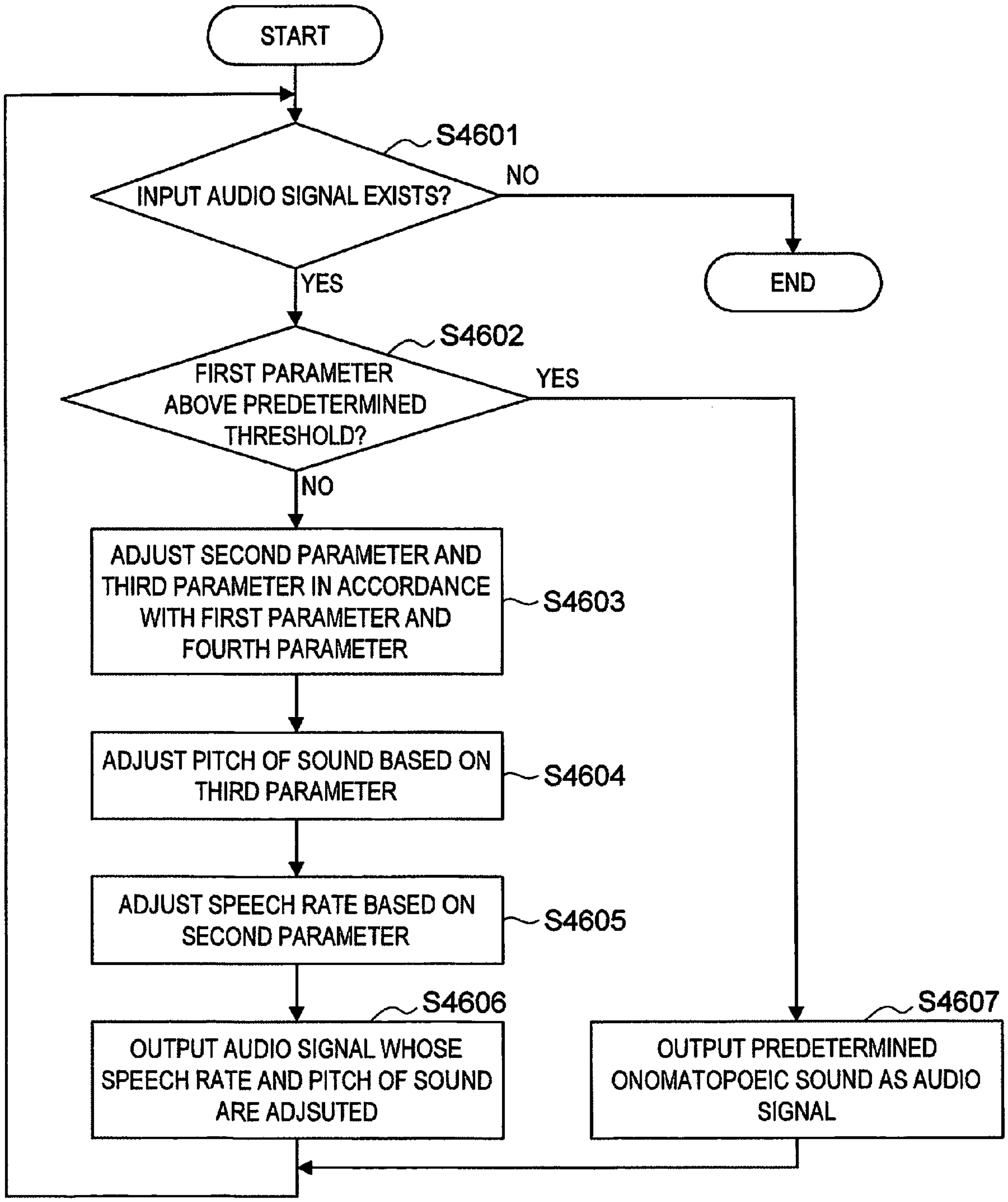
FIG. 46 is a flow chart showing a signal processing method according to the modified example.

Subsequently, by referring to FIG. 46, a signal processing method according to the modified example will be described in detail. FIG. 46 is a flow chart showing the signal processing method according to the modified example.

First, the information processing apparatus 4300 judges whether there is an input audio signal or not (step S4601), and terminates the processing when there is no input audio signal. Further, when an input audio signal does exist, the onomatopoeic sound switching judgment section 4001 of the signal processing section 4307 judges whether the first parameter R that is input is above the predetermined threshold or not (step S4602). When the first parameter R is less than the predetermined threshold, the parameter adjustment section 4301 adjusts the second parameter Rs and the third parameter Rp in accordance with the first parameter R that is input and the fourth parameter Rt sent from the content management section 4303 (step S4603), and sends the parameters to the signal processing section 4307. The pitch adjustment section 4501 of the signal processing section 4307 adjusts pitch of a sound of the input audio signal sent based on the third parameter Rp sent (step S4604), and sends the audio signal whose pitch of a sound is adjusted to the speech rate conversion section 4503. The speech rate conversion section 4503 adjusts speech rate of the audio signal whose pitch of a sound is adjusted based on the second parameter Rs sent (step S4605). The audio signal whose speech rate and pitch of a sound are adjusted is sent to the audio signal output control section 4007, and the audio signal output control section 4007 outputs the audio signal whose speech rate and pitch of a sound are adjusted (step S4606). Then, returning to step S4601, the processing above is repeated.

On the other hand, when it is judged by the onomatopoeic sound switching judgment section 4001 that the first parameter R is above the predetermined threshold, the audio signal output control section 4007 outputs a predetermined onomatopoeic sound stored in the storage section 3309 and the like as an audio signal (step S4607). Then, returning to step S4601, the processing above is repeated.

By repeating such processing, the information processing apparatus 4300 according to the modified example is enabled to control a variant factor for playback speed of an audio signal in such a way that a playback speed after conversion can be auditorily recognized.

As described above, with the information processing apparatus according to the second embodiment and each modified example of the present invention, it is possible to determine speech rate conversion rate and conversion rate of pitch of a sound of an audio signal while recognizing the decrease in the number of samples configuring the audio data by the thinning out at the time of sending the audio signal. By using such apparatus, when playing back at approximately the normal speed, the playback speed is changed but pitch of a sound does not change, and it becomes easy to comprehend the content of speech of a talker or to identify the talker. At the same time, in high speed playback/low speed playback, pitch of a sound is also changed when converting the playback speed, and thus, the playback speed at the time can be auditorily sensed, and additionally, with adjustments such as continuous reading and intermittent reading, the upper limit of playback speed at the time of high speed playback may be dramatically raised. Accordingly, with the information processing apparatus according to the embodiment, the operability can be improved.

(Hardware Configuration of Information Processing Apparatus)

Figure 47:
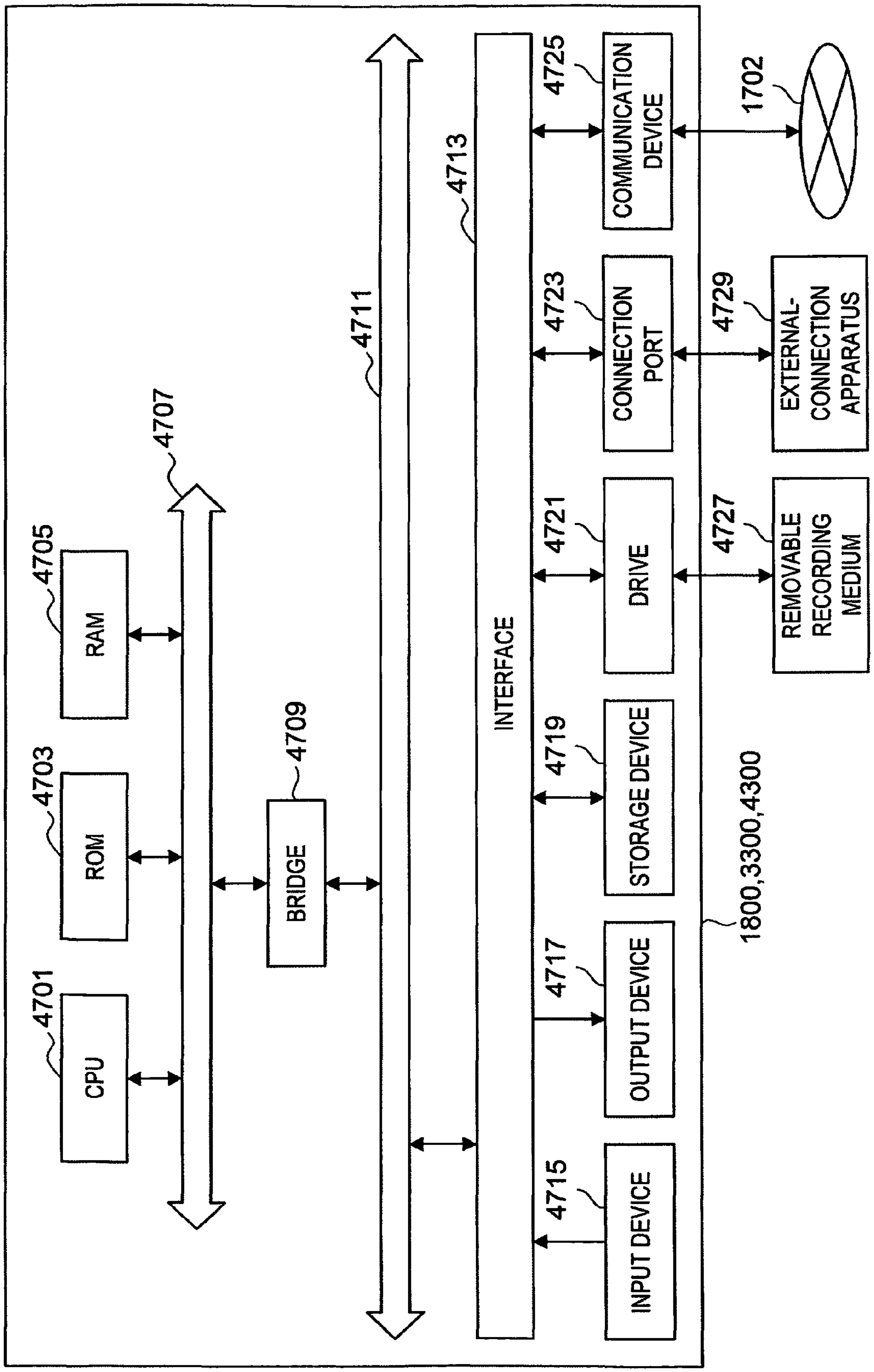
FIG. 47 is a block diagram showing a hardware configuration of the information processing apparatus according to each embodiment of the present invention.

Subsequently, by referring to FIG. 47, a hardware configuration of the information processing apparatus according to each embodiment of the present invention will be described in detail. FIG. 47 is a block diagram showing a hardware configuration of the information processing apparatus according to each embodiment of the present invention.

The information processing apparatuses 1800, 3300, 4300 mainly include a CPU 4701, a ROM 4703, a RAM 4705, a host bus 4707, a bridge 4709, an external bus 4711, an interface 4713, an input device 4715, an output device 4717, a storage device 4719, a drive 4721, a connection port 4723 and a communication device 4725.

The CPU 4701 functions as an arithmetic processing device and a control device, and controls the entire operation or a part of the operation of the information processing apparatuses 1800, 3300, 4300 according to various programs stored in the ROM 4703, the RAM 4705, the storage device 4719 or a removable recording medium 4727. The ROM 4703 stores program, calculation parameter and the like used by the CPU 4701. The RAM 4705 temporarily stores programs to be used during execution by the CPU 4701, parameters that change as needed during the execution, and the like. These are connected with each other by the host bus 4707 configured by an internal bus such as a CPU bus.

The host bus 4707 is connected to the external bus 4711 such as a PCI (Peripheral Component Interconnect/Interface) bus via the bridge 4709.

The input device 4715 is an operation means to be operated by a user such as a mouse, a key board, a touch panel, buttons, a switch and a lever, for example. Further, the input device 4715 may be a remote control means (so-called remote controller) using infrared rays or other radio wave, or it may be an external-connection apparatus 4729 such as a cellular phone, a PDA and the like associated with the operation of the information processing apparatuses 1800, 3300, 4300. Further, the input device 4715 generates an input signal based on the information input by a user by using the operation means as described above, for example. A user of the information processing apparatuses 1800, 3300, 4300 can input various data to the information processing apparatuses 1800, 3300, 4300 or can instruct processing operation by operating on the input device 4715.

The output device 4717 is configured by a device capable of visually or auditorily notifying a user of obtained information, for example, a display device such as a CRT display, a liquid crystal display, a plasma display, an EL display and a lamp, an audio output device such as a speaker and headphones, a printer device, a cellular phone and a facsimile. The output device 4717 outputs the result obtained by various processings performed by the information processing apparatuses 1800, 3300, 4300, for example. Specifically, the display device displays as text or image the result obtained by various processings performed by the information processing apparatuses 1800, 3300, 4300. On the other hand, the audio output device converts an audio signal consisting of audio data, acoustic data or the like that is played back to an analog signal and outputs the same.

The storage device 4719 is a device for storing data configured as an example of a storage section of the information processing apparatuses 1800, 3300, 4300, and is configured of a magnetic storage device such as a HDD (Hard Disk Drive), a semiconductor storage device, an optical storage device or a magneto-optical storage device, for example. The storage device 4719 stores programs to be executed by the CPU 4701 and various data, acoustic signal data and image signal data obtained from outside, and the like.

The drive 4721 is a reader/writer used in conjunction with a recording medium, and is embedded in the information processing apparatuses 1800, 3300, 4300 or provided as an peripheral drive. The drive 4721 reads information recorded in the removable recording medium 4727 such as a magnetic disk, an optical disk, a magneto-optical disk or a semiconductor memory loaded therein, and outputs the information to the RAM 4705. Further, the drive 4721 may write the record in the removable recording medium 4727 such as a magnetic disk, an optical disk, a magneto-optical disk or a semiconductor memory loaded therein. The removable recording medium 4727 is a DVD media, a HD-DVD media, a Blu-ray media, a compact flash (CF) (a registered trademark), a memory stick, an SD (Secure Digital) memory card or the like. Further, the removable recording medium 4727 may be, for example, an IC card (Integrated Circuit card) with a non-contact IC chip embedded therein or an electronic device.

The connection port 4723 is a port such as an USB (Universal Serial Bus) port, an IEEE 1394 port such as an i.Link, an SCSI (Small Computer System Interface) port, a RS-232C port, an optical audio terminal and an HDMI (High-Definition Multimedia Interface) port for directly connecting a device to the information processing apparatuses 1800, 3300, 4300. By connecting the external-connection apparatus 4729 to the connection port 4723, the information processing apparatuses 1800, 3300, 4300 obtain acoustic signal data or image signal data directly from the external-connection apparatus 4729, or provide the external-connection apparatus 4729 with acoustic signal data or image signal data.

The communication device 4725 is a communication interface configured with a communication device and the like for connecting to the network 1702, for example. The communication device 4725 is, for example, a communication card for a wired or wireless LAN (Local Area Network), a Bluetooth or a WUSB (Wireless USB), a router for optical communication, a router for ADSL (Asymmetric Digital Subscriber Line), or a modem for various communications. The communication device 4725 can transmit/receive an acoustic signal and the like to/from the Internet and other communication devices, for example. Further, the network 1702 to be connected to the communication device 4725 is configured of a network or the like connected in a wired or wireless manner, and it may be the Internet, a home LAN, an infrared communication, a radio wave communication, satellite communications or the like.

With the configuration as described above, the information processing apparatuses 1800, 3300, 4300 can obtain information relating to acoustic signal and the like from various information resources and send the information relating to the acoustic signal and the like to the external-connection apparatus 4729, the content server 1703 and the client apparatus 1704 connected to the connection port 4723 or the network 1702, and also, the information processing apparatuses 1800, 3300, 4300 can receive information relating to the acoustic signal from the external-connection apparatus 4729, the content server 1703 and the client apparatus 1704 and obtain information relating to the acoustic signal in the external-connection apparatus 4729, the content server 1703, the client apparatus 1704 and the like. Further, the information processing apparatuses 1800, 3300, 4300 can take out information relating to the acoustic signal and the like by using the removable recording medium 4727.

Heretofore, an example of a hardware configuration which can realize the functions of the information processing apparatuses 1800, 3300, 4300 according to each embodiment of the present invention. Each of the above structural elements may be configured with versatile components, or may be configured with hardwares specializing in functions of each of the structural elements. Accordingly, it is possible to change the configuration to be used as appropriate in accordance with the various technical levels of carrying out the embodiment.

It should be understood by those skilled in the art that various modifications, combinations, sub-combinations and alterations may occur depending on design requirements and other factors insofar as they are within the scope of the appended claims or the equivalents thereof.

For example, in each embodiment described above, a case has been explained where, in the first range, the first parameter R is 1 to 4. However, the first range is not limited to such, and the first parameter may be of different value. For example, in case of slow-tempo speech and music, the first range of the first parameter R may be around 1 to 6. Conversely, in case of fast-tempo speech and music, it may be around 1 to 2.

Further, in the second embodiment as described above, a case has been explained where, in the third range, the first parameter R is 1 to 20. However, the third range is not limited to such, and it may be of different value.

Further, in each embodiment described above, the PICOLA is used as the algorithm for speech rate conversion. However, the algorithm for the speech rate conversion of the present invention is not limited to such, and an arbitrary algorithm can be used regardless of the time-axis or the frequency-axis as long as the speech rate conversion can be performed.

Incidentally, in each embodiment described above, an example of variable speed playback has been explained whose playback speed is faster than the normal speed, but the same thing can be said of a case of playing back with less than the normal speed. That is, 0.5 to 1.0 times speed correspond to the first range and 0.0 to 0.5 times speed correspond to the second range, for example. It is possible to convert only the speech rate in the range of 0.5 to 1.0 times speed, and to convert the speech rate and, at the same time, lower the pitch of a sound as the playback speed slows in the range of 0.0 to 0.5 times speed.

What is claimed is:

1. An information processing apparatus comprising:

a parameter adjustment section to set, in accordance with a first parameter that is input indicating a variant factor for a playback speed of an audio signal, a second parameter and a third parameter, wherein each of the second parameter and the third parameter is configured to have variations comprising at least two regions of different ascending rates in accordance with the first parameter, the at least two regions separated by a predetermined threshold; and a signal processing section to adjust, based on the second parameter and the third parameter and not based directly on the first parameter, at least one of the playback speed of the audio signal or a pitch of a sound of the audio signal, wherein the signal processing section adjusts, based on the second parameter, the playback speed of the audio signal when the variant factor for the playback speed is less than the predetermined threshold and adjusts, based on the second parameter and the third parameter, the playback speed of the audio signal and the pitch of the sound of the audio signal when the variant factor for the playback speed is above the predetermined threshold; and a content management section to manage content including the audio signal, wherein the parameter adjustment section determines a fourth parameter that adjusts a data amount of the audio signal to be output from the content management section to the signal processing section in accordance with the first parameter that is input; and wherein the parameter adjustment section reduces the fourth parameter to reduce the data amount of the content to be output from the content management section to the signal processing section when the first parameter is above the predetermined threshold.

2. The information processing apparatus according to claim 1, wherein the signal processing section includes:

a playback speed conversion section to convert the playback speed of the audio signal; and a pitch adjustment section to adjust the pitch of the sound of the audio signal, wherein the playback speed conversion section converts the playback speed of the audio signal based on the second parameter; and wherein the pitch adjustment section adjusts the pitch of the sound of the audio signal based on the third parameter.

3. The information processing apparatus according to claim 1, wherein the first parameter is approximately equal to a product of the second parameter and the third parameter.

4. The information processing apparatus according to claim 1, wherein the signal processing section includes:

an audio signal output control section to control output of the audio signal from the signal processing section on which a predetermined signal processing has been performed, wherein the audio signal output control section lowers audio volume of an audio signal, for which both playback speed and pitch of a sound are adjusted, when the audio signal is output from the signal processing section.

5. The information processing apparatus according to claim 4, wherein:

the signal processing section further includes an onomatopoeic sound switching judgment section to judge whether, in accordance with the first parameter, to adjust at least one of the playback speed of the audio signal or the pitch of the sound of the audio signal or to switch the audio signal to a predetermined onomatopoeic sound indicating that high speed playback is being performed, the onomatopoeic sound switching judgment section judges to switch the audio signal to the predetermined onomatopoeic sound when the first parameter is above the predetermined threshold; and the audio signal output control section outputs the audio signal after switching the audio signal to the predetermined onomatopoeic sound when the onomatopoeic sound switching judgment section judges to switch the audio signal to the predetermined onomatopoeic sound.

6. The information processing apparatus according to claim 1, wherein a product of the first parameter and the fourth parameter is approximately equal to a product of the second parameter and the third parameter.

7. The information processing apparatus according to claim 1, further comprising: a content management section to manage content including the audio signal, wherein the parameter adjustment section determines the second parameter and the third parameter based on a fourth parameter adjusting data amount of the audio data to be output from the content management section to the signal processing section and the first parameter to be input.

8. The information processing apparatus according to claim 7, wherein the content management section reduces the fourth parameter to reduce data amount of the content to be output from the content management section to the signal processing section when the first parameter is above the predetermined threshold.

9. The information processing apparatus according to claim 7, wherein a product of the first parameter and the fourth parameter is approximately equal to a product of the second parameter and the third parameter.

10. The information processing apparatus according to claim 1, further comprising:

a storage section comprising a database where the first parameter to be input is mutually correlated with the second parameter and the third parameter, wherein the parameter adjustment section determines the second parameter and the third parameter by referring to the database in the storage section.

11. The information processing apparatus according to claim 10, wherein the parameter adjustment section increases the second parameter in accordance with a difference between the first parameter and the predetermined threshold when the first parameter is above the predetermined threshold.

12. The information processing apparatus according to claim 10, wherein:

the database stores a first and a second curved line indicating the variations of the second parameter and the third parameter, respectively, in accordance with the first parameter, and the second curved line has a smooth shape before and after the predetermined threshold.

13. The information processing apparatus according to claim 1, further comprising:

a storage section comprising a database where the first parameter to be input is mutually correlated with the second parameter, the third parameter and the fourth parameter, wherein the parameter adjustment section determines the second parameter, the third parameter and the fourth parameter by referring to the database in the storage section.

14. The information processing apparatus according to claim 1, wherein the parameter adjustment section increases the second parameter in accordance with difference between the first parameter and the predetermined threshold when the first parameter is above the predetermined threshold.

15. The information processing apparatus according to claim 1, wherein the fourth parameter represents a ratio of a duration of a read period to a duration of a skip period.

16. The information processing apparatus according to claim 1, wherein reducing the data amount of the content to be output from the content management section to the signal processing section affects a speech conversion rate, but not the pitch of the sound of the audio signal.

17. An information processing method comprising:

setting, in accordance with a first parameter that is input indicating a variant factor for a playback speed of an audio signal, a second parameter and a third parameter, wherein each of the second parameter and the third parameter is configured to have variations comprising at least two regions of different ascending rates in accordance with the first parameter, the at least two regions separated by a predetermined threshold; and adjusting, based on the second parameter and the third parameter and not based directly on the first parameter, at least one of the playback speed of the audio signal or a pitch of a sound of the audio signal, wherein the adjusting further comprises adjusting, based on the second parameter, the playback speed of the audio signal when the variant factor for the playback speed is less than the predetermined threshold and adjusting, based on the second parameter and the third parameter, the playback speed of the audio signal and the pitch of the sound of the audio signal when the variant factor for the playback speed is above the predetermined threshold;

wherein the setting comprises determining a fourth parameter that adjusts a data amount of the audio signal in accordance with the first parameter; and wherein the setting further comprises reducing the fourth parameter to reduce the data amount of the audio signal when the first parameter is above the predetermined threshold.

18. The information processing method according to claim 17, wherein the setting comprises determining the second parameter and the third parameter such that the first parameter is approximately equal to a product of the second parameter and the third parameter.

19. The information processing method according to claim 17, wherein the adjusting comprises controlling an amplitude of a signal waveform of the audio signal so that an audio volume of the audio signal is made small when both of the playback speed of the audio signal and the pitch of the sound of the audio signal are adjusted.

20. The information processing method according to claim 17, wherein the adjusting comprises switching the audio signal to a predetermined onomatopoeic sound indicating that high speed playback is being performed when the first parameter is above the predetermined threshold.

21. The information processing method according to claim 17, wherein the setting comprises determining the second parameter, the third parameter and the fourth parameter so that a product of the first parameter and the fourth parameter is approximately equal to a product of the second parameter and the third parameter.

22. The information processing method according to claim 17, wherein the setting comprises determining the second parameter and the third parameter in accordance with a fourth parameter adjusting data amount of the audio signal to be processed in the signal processing step and the first parameter.

23. The information processing method according to claim 22, wherein the setting comprises determining the second parameter and the third parameter so that a product of the first parameter and the fourth parameter may be made approximately equal to a product of the second parameter and the third parameter.

24. The information processing method according to claim 17, wherein the fourth parameter represents a ratio of a duration of a read period to a duration of a skip period.

25. The information processing method according to claim 17, wherein reducing the data amount of the audio signal affects a speech conversion rate, but not the pitch of the sound of the audio signal.

26. At least one computer-readable storage having encoded thereon computer-executable instructions that, when executed by a computer, cause the computer to carry out a method, the method comprising:

setting, in accordance with a first parameter that is input indicating a variant factor for a playback speed of an audio signal, a second parameter and a third parameter, wherein each of the second parameter and the third parameter is configured to have variations comprising at least two regions of different ascending rates in accordance with the first parameter, the at least two regions separated by a predetermined threshold; and adjusting, based on the second parameter and the third parameter and not based directly on the first parameter, at least one of the playback speed of the audio signal or a pitch of a sound of the audio signal, wherein the adjusting further comprises adjusting, based on the second parameter, the playback speed of the audio signal when the variant factor for the playback speed is less than the predetermined threshold and adjusting, based on the second parameter and the third parameter, the playback speed of the audio signal and the pitch of the sound of the audio signal when the variant factor for the playback speed is above the predetermined threshold;

wherein the setting comprises determining a fourth parameter that adjusts a data amount of the audio signal in accordance with the first parameter; and wherein the setting further comprises reducing the fourth parameter to reduce the data amount of the audio signal when the first parameter is above the predetermined threshold.

* * * * *